United States Patent
Rajagopal et al.

(10) Patent No.: US 10,383,147 B2
(45) Date of Patent: Aug. 13, 2019

(54) METHODS AND APPARATUS FOR RESOURCE COLLISION AVOIDANCE IN VEHICLE TO VEHICLE COMMUNICATION

(71) Applicant: Samsung Electronics Co., Ltd, Suwon-si (KR)

(72) Inventors: Sridhar Rajagopal, Plano, TX (US); Thomas David Novlan, Dallas, TX (US); Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 169 days.

(21) Appl. No.: 15/382,433

(22) Filed: Dec. 16, 2016

(65) Prior Publication Data

US 2017/0188391 A1    Jun. 29, 2017

Related U.S. Application Data

(60) Provisional application No. 62/349,338, filed on Jun. 13, 2016, provisional application No. 62/346,220, (Continued)

(51) Int. Cl.
*H04W 74/08*    (2009.01)
*H04W 28/02*    (2009.01)
(Continued)

(52) U.S. Cl.
CPC ... *H04W 74/0816* (2013.01); *H04W 28/0284* (2013.01); *H04W 72/121* (2013.01); *H04W 76/14* (2018.02); *H04W 84/18* (2013.01)

(58) Field of Classification Search
None
See application file for complete search history.

(56) References Cited

U.S. PATENT DOCUMENTS

2011/0267948 A1* 11/2011 Koc ............... H04L 5/003
                                                 370/235
2013/0272262 A1   10/2013 Li et al.
(Continued)

FOREIGN PATENT DOCUMENTS

WO    2015/026140 A1    2/2015
WO    2015140039 A1    9/2015

OTHER PUBLICATIONS

ETSI TS 136 211 V13.0 ( )Jan. 2016); Technical Specification LTE; Evolved Universal Terrestrial Radio Access (E-Utra); Physical channels and modulation (3GPP TS 36.211 version 13.0.0 Release 13 143 Pages.
(Continued)

*Primary Examiner* — Kodzovi Acolatse

(57) ABSTRACT

The sensing method a first vehicle user equipment (UE) for collision avoidance in a wireless communication network comprises receiving a set of scheduling assignment (SA) information allocated to a set of second vehicle UEs, decoding the set of SA information, each of which includes SA information to each of the set of second vehicle UEs, performing energy sensing operation for resources to be used by each of the set of second vehicle UEs to determine additional potential SA transmission and data transmission from the set of second vehicle UEs over the resources, determining available resources for the data transmission from the first vehicle UE based on the performed energy sensing and SA sensing, skipping a channel sensing operation on at least one subframe that is used for the data transmission from the first vehicle UE, and transmitting data among resources identified as unused in next transmissions from second vehicle UEs.

15 Claims, 31 Drawing Sheets

Related U.S. Application Data filed on Jun. 6, 2016, provisional application No. 62/340,372, filed on May 23, 2016, provisional application No. 62/339,551, filed on May 20, 2016, provisional application No. 62/332,818, filed on May 6, 2016, provisional application No. 62/332,851, filed on May 6, 2016, provisional application No. 62/320,692, filed on Apr. 11, 2016, provisional application No. 62/319,610, filed on Apr. 7, 2016, provisional application No. 62/319,053, filed on Apr. 6, 2016, provisional application No. 62/310,323, filed on Mar. 18, 2016, provisional application No. 62/296,320, filed on Feb. 17, 2016, provisional application No. 62/291,211, filed on Feb. 4, 2016, provisional application No. 62/291,230, filed on Feb. 4, 2016, provisional application No. 62/272,045, filed on Dec. 28, 2015.

(51) Int. Cl.
*H04W 84/18* (2009.01)
*H04W 76/14* (2018.01)
*H04W 72/12* (2009.01)

(56) References Cited

U.S. PATENT DOCUMENTS

| | | | |
|---|---|---|---|
| 2015/0215903 | A1 | 7/2015 | Zhao et al. |
| 2015/0245193 | A1 | 8/2015 | Xiong et al. |
| 2015/0271786 | A1 | 9/2015 | Xue et al. |
| 2017/0201461 | A1* | 7/2017 | Cheng ............... H04L 47/32 |
| 2017/0238321 | A1* | 8/2017 | Sartori ............... H04L 47/29 455/452.1 |
| 2018/0042023 | A1* | 2/2018 | Sheng ............... H04W 4/046 |
| 2018/0092017 | A1* | 3/2018 | Freda ............... H04W 76/14 |
| 2018/0227882 | A1* | 8/2018 | Freda ............... H04W 72/02 |
| 2018/0234888 | A1* | 8/2018 | Yasukawa ............ H04W 4/04 |
| 2018/0249444 | A1* | 8/2018 | Sorrentino .......... H04W 72/02 |

OTHER PUBLICATIONS

3GPP TS 36.212 V12.3.0 (Dec. 2014) Technical Specification 3rd Generation Partnership Project; Technical Specification Group Radio Access Network; Evolved Universal Terrestrial Radio Access (E-UTRA); Multiplexing and channel coding (Release 12) 89 Pages.

ETSI TS 136 213 V13.0.0 (May 2016) Technical Specification LTE; Evolved Universal Terrestrial Radio Access (E-UTRA); Physical layer procedures (3GPP TS 36.213 version 13.0.0 Release 13)—328 Pages.

ETSI TS 136 321 V13.0 (Feb. 2016) Technical Specification LTE; Evolved Universal Terrestrial Radio Access (E-Utra); Medium Access Control (MAC) protocol specification (3GPP TS 36.321 version 13.0.0 Release 13—84 Pages.

ETSI TS 136 331 V13.0 (Jan. 2016) Technical Specification LTE; Evolved Universal Terrestrial Radio Access (E-Utra); Radio Resource Control (RRC) Protocol specification (3GPP TS 36.331 version 13.0.0 Release 13—670 Pages.

3GPP TS 23.303 V13.2.0 (Dec. 2015) Technical Specification 3rd Generation Partnership Project; Technical Specification Group Services and System Aspects; Proximity-based services (ProSe); Stage 2 (Release 13—122 Pages.

3GPP TSG RAN WG1 Meeting #83 R1-156932; Anaheim, USA, Nov. 15-22, 2015; Agenda Item: 6.2.8.1.1 Source: Huawei, HiSilicon "Collision avoidance for Mode 2" Document for: Discussion and decision—6 Pages.

3GPP TSG RAN WG1 Meeting #83 R1-156429; Anaheim, USA, Nov. 15-22, 2015; Agenda Item: 6.2.8.1.1 Source: Huawei, HiSilicon; Title: Power control for V2V; Document for: Discussion and decision—4 Pages.

International Search Report dated Apr. 11, 2017 in connection with International Patent Application No. PCT/KR2016/015298.

Written Opinion of the International Searching Authority dated Apr. 11, 2017 in connection with International Patent Application No. PCT/KR2016/015298.

Huawei et al., "Collision avoidance for Mode 2", 3GPP TSG RAN WG1 Meeting #83, Nov. 15-22, 2015, 6 pages, R1-156932.

CATT, "Further discussion on resource allocation mechanism in PC5-based V2V", 3GPP TSG RAN WG1 Meeting #83, Nov. 15-22, 2015, 10 pages, R1-157449.

Intel Corporation, "Discussion on network control aspects for V2V communication", 3GPP TSG RAN WG1 Meeting #83, Nov. 15-22, 2015, 7 pages, R1-156689.

Technical Specification "3rd Generation Partnership Project; Technical Specification Group Radio Access Network; Evolved Universal Terrestrial Radio Access (E-UTRA); Multiplexing and channel coding (Release 12)" 3GPP TS 36.212 V12.3.0, Dec. 2014, 89 Pages.

LTE; Evolved Universal Terrestrial Radio Access (E-UTRA); Physical layer procedures (3GPP TS 36.213 version 13.0.0 Release 13), ETSI TS 136 213 V13.0.0, May 2016, 328 Pages.

LTE; Evolved Universal Terrestrial Radio Access (E-UTRA); Medium Access Control (MAC) protocol specification (3GPP TS 36.321 version 13.0.0 Release 13), ETSI TS 136 321 V13.0, Feb. 2016, 84 Pages.

LTE; Evolved Universal Terrestrial Radio Access (E-UTRA); Radio Resource Control (RRC) Protocol specification (3GPP TS 36.331 version 13.0.0 Release 13), ETSI TS 136 331 V13.0, Jan. 2016, 670 Pages.

3rd Generation Partnership Project; Technical Specification Group Services and System Aspects; Proximity-based services (ProSe); Stage 2 (Release 13), 3GPP TS 23.303 V13.2.0, Dec. 2015, 122 Pages.

Huawei et al., "Power control for V2V", 3GPP TSG WG1 Meeting #83, Nov. 15-22, 2015, 4 pages, R1-156429.

LTE; Evolved Universal Terrestrial Radio Access (E-UTRA); Physical channels and modulation (3GPP TS 36.211 version 13.0.0 Release 13), ETSI TS 136 211 V13.0, Jan. 2016, 143 Pages.

Supplementary Partial European Search Report dated Oct. 16, 2018 in connection with European Patent Application No. 16 88 2060, 18 pages.

Huawei, HiSilicon, "Discussion on group priority for D2D communication", 3GPP TSG RAN WG1 Meeting #82, Aug. 24-28, 2015, 4 pages, R1-154339.

Extended European Search Report regarding Application No. 16882060.3, dated Mar. 14, 2019, 16 pages.

\* cited by examiner

METHODS AND APPARATUS FOR RESOURCE COLLISION AVOIDANCE IN VEHICLE TO VEHICLE COMMUNICATION

CROSS-REFERENCE TO RELATED APPLICATION(S) AND CLAIM OF PRIORITY

This application claims priority under 35 U.S.C. § 119(e) to:
U.S. Provisional Patent Application No. 62/272,045 filed on Dec. 28, 2015 entitled METHOD AND APPARATUS FOR SYNCHRONIZATION IN VEHICLE TO VEHICLE COMMUNICATION;
U.S. Provisional Patent Application No. 62/291,211 filed on Feb. 4, 2016 entitled METHOD AND APPARATUS FOR SYNCHRONIZATION IN VEHICLE TO VEHICLE COMMUNICATION;
U.S. Provisional Patent Application No. 62/291,230 filed on Feb. 4, 2016 entitled METHOD AND APPARATUS FOR COLLISION AVOIDANCE IN VEHICLE TO VEHICLE COMMUNICATION;
U.S. Provisional Patent Application No. 62/296,320 filed on Feb. 17, 2016 entitled METHOD AND APPARATUS FOR SYNCHRONIZATION IN VEHICLE TO VEHICLE COMMUNICATION;
U.S. Provisional Patent Application No. 62/310,323 filed on Mar. 18, 2016 entitled METHOD AND APPARATUS FOR COLLISION AVOIDANCE IN VEHICLE TO VEHICLE COMMUNICATION;
U.S. Provisional Patent Application No. 62/319,610 filed on Apr. 7, 2016 entitled METHOD AND APPARATUS FOR COLLISION AVOIDANCE IN VEHICLE TO VEHICLE COMMUNICATION;
U.S. Provisional Patent Application No. 62/319,053 filed on Apr. 6, 2016 entitled METHOD AND APPARATUS FOR SYNCHRONIZATION IN VEHICLE TO VEHICLE COMMUNICATION;
U.S. Provisional Patent Application No. 62/320,692 filed on Apr. 11, 2016 entitled METHOD AND APPARATUS FOR SYNCHRONIZATION IN VEHICLE TO VEHICLE COMMUNICATION;
U.S. Provisional Patent Application No. 62/332,818 filed on May 6, 2016 entitled METHOD AND APPARATUS FOR SYNCHRONIZATION IN VEHICLE TO VEHICLE COMMUNICATION;
U.S. Provisional Patent Application No. 62/332,851 filed on May 6, 2016 entitled METHOD AND APPARATUS FOR COLLISION AVOIDANCE IN VEHICLE TO VEHICLE COMMUNICATION;
U.S. Provisional Patent Application No. 62/339,551 filed on May 20, 2016 entitled METHOD AND APPARATUS FOR COLLISION AVOIDANCE IN VEHICLE TO VEHICLE COMMUNICATION;
U.S. Provisional Patent Application No. 62/340,372 filed on May 23, 2016 entitled METHOD AND APPARATUS FOR COLLISION AVOIDANCE IN VEHICLE TO VEHICLE COMMUNICATION;
U.S. Provisional Patent Application No. 62/346,220 filed on Jun. 6, 2016 entitled METHOD AND APPARATUS FOR COLLISION AVOIDANCE IN VEHICLE TO VEHICLE COMMUNICATION; and
U.S. Provisional Patent Application No. 62/349,338 filed on Jun. 13, 2016 entitled METHOD AND APPARATUS FOR COLLISION AVOIDANCE IN VEHICLE TO VEHICLE COMMUNICATION;
The above-identified provisional patent applications are hereby incorporated by reference in their entirety.

TECHNICAL FIELD

This disclosure relates generally to wireless communication systems. More specifically, this disclosure relates to method and apparatus for resource collision avoidance in vehicle to vehicle communication.

BACKGROUND

Traditionally, cellular communication networks have been designed to establish wireless communication links between mobile devices and fixed communication infrastructure components (such as base stations or access points) that serve users in a wide or local geographic range. However, a wireless network can also be implemented to utilize only device-to-device (D2D) communication links without a need for fixed infrastructure components. This type of network is typically referred to as an ad-hoc network. A hybrid communication network can support devices that connect both to fixed infrastructure components and to other D2D-enabled devices. While end user devices such as smartphones may be envisioned for D2D communication networks, a vehicular communication network, such as vehicle to everything (V2X) may be supported by a communication protocol where vehicles exchange control and data information between other vehicles (vehicle to vehicle (V2V)) or other infrastructure (vehicle to infrastructure (V2I)) and end-user devices (vehicle to pedestrian (V2P)). Multiple types of communication links may be supported by nodes providing V2X communication in a network, and utilizing the same or different protocols and systems.

SUMMARY

This disclosure provides a method and apparatus for resource collision avoidance in vehicle to vehicle communication.

In one embodiment, an apparatus of a first vehicle user equipment (UE) for collision avoidance using channel sensing in a wireless communication network is provided. The apparatus comprises a transceiver configured to receive a set of scheduling assignment (SA) information that is allocated to a set of second vehicle UEs in the wireless communication network. The apparatus further comprises at least one processor configured to decode the set of SA information each of which includes SA information to each of the set of second vehicle UEs, perform energy sensing operation for resources to be used by each of the set of second vehicle UEs to determine additional potential SA transmission and data transmission from the set of second vehicle UEs over the resources, determine available resources for the data transmission from the first vehicle UE based on the performed energy sensing and SA sensing, and skip a channel sensing operation on at least one subframe that is used for the data transmission from the first vehicle UE based on a result of the determination of available resources, wherein the transceiver is further configured to transmit data among resources identified as unused in next transmissions from second vehicle UEs.

In another embodiment, an apparatus of an eNodeB (eNB) for collision avoidance using channel sensing in a wireless communication network is provided. The apparatus comprises at least one processor configured to determine a set of scheduling assignment information (SA) including at least one of an allocation identifier (ID) or a periodicity. The apparatus further comprises a transceiver configured to transmit the SA information to a set of UEs in the wireless communication network, transmit a congestion level request to the set of UEs, and receive, from the set of UEs, a congestion level response corresponding to the congestion level request, wherein the congestion level response includes a congestion percentage based on a ratio of a number of busy resources and a number of total resources.

In yet another embodiment, a sensing method of a first vehicle user equipment (UE) for collision avoidance using channel sensing in a wireless communication network is provided. The sensing method comprises receiving a set of scheduling assignment (SA) information that is allocated to a set of second vehicle UEs in the wireless communication network, decoding the set of SA information each of which includes SA information to each of the set of second vehicle UEs, performing energy sensing operation for resources to be used by each of the set of second vehicle UEs to determine additional potential SA transmission and data transmission from the set of second vehicle UEs over the resources, determining available resources for the data transmission from the first vehicle UE based on the performed energy sensing and SA sensing, skipping a channel sensing operation on at least one subframe that is used for the data transmission from the first vehicle UE based on a result of the determination of available resources, and transmitting data among resources identified as unused in next transmissions from second vehicle UEs.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 42, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

The following documents and standards descriptions are hereby incorporated by reference into the present disclosure as if fully set forth herein: 3GPP TS 36.211 v13.0, "E-UTRA, Physical channels and modulation" (REF 1); 3GPP TS 36.212 v13.0, "E-UTRA, Multiplexing and Channel coding" (REF 2); 3GPP TS 36.213 v13.0, "E-UTRA, Physical Layer Procedures" (REF 3); 3GPP TS 36.321 v13.0, "E-UTRA, Medium Access Control (MAC) protocol specification" (REF 4); 3GPP TS36.331 v13.0.0, "E-UTRA, Radio Resource Control (RRC) protocol specification" (REF 5); 3GPP TS 23.303, "v13.2.0, "Proximity-based services (ProSe); stage 2" (REF 6); 3GPP TS 22.885 v2.0, 0, "Study on LTE support for V2X services" (REF 7); 3GPP R1-156932, "Collision avoidance for Mode 2"; and 3GPP R1-156429" (REF 8); and 3GPP R1-156429, "Power control for V2V" (REF 9).

Figure 1:
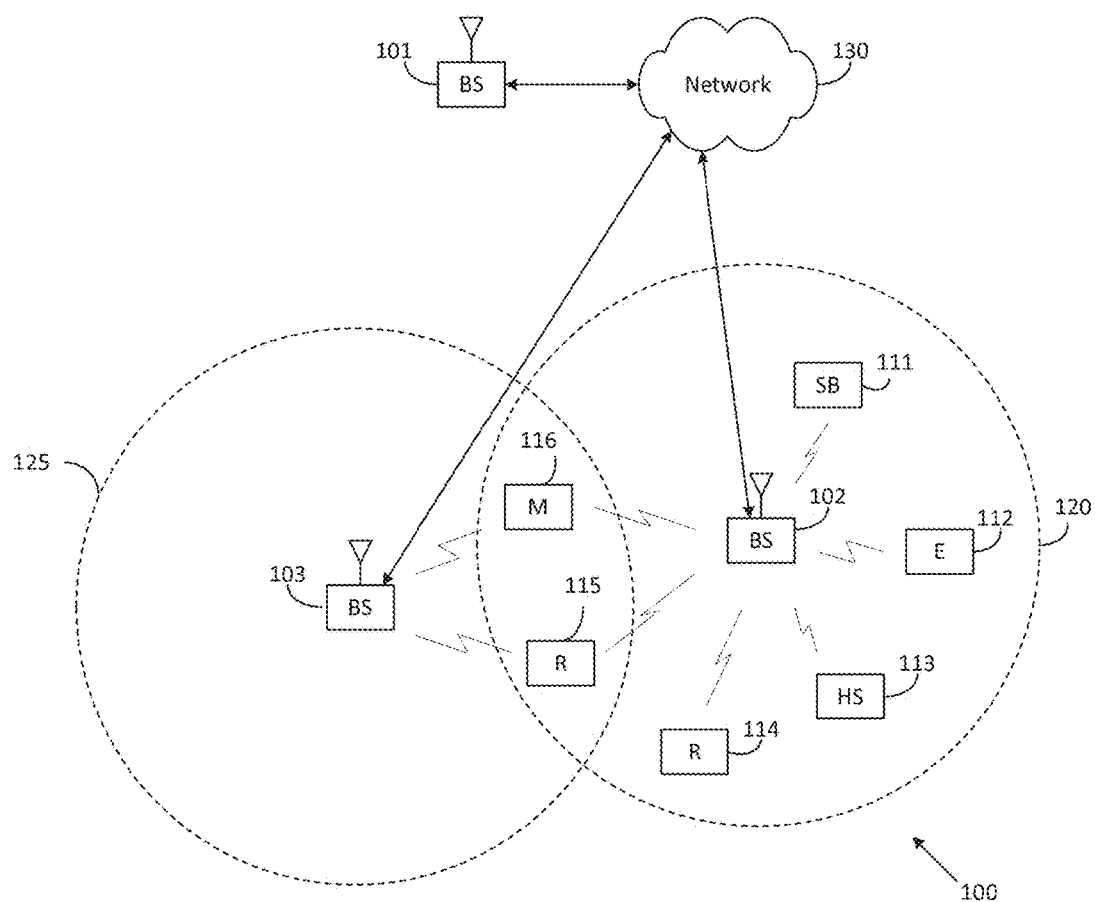
FIG. 1 illustrates an example wireless network according to embodiments of the present disclosure.
Figure 2:
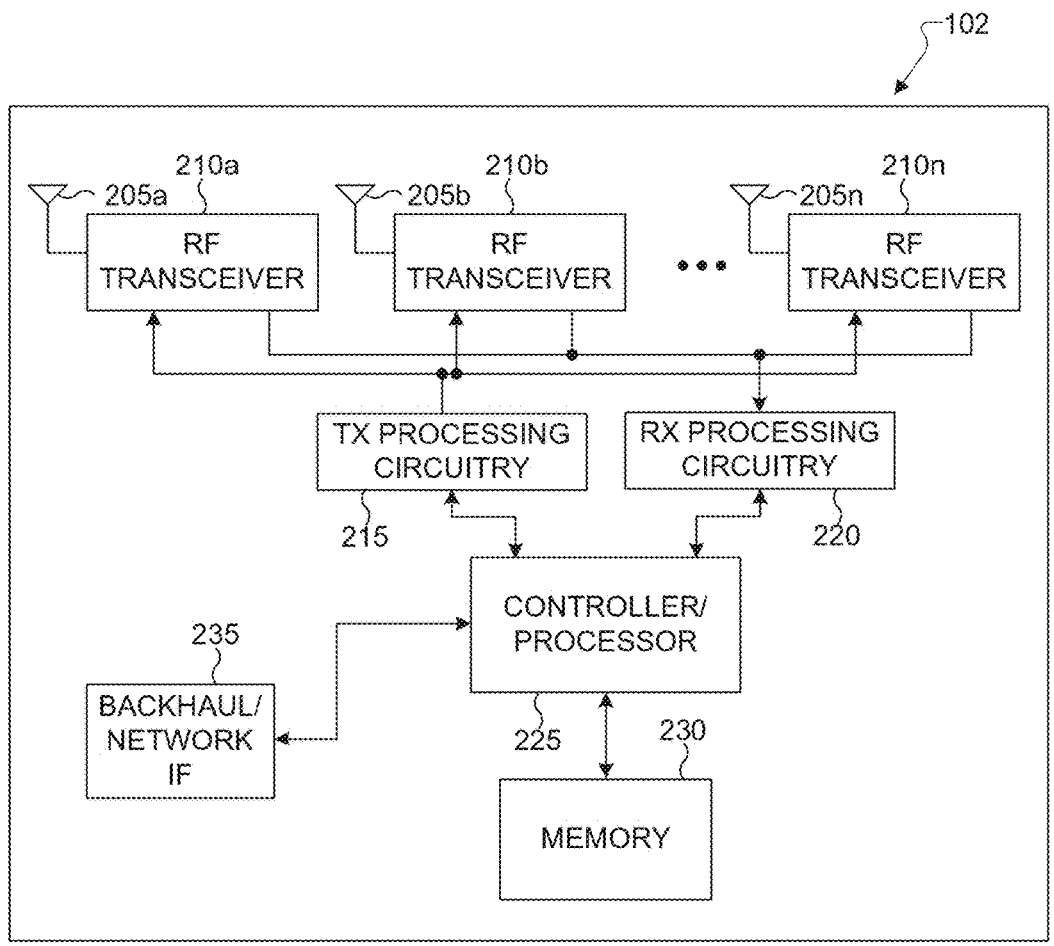
FIG. 2 illustrates an example base station (BS) according to embodiments of the present disclosure.
Figure 3:
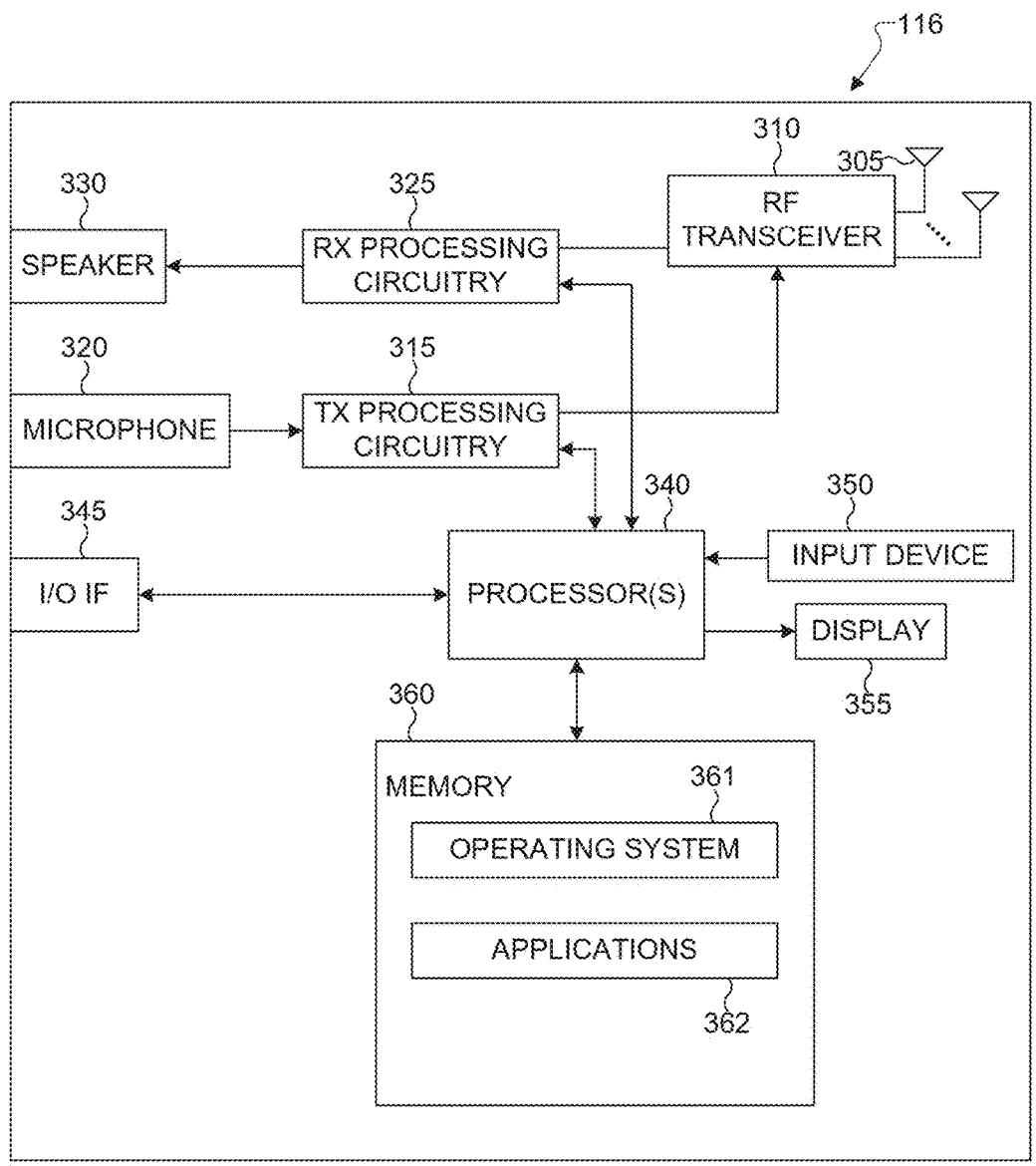
FIG. 3 illustrates an example user equipment (UE) according to embodiments of the present disclosure.

The descriptions of FIGS. 1-3 are not meant to imply physical or architectural limitations to the manner in which different embodiments may be implemented. Different embodiments of the present disclosure may be implemented in any suitably-arranged communications system.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System' or 'New Radio Access Technology (NR)'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a BS 101, a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of UEs within a coverage area 120 of the BS 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G, LTE, LTE-A, WiMAX, WiFi, LTE-U(LAA), device-to device (D2D), vehicle communication (V2X) such as vehicle-to-device (V2P), vehicle-to-infrastructure (V2I), vehicle-to-vehicle (V2V), or other wireless communication techniques. In one embodiment, the BSs 101-103 may be implemented as managing entities that control the UEs 111-116 (such as vehicle terminals).

Depending on the network type, other well-known terms may be used instead of "eNodeB" or "eNB," such as "base station", "managing entity", "managing network entity", or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," "vehicle" or "user device." For the sake of convenience, the terms "user equipment" and "UE" are used in this patent document to refer to remote wireless equipment that wirelessly accesses an eNB (such as base station), whether the UE is a mobile device (such as a vehicle terminal, a mobile telephone, or smartphone) or is normally considered a stationary device (such as a desktop computer, or vending machine).

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-116 (such as a vehicle with a wireless communication interface, also may be termed as vehicle UE) include circuitry, programming, or a combination thereof, for processing of the control information, also known as scheduling assignment (SA) information and data transmission for collision avoidance in a wireless communication network (e.g., vehicle to vehicle (V2V) communication network). In certain embodiments, and one or more of the BSs 101-103 (e.g., eNB, E-UTRAN) includes circuitry, programming, or a combination thereof, for determining a set of SA information each of which includes SA information to each of a set of vehicle UEs and determining available resources for data transmission from the set of vehicle UEs based on the set of SA information. In one embodiment, one or more of the BSs 101-103 transmits the set of SA information to the set of vehicle UEs in the wireless communication network. The set of SA information is transmitted on pre-determined frequency resources.

Although FIG. 1 illustrates one example of a wireless network 100, various changes may be made to FIG. 1. For example, the wireless network 100 could include any number of BSs (such as managing entities) and any number of UEs (such as vehicle terminals) in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS. In one embodiment, the BSs may be implemented as eNodeB (eNB) or E-UTRAN or transmit reception point (TRP) in a V2X communication network.

As shown in FIG. 2, the BS 102 includes multiple antennas 205a-205n, multiple RF transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the network 100. In one embodiment, the UEs may be implemented as vehicle terminals in a V2X communication network. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

In some embodiment, the RF transceivers 210a-210n is configured to transmit the SA information to a set of UEs in the wireless communication network. In some embodiment, the RF transceivers 210a-210n is configured to transmit a congestion level request to the set of UEs and receive, from the set of UEs, a congestion level response corresponding to the congestion level request, wherein the congestion level response includes a congestion percentage based on a ratio of a number of busy resources and a number of total resources.

In some embodiment, the RF transceivers 210a-210n is configured to transmit the threshold to the set of UEs in the wireless communication network.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n. In some embodiment, the RF transceivers 210a-210n are configured to transmit the set of SA information to the set of vehicle UEs in the wireless communication network.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the BS 102 by the controller/processor 225. In some embodiments, the controller/processor 225 includes at least one microprocessor or microcontroller.

As described in more detail below, the BS 102 includes circuitry, programming, or a combination thereof for collision avoidance in V2X communication network. The BS 102 (e.g., eNB, E-UTRAN) is configured to transmit the set of SA information to the set of vehicle UEs in the wireless communication network.

In some embodiment, controller/processor 225 can be configured to execute one or more instructions, stored in memory 230, that are configured to cause the controller/processor to determine a set of scheduling assignment information (SA) including at least one of an allocation identifier (ID) or a periodicity.

In some embodiment, controller/processor 225 can be configured to execute one or more instructions, stored in memory 230, that are configured to cause the controller/processor to activate or de-activate the SA information at every subframe using downlink control information (DCI).

In some embodiment, controller/processor 225 can be configured to execute one or more instructions, stored in memory 230, that are configured to cause the controller/processor to determine a threshold that is statically configured for an energy measurement operation by the set of UEs.

In some embodiment, controller/processor 225 can be configured to execute one or more instructions, stored in memory 230, that are configured to cause the controller/processor to transmit a request to receive a network load measurement report from the set of UEs in the wireless communication network, the network load measurement report being used to select at least one path for a vehicle-to-vehicle (V2V) communication.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the BS 102 to communicate with other devices or systems over a backhaul connection or over a network. The interface 235 could support communications over any suitable wired or wireless connection(s). For example, when the BS 102 is implemented as part of a cellular communication system (such as one supporting V2P, V2I, V2V, D2D, 5G new radio access technology (NR), LTE, LTE-A, or LAA), the interface 235 could allow the BS 102 to communicate with other BSs over a wired or wireless backhaul connection. When the BS 102 is implemented as an access point, the interface 235 could allow the BS 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a flash memory or other ROM.

Although FIG. 2 illustrates one example of BS 102, various changes may be made to FIG. 2. For example, the BS 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE. In one embodiment, the UE 116 may be implemented as a vehicle terminal in a V2X communication network.

As shown in FIG. 3, the UE 116 includes a set of antennas 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the set of antennas 305, an incoming RF signal transmitted by an eNB of the network 100. The RF transceiver 310 down-converts the incoming RF signal to generate an intermediate frequency (IF) or baseband signal. In some embodiment, the RF transceiver 310 receives a transceiver configured to transmit an authorization request message to a managing entity and receive an authorization confirmation message corresponding to the authorization request message from the managing entity. In some embodiments, the RF transceiver 310 receives a plurality of messages including control and data messages from the at least one second UE.

In some embodiments, the RF transceiver 310 is configure to receive a set of scheduling assignment (SA) information that is allocated to a set of second vehicle UEs in the wireless communication network; and The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

In some embodiments, the processor 340 is also capable of decoding the set of SA information each of which includes SA information to each of the set of second vehicle UEs, performing energy sensing operation for resources to be used by each of the set of second vehicle UEs to determine additional potential SA transmission and data transmission from the set of second vehicle UEs over the resources, determining available resources for the data transmission from the first vehicle UE based on the performed energy sensing and SA sensing, and skipping a channel sensing operation on at least one subframe that is used for the data transmission from the first vehicle UE based on a result of the determination of available resources, wherein the transceiver is further configured to transmit data among resources identified as unused in next transmissions from second vehicle UEs.

In some embodiments, the processor 340 is also capable of excluding unavailable data resources based on the decoded set of SA information for the data transmission from the first vehicle UE and selecting the available resources for the data transmission from the first vehicle UE based on the decoded set of SA information.

In some embodiments, the processor 340 is also capable of determining a set of transmission parameters based on the available resources and performing the data transmission from the first vehicle UE on the available resources in accordance with a set of transmission parameters. In such embodiments, the set of transmission parameters comprises at least one of a transmit power, a modulation and coding scheme (MCS), or semi-persistent related parameters including a next transmission interval. In such embodiments, the set of SA information is received on pre-determined frequency resources.

In some embodiments, the processor 340 is also capable of determining a sensing duration for the channel sensing operation based on a sensing window period that is a same for transmissions from a plurality of UEs in a given resource pool and identifying a resource availability map for next data transmission based on sensing during a result of the determination of sensing duration.

In some embodiments, the processor 340 is also capable of determining whether the data transmission is continued on the available resources and triggering reselection of the available resources for the data transmission when a condition has been satisfied. In such embodiments, the condition is satisfied with at least one of a counter has been expired, the counter for each UE being independently reset or initialized to a value randomly chosen within a pre-determined range of values or the first vehicle UE identifies that a transport block (TB) included in the data transmission does not fit within an available resource allocation using an allowable MCS.

In such embodiments, a next transmission at n+e is offset from a currently scheduled transmission n+d in a multiple of period P e=k*$P_{min}$+d, and wherein k is an integer in range 0 to 10 and $P_{min}$ is set to 100, the k being indicated in an SCI as e-d using 4 bits. In such embodiments, a congestion level observed by the first vehicle UE is defined by at least one of a percentage of unavailable data or SA resources observed by the first vehicle UE based on sensing and is used for resource allocation, and wherein a congestion percentage is defined as a ratio of a number of busy resources in T and a number of total resources in T, and wherein T is a measuring interval, the congestion level being indicated to the eNB based on an eNB request.

In such embodiment, if a sub-frame m is skipped for sensing by the first vehicle UE, a resource selection in subframes at m+k*$P_{min}$ is avoided until a sensing operation is performed in next sub-frame m+k*$P_{min}$, and wherein k is an integer and k>0 and $P_{min}$ is set to 100. In such embodiments, the first vehicle UE performs sensing in sub-frames m−k*$P_{min}$, and wherein k is an integer in range of 1≤k≤10 and $P_{min}$ is set to 100.

The processor 340 can move data into or out of the memory 360 as required by an executing process. In some embodiments, the processor 340 is configured to execute the applications 362 based on the OS 361 or in response to signals received from BS s or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350 and the display 355. The operator of the UE 116 can use the input device 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the UE 116 may include only one antenna 305 or any number of antennas 305. Also, while FIG. 3 illustrates the UE 116 configured as a mobile telephone or smartphone, UEs could be configured to operate as other types of mobile or stationary devices.

Figure 4:
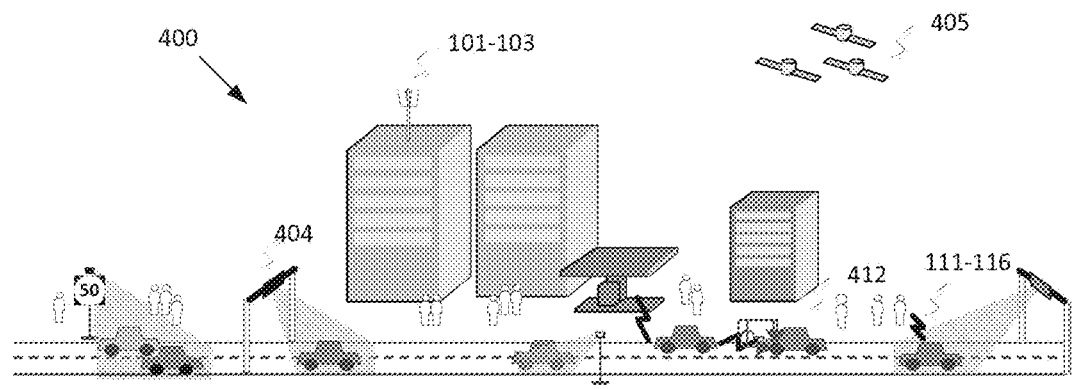
FIG. 4 illustrates an example long-term evolution vehicle (LTE V2X) communication network according to embodiments of the present disclosure.

FIG. 4 illustrates an example long-term evolution vehicle (LTE V2X, LTE V2V) communication network 400 according to embodiments of the present disclosure. An embodiment of the LTE V2X network 400 shown in FIG. 4 is for illustration only. Other embodiments may be used without departing from the scope of the present disclosure.

As illustrated in FIG. 4, V2X communication (e.g., V2V communication) may be used to implement many kinds of services that are complementary to the primary communication network or provide new services based on the flexibility of the network topology. V2X may support unicasting, broadcasting, or groupcasting is a potential means for V2V communication where vehicles are able to transmit messages to all in-range V2V-enabled devices or a subset of devices which are members of particular group. A protocol may be based on LTE-D2D or a specialized LTE-V2V protocol. V2X can support V2I communication between one or more vehicles and an infrastructure node (101-103) to provide cellular connectivity as well as specialized services related to control and safety of vehicular traffic. V2P communication for UE's 111-116 can be supported as well, for example to provide safety services for pedestrians or traffic management services. V2X multicast communication can be used to provide safety and control messages to large numbers of vehicles in an efficient fashion.

While vehicle devices may be able to support many different communication protocols, and mandatory and optional features, since the traffic types, QoS requirements, and deployment topologies are distinct from other types of communication, the hardware/software on a vehicle for supporting V2X may have a reduced or specialized functionality compared to other devices. For example protocols related to low-complexity, low-data rate, and/or low-latency, machine-type communication protocols 404 may be supported (such as traffic tracking beacons).

Satellite-based communication 405 may also be supported for V2X networks for communication or positioning services. Additionally networks may require devices to operate in near simultaneous fashion when switching between V2X communications modes. Vehicle-to-vehicle communication 412 may also be supported for V2X networks for communication or positioning services.

V2X requires resource allocation mechanisms since multiple V2X UEs may have a need to utilize the same time/frequency resources as other V2X or cellular or D2D UEs. In addition to resource allocation signaling for the transmitting UEs, in the case of V2X, receiving UEs may also require resource allocation signaling in order to determine which time/frequency resources to monitor to receive the transmissions of one of more V2X UEs. Different resource allocation granularity may need to be supported depending on multiple factors including deployment scenarios (such as in/outside network coverage) and traffic types (such as unicast, groupcast, video, etc.).

Traditionally for centralized resource management, a central controller (such as managing entity) like the eNB collects all the channel state information of every UE in the cell and allocates the available resources to maximize a throughput according to fairness and power constraints. For UEs within network coverage, the eNB may be responsible for allocating resources for a group of UEs. Based on the eNB or autonomous resource selection, the transmitting UEs can provide a scheduling assignment signaling indicating the resources the Rx UEs monitor for reception of the data (e.g., this is called as "Mode 1" resource allocation).

On the other hand, especially considering an out-of-network coverage scenario, UEs can determine their resource allocation independently in a distributed fashion (e.g., this is called as "Mode 2" resource allocation). Simple random resource selection may be considered as a baseline distributed approach with a low overhead and scalability. One drawback of such an approach is that collisions are possible among broadcasting UEs. Thus an implicit coordination (such as energy sensing) and/or explicit coordination (such as sensing based on scheduling assignment transmission) would be required to prevent collisions and mitigate interference.

Figure 5:
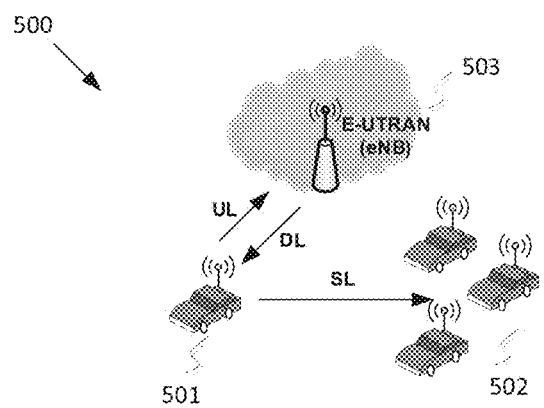
FIG. 5 illustrate an example sidelink (SL) interface according to embodiments of the present disclosure.

FIG. 5 illustrates an example sidelink (SL) interface 500 according to embodiments of the present disclosure. An embodiment of the SL interface 500 shown in FIG. 5 is for illustration only. Other embodiments may be used without departing from the scope of the present disclosure. As shown in FIG. 5, the SL interface 500 comprises a plurality of UEs 501, 502, and E-UTRAN (e.g., eNB) 503.

While UL designates the link from UE 501 to eNB 503 and DL designates the reverse direction, SL designates the radio links over the PC5 interfaces between UE 501 and UEs 205. The UE 501 transmits a V2V message to a plurality of UEs 502 in the SL interface. The SL communication happens directly without using the eNB 503 technology and not traversing any network node (e.g., eNodeB 503). The PC5 interface re-uses existing frequency allocation, regardless of the duplex mode (frequency division duplex (FDD) or time division duplex (TDD)).

To minimize hardware impact on a UE and especially on the power amplifier of the UE, transmission of V2V links occurs in the UL band in case of FDD. Similar, the PC5 interface uses SFs that are reserved for UL transmission in TDD. The signal transmission is based on single carrier frequency division multiple access (SC-FDMA) that is also used for UL transmission. The new channels can be largely based on the channel structure applicable for the transmission of the physical UL shared channel (PUSCH).

A SL transmission and reception occurs with resources assigned to a group of devices. A resource pool (RP) is a set of resources assigned for SL operation. The RP comprises the subframes and the resource blocks within the subframe. For SL communication, two additional physical channels are introduced such as physical sidelink control channel (PSCCH) carrying the control information and physical sidelink shared channel (PSSCH) carrying the data.

Figure 6:
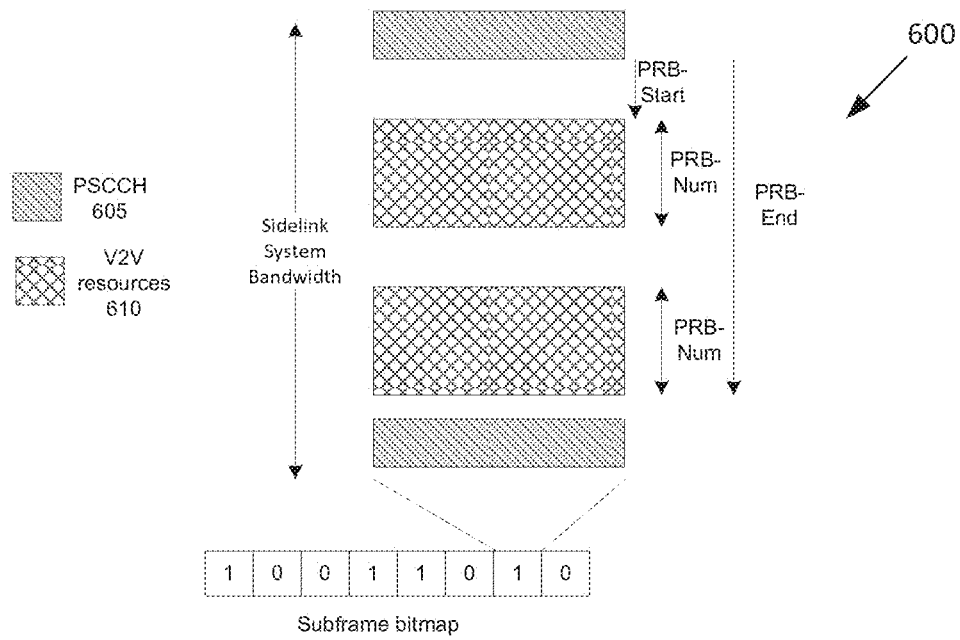
FIG. 6 illustrates an example resource pool for a physical downlink shared control channel (PDSCCH) according to embodiments of the present disclosure.

FIG. 6 illustrates an example resource pool 600 for a physical sidelink control Channel (PSCCH) according to embodiments of the present disclosure. An embodiment of the resource pool 600 for the PSCCH shown in FIG. 6 is for illustration only. Other embodiments may be used without departing from the scope of the present disclosure. As shown in FIG. 6, the resource pool 600 comprises a PSCCH 605 and V2V 610 resources. The resource pool 600 is defined in frequency and time domains. In frequency domain, PRBnum defines the frequency range in physical resource block (PRB) bandwidth units, and PRBstart and PRBend define the location in the frequency domain within the uplink band. In time domain, a bitmap indicates the 1 millisecond (msec) sub-frames used for PSCCH transmission. The block of resources is repeated with a period defined by a parameter SC-Period (expressed in sub-frame duration, i.e. 1 msec).

The range of possible values for SC-Period is from 40 msec to 320 msec: low values are supported for voice transmission.

All the parameters needed to define the resource pool are broadcasted in a system information block (SIB) by the network. The devices which are not within coverage (and hence cannot acquire the SIB) may use some pre-configured values internally stored. The PSCCH is used by the D2D/V2V transmitting UE to make the members of the D2D/V2V group aware of the next data transmission that will occur on the PSSCH. The D2D/V2V transmitting UE sends the SL control information (SCI) on the PSCCH as shown in TABLE 1. The PSCCH transmission is also called as the scheduling assignment (SA) since it provides the schedule of the transmission of the UE.

TABLE 1

| Parameter | Usage |
| --- | --- |
| Group destination ID | used by the receiving devices to determine whether they have some interest in this announcement. If the identifier does not match, they do not need to monitor SL channels until the next SC-Period |
| Modulation and coding scheme (MCS) | to indicate modulation and coding rate for the data |
| Resource block assignment and hopping resource allocation Frequency hopping flag | give the receiving devices information about the resources of the PSSCH that they shall decode in the frequency domain |
| Time resource pattern (T-RPT) | give the receiving devices information about the resources of the PSSCH that they shall decode in the time domain |
| Timing advance | |

Devices interested in receiving D2D/V2V services blindly scan the whole PSCCH pool to search if a SCI format matching their group identifier can be detected. On the transmitting device side, resources to transmit the SCI format information shall be selected within the PSCCH pool.

There are two types of resource pools such as reception resource pools (Rx RPs) and transmission resource pools (Tx RPs). These are either signaled by the eNodeB for incoverage case or a pre-configured value is used for the out-of-coverage case. Within a cell, there may be more Rx RPs than Tx RPs to enable reception from adjacent cells or from out-of-coverage UEs.

Two modes of resource allocation have been defined for SL communication such as a Mode 1 (e.g., scheduled resource allocation) and a Mode 2 (e.g., autonomous resource selection). In one example, in mode 1, access to the SL resources is driven by the eNodeB. The UE needs to be connected to transmit data. In such example, the UE wishing to use direct communication feature sends an indication to the network. The UE may be assigned a temporary identifier SL-RNTI (Sidelink Radio Network Temporary Identifier). This identifier may be used by the eNodeB to schedule the future D2D/V2V transmission When the UE has some data to transmit in D2D/V2V mode, the UE sends an SL buffer status report (SL-BSR) to the eNodeB which gives an indication on the amount of data to be transmitted in D2D/V2V mode. Based on this information, the eNodeB sends to the UE the allocation on both PSCCH and PSSCH for its D2D/V2V transmission. The allocation information is sent over the PDCCH by sending a DCI Format 5, scrambled by the SL-RNTI. The information contained in DCI format 5 is detailed in TABLE 2. A large part of the DCI Format 5 information is directly reflected in the content of the SCI format 0. Based on the information received in the DCI format 5, the D2D transmitting devices sends the SCI format 0 over the resources within the PSCCH pool allocated by the eNodeB, followed by the data over the resources allocated by the eNodeB for PSSCH transmission.

TABLE 2

| Parameter | Usage |
| --- | --- |
| Resource for PSCCH | Provides the information of the transmitting UE of the resource to be used for SCI format 0 transmissions within the PSCCH pool. |
| TPC command | If this bit is not set, the transmitting UE is allowed to transmit D2D signals at maximum power. Otherwise, it shall comply with power control rules based on open loop. |
| Resource block assignment and hopping resource allocation Frequency hopping flag | give to the receiving devices the information of the resources of the PSSCH that they shall decode in the frequency domain |
| Time resource pattern (T-RPT) | give to the receiving devices the information of the resources of the PSSCH that they shall decode in the time domain |

In mode 1, there is no pre-allocated or reserved resource for PSSCH, but the resource is assigned "on-demand" by the eNodeB. In addition, since the eNodeB is responsible to give access to the resources within the PSCCH pool, resource collision on the PSCCH transmission can be avoided.

In mode 2, the UE transmitting D2D/V2V data does not need to be connected to the eNodeB. The UE selects autonomously and randomly the resources within the PSCCH pool to transmit the SA using SCI Format 0. In addition to the PSCCH pool, there is also a PSSCH pool which defines reserved resources for PSSCH transmission. It is defined in a similar way as the PSCCH pool (PRBStart, PRBend, PRBNum in the frequency domain and a subframe bitmap in the time domain which is repeated up to the next PSCCH occurrence). The SCI Format 0 designates the portion of the pool that is used for D2D transmission. Since the transmitting UE is not necessarily connected to the eNodeB, the timing advance information may be not known and the corresponding parameter in the SCI Format 0 shall be set to 0.

With D2D mode 2 communications, a UE autonomously selects resources from the SA resource pool to transmit its control information and from the data resource pool to transmit data. Since there is no centralized controller in the mode 2, each transmitting UE can select resources with equal probability from the resource pools for SA and/or data transmission. Thus, there may be more than one UE who may select the same resources (e.g., collision happens).

When the number of transmitting UEs is beyond 2 or 3 times the number of resources, the average collision probability can be over 90% using existing D2D techniques in LTE specification. Resource collision for V2V is a more severe problem than for Rel-12 D2D since the UE density is higher than a D2D public safety deployment, especially for urban scenarios. Furthermore, a high level of collision increases latency which makes it difficult to meet 100 msec latency requirement for channel assignment message (CAM) messages and 20 msec requirement for event-triggered messages.

There is a requirement for V2X communication that the E-UTRA(N) (e.g., eNB) may be able to support a high density of UEs supporting V2X Service. Thus, collision avoidance measures may need to be considered to support high density of vehicles. Furthermore, V2X services may operate in shared spectrum such as 5.9 GHz and may need to co-exist with other technologies. Dedicated short range communications (DSRC) is a short to medium range communications service using 5.9 GHz that supports both public safety and private operations in roadside to vehicle and vehicle to vehicle communication environments. The DSRC is meant to be a complement to cellular communications by providing very high data transfer rates in circumstances where minimizing latency in the communication link and isolating relatively small communication zones are important. The DSRC supports seven 10 MHz channels in the 5.85 to 5.925 GHz frequency bands. At the physical layer, IEEE 802.11p standard based on Wi-Fi is adopted for communication in this frequency band.

Energy sensing is the method used for DRSC using IEEE 802.11p. Listen-before-talk (LBT) is also recently supported in 3GPP specification for a license assisted access (LAA). LBT in Wi-Fi systems works by sensing energy in the time domain and the resources are completely scheduled in the time and frequency domain. However, LBT for V2X presents challenges since users can be scheduled in the frequency domain, making time domain sensing not valid to sense if a UE is present or not.

Further the resources in time may not be completely used since V2V may share spectrum with UL, and one may mistake UL transmission for V2V transmission if only time-domain based energy detect is used. There are multiple techniques for V2V to identify possible collision such as energy detection or reading other UE's PSCCH (SA scan).

A semi-persistent scheduling (SPS) is available for DL/UL communication in LTE, primarily to support voice. Since the PDCCH is limited size (generally, 3 OFDM symbols), there is a limit as to how many DCIs can be carried in a subframe. This can in-turn limits the number of UEs which can receive an allocation for that subframe when using dynamic scheduling (a 1:1 PDCCH-to-PxSCH method).

With SPS, the UE is pre-configured by the eNB with an SPS-RNTI (allocation ID) and a periodicity. Once pre-configured, if the UE were to receive an allocation (DL/UL) using the SPS-RNTI (instead of the typical C-RNTI), then this one allocation would repeat according to the pre-configured periodicity. During SPS, certain parameters remain fixed for each allocation, for example RB assignments, modulation and coding scheme, etc. If the radio link conditions change, a new allocation may have to be sent (PDCCH).

SPS can be configured and/or re-configured by RRC at any time using SPS-Config. This SPS-Config includes the configuration for semiPersistSchedC-RNTI (sps-CRNTI), sps-ConfigDL and sps-ConfigUL. SPS can be configured only in the uplink (sps-ConfigUL), or in the downlink (sps-ConfigDL) or in both directions. Configuration of SPS does not mean that the UE can start using SPS grants/assignments.

The eNB may explicitly activate SPS, in order for the UE to use SPS grants and/or assignments. Also, to avoid wasting resources when a data transfer is completed, there are several mechanisms for deactivating SPS (explicit, inactivity timer, etc.). When configuring SPS in any direction either UL or DL, SPS C-RNTI is mandatorily provided by the eNB. Soon after the UE is configured with SPS C-RNTI, the UE is configured by higher layers to decode PDCCH with CRC scrambled by the SPS C-RNTI. A UE may monitor PDCCH with CRC scrambled by the SPS C-RNTI in every subframe as the eNB can activate/re-activate/release SPS at any time using downlink control information (DCI).

In some embodiments, for an SL transmission mode 1 and PSCCH period i, the UE transmit power $P_{PSSCH}$ for PSSCH transmission is given by $P_{SSCH}=P_{CMAX,PSSCH}$ if the TPC command field in configured SL grant for PSCCH period i is set to 0. In some embodiments, for an SL transmission mode 1 and PSCCH period i, the UE transmit power $P_{PSSCH}$ for PSSCH transmission is given by $P_{PSSCH}=\min\{P_{CMAX,PSSCH}, 10\log_{10}(M_{PSSCH})+P_{O\_PSSCH,1}+\alpha_{PSSCH,1}\cdot PL\}$ [dBm] if the TPC command field in configured SL grant for PSCCH period i is set to 1. In such embodiments, $P_{CMAX,PSSCH}$ is the maximum transmit power and PSSCH is the bandwidth of the PSSCH resource assignment expressed in number of resource blocks and $PL=PL_c$ where $PL_c$ is the path loss. $P_{O\_PSSCH,1}$ and $\alpha_{PSSCH,1}$ are provided by higher layer parameters p0-r12 and alpha-r12, respectively and that are associated with the corresponding PSSCH resource configuration.

For an SL transmission mode 2, the UE transmit power $P_{PSSCH}$ for PSSCH transmission is given by $$P_{PSSCH}=\min\{P_{CMAX,PSSCH}, 10\log_{10}(M_{PSSCH})+P_{O\_PSSCH,2}+\alpha_{PSSCH,2}\cdot PL\} \text{ [dBm]}$$

where, $P_{O\_PSSCH,2}$ and $\alpha_{PSSCH,2}$ are provided by higher layer parameter p0-r12 and alpha-r12, respectively and that are associated with the corresponding PSSCH resource configuration.

In some embodiments, for a SL transmission mode 1 and PSCCH period i, the UE transmit power $P_{PSCCH}$ for PSCCH transmission is given by $P_{PSCCH}=P_{CMAX,PSCCH}$ if the TPC command field in the configured SL grant for PSCCH period i is set to 0. In some embodiments, for a SL transmission mode 1 and PSCCH period i, the UE transmit power $P_{PSCCH}$ for PSCCH transmission is given by $$P_{PSSCH}=\min\{P_{CMAX,PSSCH}, 10\log_{10}(M_{PSSCH})+P_{O\_PSSCH,1}+\alpha_{PSSCH,1}\cdot PL\} \text{ [dBm]}$$

where if the TPC command field in the configured SL grant for PSCCH period i is set to 1, $P_{CMAX,PSCCH}$ is the maximum transmit power for the control channel and $M_{PSCCH}=1$ and $PL=PL_c$ is the path loss. $P_{O\_PSCCH,1}$ and $\alpha_{PSCCH,1}$ are provided by higher layer parameters p0-r12 and alpha-r12, respectively and are associated with the corresponding PSCCH resource configuration.

For SL transmission mode 2, the UE transmit power P PSCCH for PSCCH transmission is given by $$P_{PSSCH}=\min\{P_{CMAX,PSSCH}, 10\log_{10}(M_{PSSCH})+P_{O\_PSSCH,2}+\alpha_{PSSCH,2}\cdot PL\} \text{ [dBm]}$$

where $P_{CMAX,PSCCH}$ is the $P_{CMAX,c}$ configured by higher layers and $M_{PSCCH}=1$. $P_{O\_PSCCH,2}$ and $\alpha_{PSCCH,2}$ are provided by higher layer parameters p0-r12 and alpha-r12, respectively and are associated with the corresponding PSCCH resource configuration.

There is a need to enhance the collision avoidance mechanism for V2V communications for some reasons. In one example, there is a requirement for V2X communication that for particular usage (i.e., pre-crash sensing) only, the E-UTRA(N) should be capable of transferring V2X messages between two UEs supporting V2V Service with a maximum latency of 20 msec. There is also a requirement that the 3GPP network may be able to provide means to prioritize transmission of V2X messages according to their type (e.g. safety vs. non-safety). These stringent requirements for safety messages may be considered for enhancing the collision avoidance mechanism.

In another example, there is a requirement for V2X communication that the E-UTRA(N) may be able to support a high density of UEs supporting V2X Service. When the number of transmitting UEs in Mode 2 operation is beyond 2 or 3 times the number of resources, the average resource collision probability can be over 90% using existing D2D techniques. Hence, reducing collisions in Mode 2 operation is important for V2V communication. In D2D, collision avoidance was performed by randomization of resource selection. However, this is not sufficient for V2V and sensing mechanisms need to be introduced.

In existing D2D techniques, the main purpose was to reduce the D2D interference on the cellular link. It can be re-used for LTE-V2X if V2V transmission using shared carrier with cellular transmission. However, even if a dedicated carrier is used for V2V, power control may still be necessary for V2X to mitigate interference and minimize collisions. When sensing is performed based on energy, transmit power of other UEs may also need to be accounted for in the sensing procedure.

The frequency band for V2V communication can be shared between cellular-based V2V and DSRC (for example, at 5.9 GHz). In this case, it is important to detect and co-exist with existing DSRC transmissions to avoid collisions between DSRC and cellular-based V2V communication.

In one embodiment, the scheduling assignment (SA) pool resources are scanned first before transmission to determine which of the SA and data pool resources are currently being used. The SA scan provides the information about the SA and data pool resources used by the UE, including the time and frequency resources and the persistence time for which this allocation (allocation period) (if semi-persistent) is valid. If the SA scan of the other UE transmissions is decoded successfully, those SA and data resources are avoided for use of transmission until the allocation period expires.

In one embodiment, the resource pools are separated for mode 1 and mode 2 operation such that there is no overlap in resources. This can be one method to limit resource collision. In this case, at least the devices operating in mode 1 can be efficiently scheduled by the eNodeB and the collision is limited to the pool supporting mode 2 devices. This assumes sufficient resources exist to support separate pools for mode 1 and mode 2 devices. Furthermore, one or more reserved pools are defined separately for event triggered messages due to the requirements for higher reliability and lower latency, where more care is taken to minimize collisions by providing more resources or having multiple such pools, for example.

Figure 7:
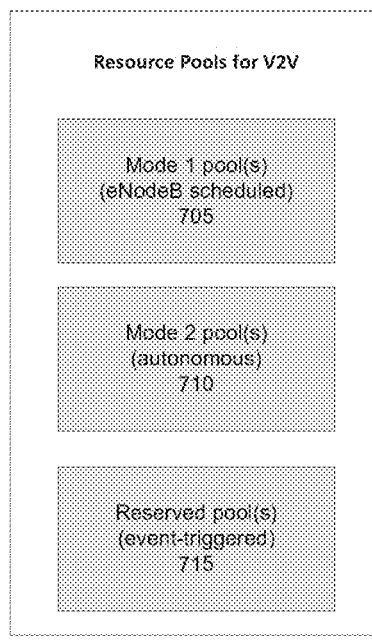
FIG. 7 illustrates an example resource pools for several modes and traffics according to embodiments of the present disclosure.

FIG. 7 illustrates an example resource pool for several modes and traffic types 700 according to embodiments of the present disclosure. An embodiment of the resource pool for several modes and traffic types 700 in FIG. 7 is for illustration only. Other embodiments may be used without departing from the scope of the present disclosure.

As shown in FIG. 7, the resource pool comprises a mode 1 pool(s) 705, a mode 2 pool(s) 710, and a reserved pool(s) 715. More specifically, FIG. 7 represents an example of the resource pools being categorized for mode 1, mode 2 and event triggered traffic operation, each of which has separate resources.

In one embodiment, the resource pools could be transmission pools or reception pools. A common reception pool could also be utilized assuming the same message formats are utilized for both mode 1 and mode 2.

In one embodiment, a mode 2 operation is performed under network assistance. The eNodeB may configure certain vehicles in the network to operate under mode 2 if mode 1 resources are not available. Furthermore, for vehicles that have just entered the cell from neighboring cells, mode 2 autonomous allocations may be used until the network provides a mode 1 configuration for the device.

In such cases, it may be beneficial to support mode 2 operations with network assistance to minimize collisions. Semi-persistent scheduling for CAM messages not only minimizes control overhead but also minimizes collisions for control. The UE operating under Mode 2 can request the eNodeB to provide a list of known resources (SA and/or data) being used. The resource list transmission can also be initiated by the eNodeB, as an alternative option. Furthermore, instead of sending a list of known resources that are used, a list of unused resources could be transmitted by the eNodeB.

The UE filters the potentially available resources based on this list. The UE can further scan the resources of other UEs in the resource pool for additional filtering. The UE makes a decision for the resource selection based on the result of the scan and the list provided by the eNodeB. Thus the list of resource choices for transmission is restricted in this approach to reduce the collision probability. The UE can also report the UE's used resources to the eNodeB. If none of the identified resources are available, the UE can request the eNodeB for any updated list and does not transmit anything until it has found a suitable re-assignment after a re-scan. The eNodeB can also request the UE to provide a scan report for all resources, which it can use for informing other Mode 2 devices under network assistance and to guide MCS and transmit power setting for the UE.

Figure 8:
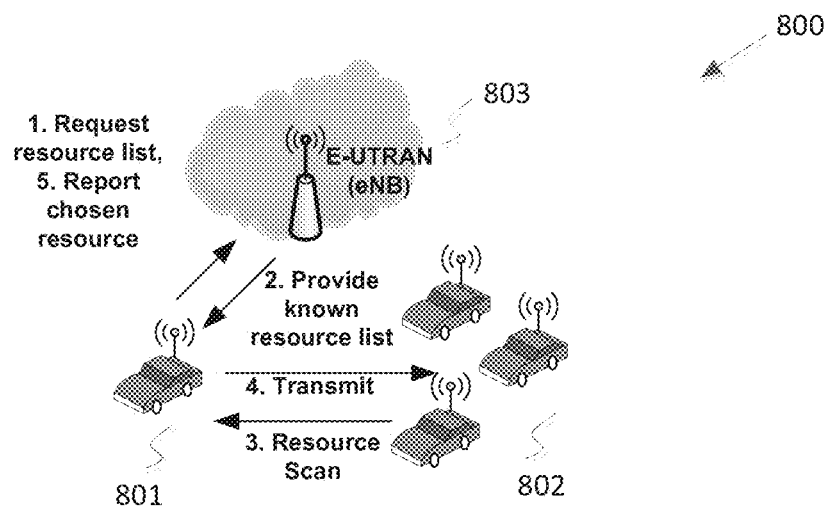
FIG. 8 illustrates an example procedure for a mode 2 operation with network assistance according to embodiments of the present disclosure.

FIG. 8 illustrates an example procedure for a mode 2 operation with network assistance according to embodiments of the present disclosure. An embodiment of the procedure for the mode 2 operation with network assistance shown in FIG. 8 is for illustration only. Other embodiments may be used without departing from the scope of the present disclosure. As shown FIG. 8, the network 800 comprises a UE 801, a plurality of UEs 802, and an E-UTRAN (e.g., eNB) 803.

The UE 801 in Mode 2 requests a resource list from the eNodeB 803. The eNodeB 503 provides a list of known resources. The UE 801 filters its choices of transmission based on this list. The UE 801 may additionally scan the resource transmissions from neighboring UEs 802 to filter its choices further. The UE 801 then randomly selects resources for its operation out of the remaining options. The UE 801 may then inform the eNodeB 803 of the UE 801's selected choice of resources for helping it inform other Mode 2 devices requesting network assistance for collision avoidance.

For such safety or event triggered messages, reading resources of other UEs or requesting a resource utilization list from the eNodeB is not an option. Ideally, a separate pool is to be used for safety messages, which is designed with enough provisioning to minimize collisions. In this case, reading the SA does not help as there will not be any further transmission soon since the event has already occurred. Also, the UE cannot wait to request a list from the eNodeB and take action in this case. The UE sends these event triggered messages at maximum power at lowest MCS in this case to guarantee reception (coverage). The resources of the transmissions in the SA can be randomized and it can be repeated multiple times as well to minimize collision (interference). It is assumed not all UEs will send an emergency message at the same time—i.e. such messages are not relayed over multiple hops. This reserved pool can made common to all UEs for transmitting and receiving emergency messages.

In one embodiment, a Mode 2 operation is supported without network support. For mode 2 operation without network support, the UE has to make autonomous decisions for collision avoidance. In this case, UE scans all available resources autonomously before transmissions and picks unused resources to use. For CAM messages, once a transmission choice is made for the resources, it is kept semi-persistent. This helps the resource pool allocation be stable for scanning and resource selection by UEs in mode 2 operation. The UE can continue to scan the pool during this period and if it sees a change in the pool (for example, one UE in the pool has stopped transmitting its allocated resources); the UE can trigger a re-selection. If the UE is able to identify that no free resources are available for transmission based on the resource scan, the UE defers transmission and waits until the end of the transmission period to evaluate the resources again for any open positions for transmitting its message.

Figure 9:
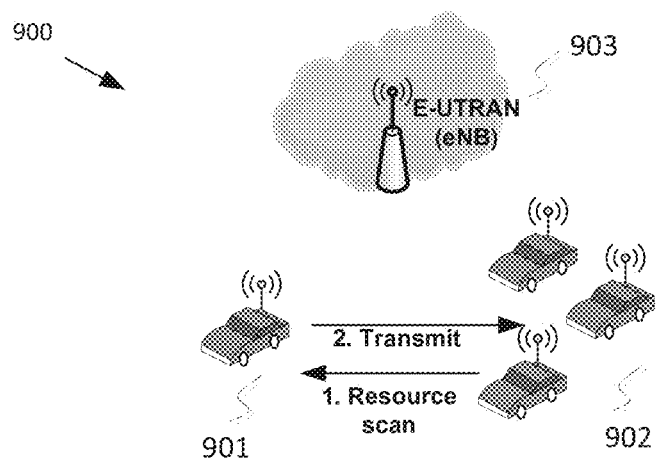
FIG. 9 illustrates an example procedure for a mode 2 operation without network assistance according to embodiments of the present disclosure.

FIG. 9 illustrates an example procedure for a mode 2 operation without network assistance 900 according to embodiments of the present disclosure. An embodiment of the procedures for the mode 2 operation without network assistance 900 shown in FIG. 9 is for illustration only. Other embodiments may be used without departing from the scope of the present disclosure. As shown in FIG. 9, the procedure 900 comprises a UE 901, a plurality of UEs 902, and an E-UTRAN (e.g., eNB) 903.

The UE 901 first scans the resource pool for transmissions from neighboring UEs 902. This resource pool may be pre-configured by the eNodeB 903 for operation. On determining a set of available resources, the UE 901 randomly selects resources out of the available choices and transmits its SA and/or data.

As discussed in mode 2 operation aforementioned with network support, the procedure for event triggered messages is different where sensing the resources of other users is not beneficial. In this case, the UE autonomously selects resources from a separate pool randomly and the UE can be repeated multiple times as well to minimize collision.

In one embodiment, the MCS and transmit power is adjusted for collision avoidance. In mode 2 operation with network assistance, the eNodeB can set the MCS and transmit power based on its view of the network to minimize collision avoidance. In mode 2 operation without network assistance, when a pool is scanned, if there is no existing UE in the pool, the UE assumes there are no resources used by any other UEs.

In this case, the UE can transmit at a high power (as allowed by the power control setting for transmission) and lowest MCS (open loop). If the transmit power is already at maximum level, the MCS can be further decreased in this case. If there are existing UEs in the pool, the UE can derive a path loss estimate to each UE based on the received RSRP/RSSI measurements from the users in the pool. This can be averaged and used to set the transmit power.

Figure 10:
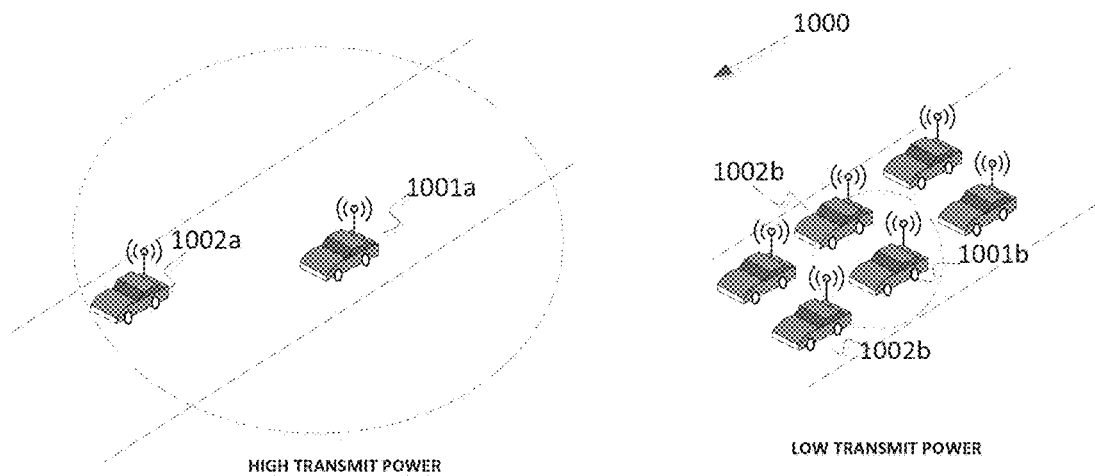
FIG. 10 illustrates an example transmission power adaptation based on traffic conditions according to embodiments of the present disclosure.

FIG. 10 illustrates an example transmission power adaptation 1000 based on traffic conditions according to embodiments of the present disclosure. An embodiment of the transmission power adaptation 1000 based on traffic conditions in FIG. 10 is for illustration only. Other embodiments may be used without departing from the scope of the present disclosure.

As shown in FIG. 10, the transmission power adaptation 1000 comprises a UE 1001a, a UE 1002a in a high transmission power, and a plurality of UEs 1002a and a plurality of UEs 1002b. It would be beneficial to adapt the transmission power based on traffic conditions as shown in FIG. 10.

When the traffic density is higher, the transmission range may be reduced to minimize collisions and have greater re-use of resource pools. As shown in FIG. 10, when the distance between the transmitting UE 1001 and receiving UE(s) 1002 is large, the transmit power can be high to maintain coverage. However, when the distance is small, the transmit power may be reduced to minimize collisions. The traffic conditions can be inferred in multiple ways. In mode 1 operation, for example, the eNodeB can have knowledge of the traffic condition in a given area and indicates to the transmitting UE to reduce the transmit power in case of significant traffic. In mode 2 operation, the transmitting UE can scan the SA of other UEs and estimate the approximate path loss based on RSRP/RSSI measurements. It can accordingly adjust its transmission power based on an average of the estimated path loss from multiple UEs observed from the scan.

The mechanism to calculate RSRP for every UE data transmission is not available for an SL. To estimate the path loss from each transmitting UE, one cannot use the SL RSRP (S-RSRP) based on the PSBCH since as the received PSBCH may be a combined signal from multiple UEs and may not be uniquely identified within a cell. Other reference signals such as DMRS from the SA cannot be used as well since those reference signals may be transmitted at variable power.

In one embodiment, a power setting information is communicated in the SA to indicate the transmit power used. On decoding the SA, one can figure out the reference transmit power used—from which the path loss can be estimated for power adjustment. This power setting can be indicated by using a few bits in the SCI format, for example. For example, 5 bits in the SCI format sent in the SA can be used to indicate the power setting, where '00000' can represent muting and '11111' can represent max transmit power that is configured by the eNodeB.

The power setting can also be indicated as an absolute value indication (e.g. dBm) or as an offset from a fixed value. This fixed value can be configured by higher layers or can be indicated by the PSBCH. It may not be accurate to use all SA transmissions for RSRP but use only those who are observed in the current SA pool of the transmitting UE. Based on these measurements from multiple UEs observed from the SA scan, an average SA-RSRP can be calculated and the transmit power can be computed as a backoff from the maximum transmission power. The minimum SA-RSRP can also be used if it is desired to communicate with every UE which was observed from the scan. If there are no UEs reported from the SA scan, the maximum transmission power can be used.

In one embodiment, the path loss for the power adjustment is achieved based on the transmission of a known reference signal with a fixed transmit power. A new reference signal with a fixed transmit power can be used for RSRP measurement on a UE-specific basis for SL, which can be denoted as SA-RSRP. The new reference signal can be sent in a sub-frame after every PSBCH transmission.

Since SL and V2V can share the same resources with uplink, there may be collisions in mode 1 operation if the V2V UE cannot distinguish which resources are to be used for SL vs. V2V. The sub-frame bitmap used in the current resource assignments in D2D Rel-12 currently only distinguishes PC5 and UL resources.

In one embodiment, a separate bitmap (V2V subframe bitmap) is used to indicate which resources are to be used for V2V communication to distinguish from the SL D2D bitmap. The eNodeB communicates both V2V and D2D bitmaps to the UE in its allocation using the DCI format. As an alternative approach, the current 1-bit bitmap for D2D can carry an additional bit to distinguish from V2V communication. TABLE 3 shows an example mapping between the subframe bitmap and the assignments for uplink, sidelink (D2D) and sidelink (V2V).

TABLE 3

| Bitmap assignment | Communication |
| --- | --- |
| 00 | Uplink |
| 01 | Sidelink (PC5) |
| 10 | Sidelink (V2V) |
| 11 | reserved |

Figure 11:
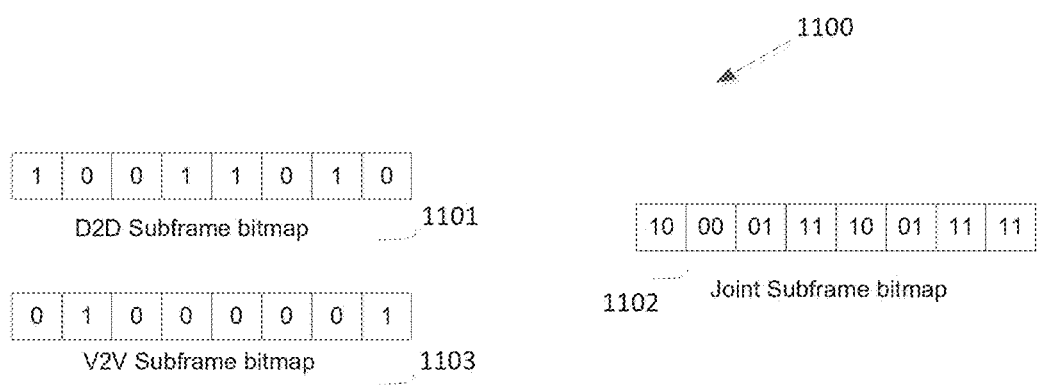
FIG. 11 illustrates an example device-to-device (D2D) and vehicle-to-vehicle (V2V) subframes according to embodiments of the present disclosure.

FIG. 11 illustrates an example device-to-device (D2D) and vehicle-to-vehicle (V2V) subframes 1100 according to embodiments of the present disclosure. An embodiment of the D2D and V2V subframes 1100 shown in FIG. 11 is for illustration only. Other embodiments may be used without departing from the scope of the present disclosure.

As shown in FIG. 11, subframes 1100 comprise D2D and V2V subframes 1101 and 1103 and a set of joint subframe bitmap 1102. The option of D2D subframe 1101 shows the use of separate bitmaps for V2V and D2D subframes, where 0 is used to determine UL and 1 is used to determine V2V and D2D, depending on the bitmap. In option 1102, the bitmaps are put together and used according to TABLE 3.

In some embodiments of sensing based on SA scan (PSCCH decoding) of other UEs, the locations of the SA transmissions are assumed to be known and decodable by all UEs (e.g., blind decoding could be used, if required). If the SA of another UE is decoded successfully, the transmitting UE has guaranteed knowledge of future SA and data transmissions and resource utilization of that UE. Since there is a restriction on number of PSCCHs in a subframe, the complexity of this decoding is not significant. Successful decoding of the SA of all interfering UEs may be difficult under high interference (low SINR), which can occur in dense traffic scenarios.

In some embodiments of energy based sensing, the energy sensing is performed in the frequency domain. An energy threshold is used to identify available resources for transmission. The assumption for energy based sensing is that the resource occupancy does not change for future transmissions i.e. resources that are observed as idle are likely to remain idle in the future and the next transmissions from other UEs will use the same resources used previously. The result may not be highly reliable esp. at low SNR and high mobility scenarios, but may provide acceptable values of probabilities of misdetection and false alarm, in certain conditions.

In such embodiments, aforementioned sensing techniques are complementary and need not be used on an exclusive manner.

Figure 12:
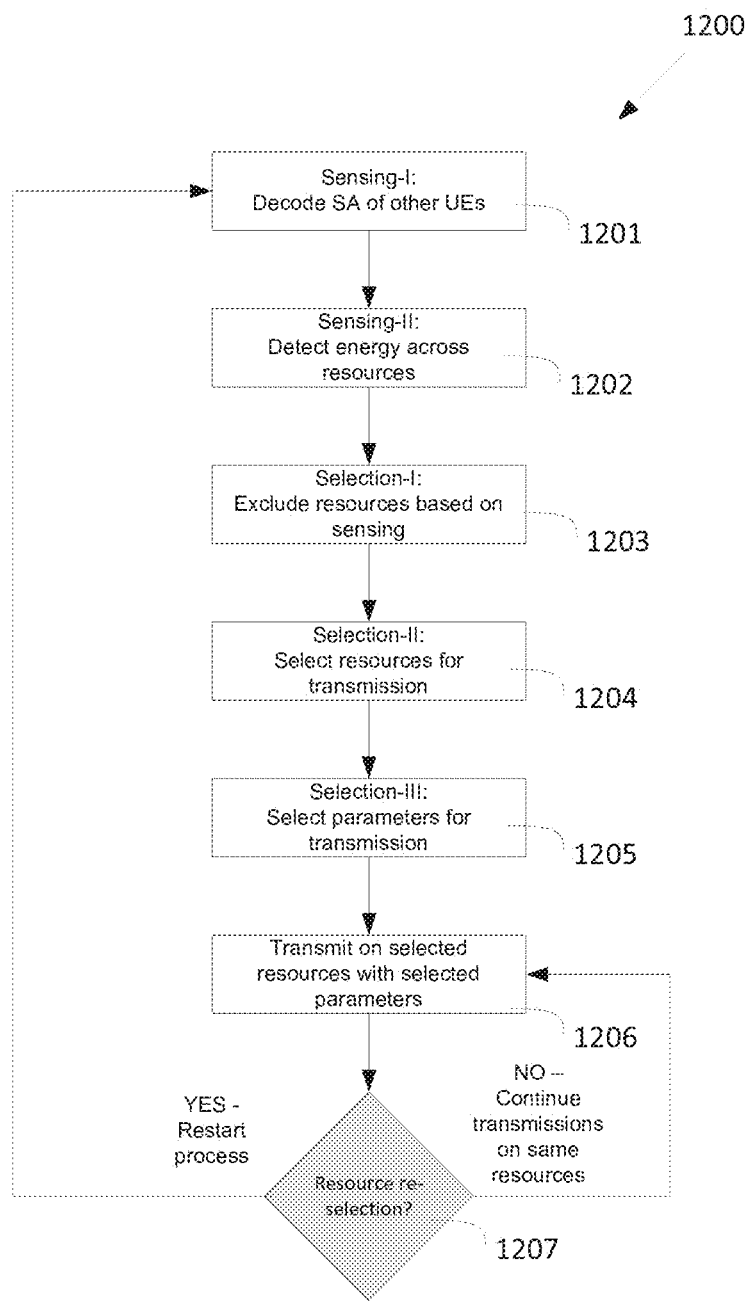
FIG. 12 illustrates an example collision avoidance method according to embodiments of the present disclosure.

FIG. 12 illustrates an example collision avoidance method 1200 according to embodiments of the present disclosure. An embodiment of the collision avoidance method 1200 shown in FIG. 12 is for illustration only. Other embodiments may be used without departing from the scope of the present disclosure. For example, the collision avoidance method 1200 may be performed by a UE, such as for example, the UE 116 in FIG. 3.

As shown in FIG. 12, the collision avoidance method 1200 begins at step 1201. At step 1201, the UE performs sensing-I operation including decoded SA of other UEs. The UE performs step 1202, at step 1202, the UE performs sensing-II operation including detecting energy across resources. At step 1203, the UE performs selection-I excluding resources based on sensing. At step 1204, the UE performs selectin-II selecting parameters for transmission. Finally, the UE transmits on selected resources with selected parameters at step 1206. At step 1207, if the resource is reselected, the UE performs step 1201. If the resource is not selected at step 1207, the UE performs step 1206.

More specifically, at step 1201, the UE first attempts to decode the SA (PSCCH) of other UEs to figure out the resources that may be used in future transmissions by other UEs. However, it is possible that in certain scenarios, such as high interference, the SA may not be decodable. These cases can be indicated by reception of high energy in the SA resources but unsuccessful decoding of the SA. In such cases, the UE can perform energy sensing across all resources in step 902 to investigate potential SA and data transmissions. Thus, both SA decoding and energy measurement can be supported for sensing in UE autonomous resource selection.

Based on the sensing results from SA decoding and/or energy sensing, the UE makes a decision in step 1203 on the resources that need to be excluded in the transmission. Thus, a UE identifies the resources that will be occupied and/or collided by the other UEs and avoids a colliding resource allocation for its transmission. Based on the remaining resources available for transmission, the UE then selects the resources to be used for transmission in step 1204.

The UE then selects the transmission parameters such as transmit power, MCS, semi-persistent transmission related parameters such as next transmission interval etc. in step 1205 and transmits in the selected resources with the selected transmission parameters in step 1206. The UE finally makes a decision whether to continue this transmission on the selected resources or re-start the process for a new transmission in step 1207.

SA transmissions from each UE may use a limited number of PRBs. To uniquely identify SA power, high resolution sensing (e.g., accurate energy measurement at every PRB) may be performed. Since SA and data can be multiplexed in the same subframe, the SA transmission power can be different among different UEs, and UEs in proximity of the transmitting UE can have lower transmit power than UEs that are further away which need not communicate to the transmitting UE. Data transmissions from each UE may use a group of PRBs (e.g., RB groups) and hence can use a coarser resolution for sensing. However, this comes at an expense of losing the flexibility of fine resource allocation in the frequency domain.

To adjust for transmit power variations between different UEs, an indication of the transmit power for SA and/or data (either total power or per RB group) in the SCI transmissions for energy sensing may be performed, for example, a field in the SCI is used to indicate the transmit power. The energy sensing results are then adjusted based on the transmit power offset per RB group. Note that only relative transmit power differences are needed for the adjustment.

In one embodiment, the transmit power for the SA is fixed since the transmit power may need to have a long communication range, irrespective of the data transmission range.

Hence, only the data transmission power needs to be indicated in this case. When a transport block (TB) is fragmented and transmitted over multiple sub-frames and RB groups, it is assumed that the transmit power per RB group is the same. Hence, reporting the transmit power per RB group in SCI may be sufficient in this case.

Assuming the energy sensing results for each RB group are G(k) and let P(k) is the transmit power assigned per RB group obtained from decoding the SA from different UEs, the RBs, where no UE transmissions were identified, are assigned to a constant value such as the maximum transmit power per RB group. Then, the normalized energy sensing results S(k)=G(k)−P(k), where S(k), G(k) and P(k) are in dB scale.

Figure 13:
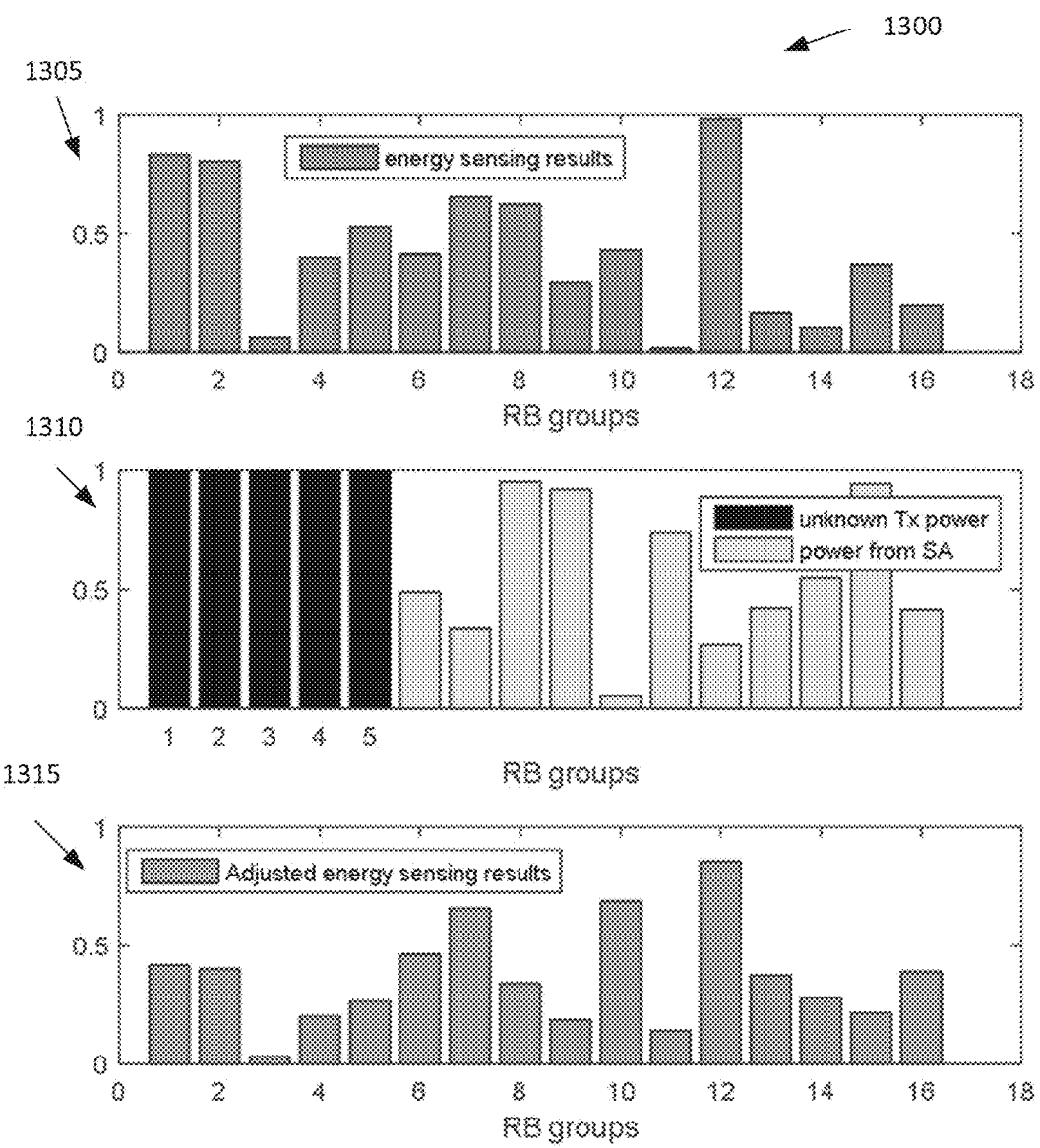
FIG. 13 illustrates an example adjustment of power sensing result with transmit power according to embodiments of the present disclosure.

FIG. 13 illustrates an example adjustment of power sensing results 1300 with transmit power according to embodiments of the present disclosure. An embodiment of the adjustment of power sensing results 1300 with transmits power shown in FIG. 13 is for illustration only. Other embodiments may be used without departing from the scope of the present disclosure. As shown in FIG. 13, the adjustment of power sensing results 1300 comprises an energy sensing result 1305, unknown TX power and power from SA 1310, and adjusted energy sensing results 1315.

The raw energy sensing results (all plots are shown normalized) are adjusted based on the transmit power used based on the decoding of the SA.

Figure 14:
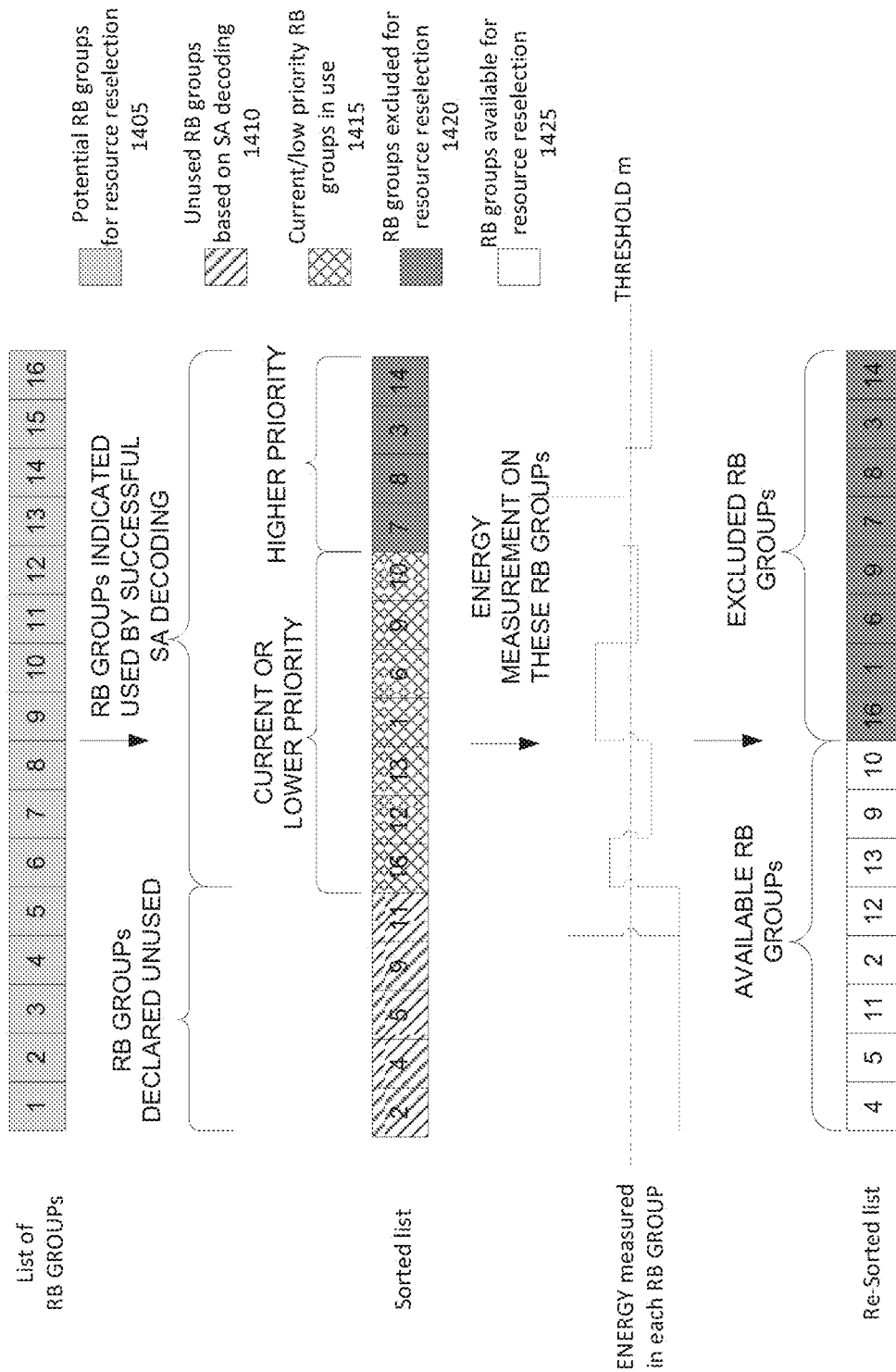
FIG. 14 illustrates an example method for sensing based on scheduling assignment (SA) decoding and energy measurement according to embodiments of the present disclosure.

FIG. 14 illustrates an example procedure for sensing based on scheduling assignment (SA) decoding and energy measurement according to embodiments of the present disclosure. An embodiment of the method for sensing based on SA decoding and energy measurement shown in FIG. 14 is for illustration only. Other embodiments may be used without departing from the scope of the present disclosure.

As shown in FIG. 14, the procedure for sensing comprises identifying and ordering potential RB groups for resource reselection 1405, unused RB groups based on SA decoding 1410, current and low priority RB groups in use 1415, RB groups excluded for resource reselection 1420, and BR groups available for resource reselection 1425.

A list of potential data resources in RB groups for resource reselection 1405 is identified for resource selection, where each RB group is the minimum number of RBs used for data transmission, for example, all resources are considered available at the beginning. The transmitting UE performs blind decoding on SA resources of other UEs to investigate which of the potential RB groups are in use. The RB groups indicated by successful decodes of PSCCH of other UEs are first prioritized.

Any resources indicating being used by UEs transmitting higher priority traffic may be first excluded for transmission by low priority users. This implies that packets with different priorities can be transmitted on the same resource pool. The priority indication in the SCI can be determined based on different scrambling, for example, for low and high priority traffic or can be explicitly indicated. Energy based sensing is then performed on the remaining potential RB groups and the RB groups are sorted again based on the energy measurement.

UE compares the energy on the currently selected resource with the energy of the resources in the subset. If the energy in a RB group exceeds a threshold m, those RBs are identified as unavailable. The transmitting UE can then select resources starting from the first RB group identified as available in the sorted list for transmission. Thus, the UE measures and ranks the remaining PSSCH resources based on total received energy and selects a subset. The threshold m can be statically configured by the eNB for operation or can be computed dynamically based on a function of the energy measurement across RB groups.

Since the resources available after excluding occupied resources may be fragmented, a transmission mode for PSSCH that allows multi-cluster transmissions may be considered, where the PSSCH resources can be distributed among the frequency resources in multiple clusters (i.e. non-contiguous). This can allow better utilization of resources in situations, where contiguous resource allocation is not available for transmission. It is possible that limits be placed on the number of clusters to minimize maximum power reduction (MPR) issues.

Once available resources are identified and if the amount of resources needed is less than those available, multiple methods are available for resource re-selection. In one example, if all resources identified have equal weight for reselection, the resources are chosen randomly among available resources. In another example, if resources identified have some priority for reselection, the resources are chosen which have least interference for transmission. In yet another example, if the amount of resources available for transmission in a single sub-frame is not sufficient, the transmitting UE can create multiple TBs across multiple sub-frames that make use of available resources.

Once available resources are identified and if the amount of resources needed is less than those available in a contiguous manner, multiple methods are available for resource re-selection. In one example, if all resources identified have equal weight for reselection, the resources are chosen randomly among available resources. In yet another example, if all resources identified have equal weight for reselection, the resources are chosen to be contiguous to an existing transmission (if present) to minimize resource fragmentation, else resources are selected from one end of the resource pool in frequency. In yet another example, if resources identified have some priority for reselection, the resources are chosen among the contiguous resources which have least interference for transmission. In yet another example, if the amount of contiguous resources available for transmission in a single sub-frame is not sufficient, the transmitting UE can create multiple TBs across multiple sub-frames that make use of contiguous available resources.

In case of sensing periodic traffic with 100 ms or larger period, it is important to perform sensing for multiple transmission durations before triggering resource selection. In case of sensing higher priority traffic, resource reselection may be performed immediately, possibly within for example, 4 subframes of sensing higher priority traffic. Based on these two conditions, the UE at least senses in a window between subframe n-a and subframe n-b to trigger resource selection/reselection, where n is the current subframe where resource selection and/or reselection is triggered. In one example, the parameters a=1000 and b=4 can be used. In another example, a=1000 and b=0 can be used.

All UEs in a given resource pool may use the same sensing window period for the UE's transmissions. This implies that the values 'a' and 'b' are common for V2V UEs and are fixed. Alternately, the parameters a and b can be configured by the eNB (e.g., not fixed). This could be based on the geo location, speed or UE synchronization source. Once the resource reselection is triggered, the UE selects time-frequency resources and transmission parameters for PSSCH transmission. The UE then transmits SA (PSCCH) based on the next available opportunity in subframe n+c to transmit the SA, where c is UE dependent based on its resource availability for transmission of the SA.

The PSSCH is then transmitted in the same or following subframes in subframe n+d. d may be limited in range between subframes $d_{min}$ and $d_{max}$, where $d_{min}=c$ represents same sub-frame transmission and $d_{max}=N+c$ represents transmission within the end of the transmission period (N=100 ms, for e.g.) for PSSCH. The SA/PSCCH also indicates the next potential transmission time at n+e, where $1000+c>e>d_{max}$.

The maximum values of c and d can be restricted further based on priority. For example, c, d≤100 for low priority traffic while c, d≤20 for high priority traffic. e could be offset from d in a multiple of period P (e.g., 100 ms). $e=k*P_{min}+d$, where k can be an integer in range $\{0, \ldots, 10\}$ i.e. 0≤k≤10, and $P_{min}=100$, for example, is the minimum periodicity interval. k=0 implies there is no future transmission and k=10 represents maximum periodicity (1 second). This indication of the offset (e−d) could be done based on a transmission periodicity field or a next transmission time or inter-TB duration field set in the SCI.

In one embodiment, if this next transmission time field in the SCI is set to 0, it implies that this transmission is not persistent and this resource is not planned to be used in a future transmission interval by the UE. The receiving UE for sensing uses this field to identify the resources being reserved for future transmissions and avoids those resources in the UE's resource allocation and selection procedures. The value 'e−d' can then be indicated in the SCI by 4 bits to represent numbers between 0 and 10. Value 0 can indicate no next transmission (e.g., ending current periodic traffic or aperiodic traffic), Value 1 can indicate next transmission is at 100 ms, and Value 10 indicates next transmission is at 1 sec. Values 11-15 can be reserved.

Receiver UE assumes that the traffic may be semi-persistent with periodicity indicated by e-d. If the transmitting UE changes the value indicated in e-d, the receiver UE can re-evaluate and adjust the UE's resource allocation, if necessary.

Figure 15:
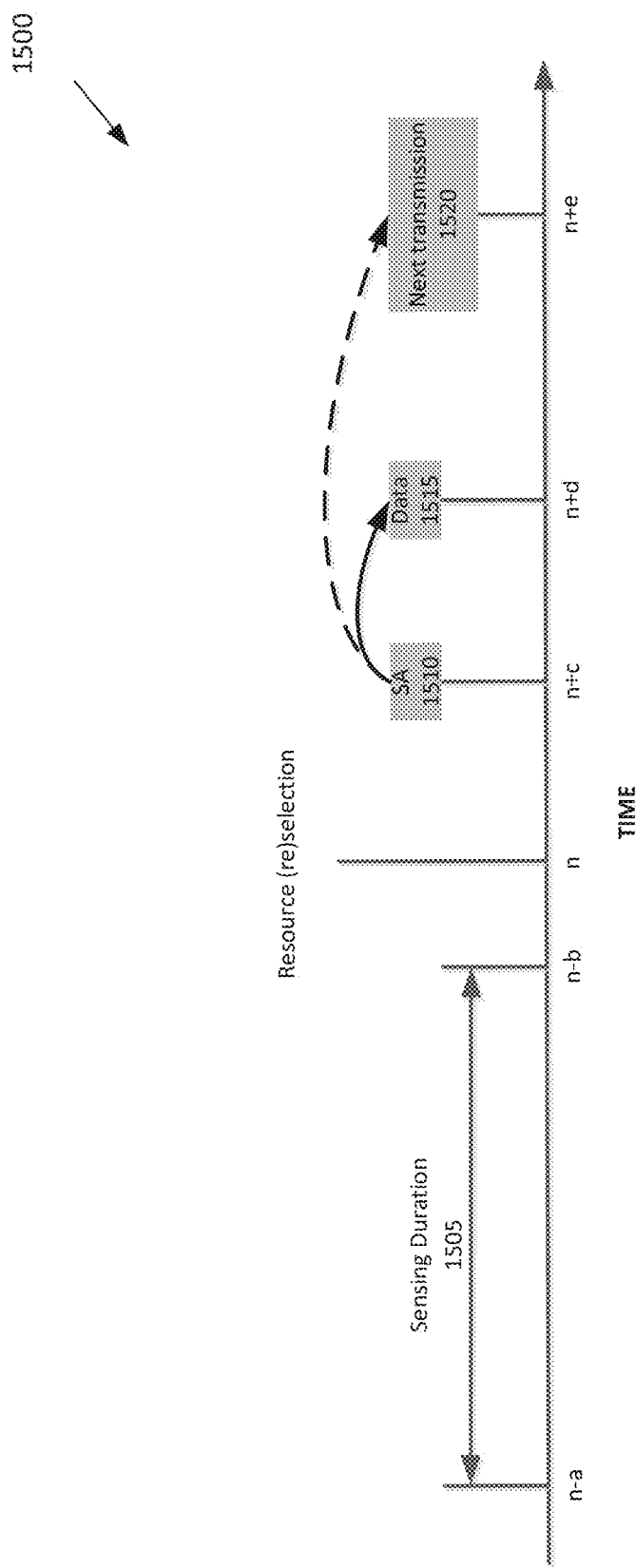
FIG. 15 illustrates an example sensing duration according to embodiments of the present disclosure.

FIG. 15 illustrates an example sensing duration 1500 according to embodiments of the present disclosure. An embodiment of the sensing duration 1500 shown in FIG. 15 is for illustration only. Other embodiments may be used without departing from the scope of the present disclosure. As shown in FIG. 15, the sensing duration 1500 comprises a sensing duration 1505, an SA 1510, data 1515, and a net transmission 1520. Based on sensing across a window, a resource availability map can be identified for future transmissions.

Figure 16:
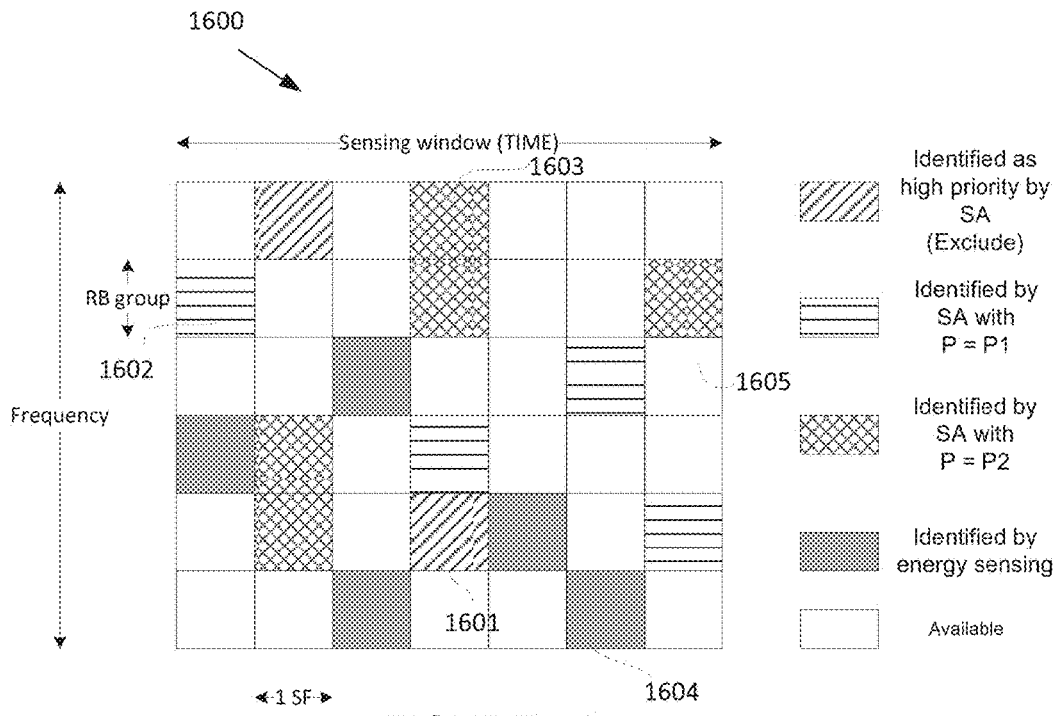
FIG. 16 illustrates an example sensing result in different subframes (SF) according to embodiments of the present disclosure.

FIG. 16 illustrates an example sensing results 1600 in different subframes (SF) according to embodiments of the present disclosure. An embodiment of the sensing results 1600 in different SF shown in FIG. 16 is for illustration only. Other embodiments may be used without departing from the scope of the present disclosure.

As shown in FIG. 16, the sensing results 1600 comprises a group of RBs 1601, resources 1602 and 1603, used resources 1604, and remaining resources 1605. The group of RBs 1601 is identified as high priority transmissions, which are excluded from resource reselection. For resources, identified by SA decoding, the periodicity can be determined from their SCI transmissions. For example, the resources 1602 may have periodicity of P1=100 ms, while the resources 1603 may have a different periodicity of P2=300 ms. In addition, there may be resources 1604 identified as used based on energy sensing. The remaining resources 1605 are considered as available based on the sensing results.

If a sub-frame m is skipped for sensing by a UE, for any reason, due to the UE's own transmission in that subframe, resource selection in subframes at $m+k*P_{min}$, where k is an integer and k>0 and $P_{min}=100$, may be avoided until a sensing operation is performed in the future in a sub-frame $m+k*P_{min}$, where k is an integer and k>0. Alternately, this can be expressed in order to select resources for transmission in a future sub-frame 'm', the UE may have performed sensing in all of the sub-frames "$m-k*P_{min}$", where k is an integer, 1≤k≤10, and $P_{min}=100$.

In some embodiments, the transmitting UE (e.g., vehicle) adjusts the UE's transmission power based on the resources utilization observed by sensing of the occupied resources. Transmit power control in conjunction with sensing can be used in order to limit the communication range and improve probability of detecting the SA of other users.

Figure 17:
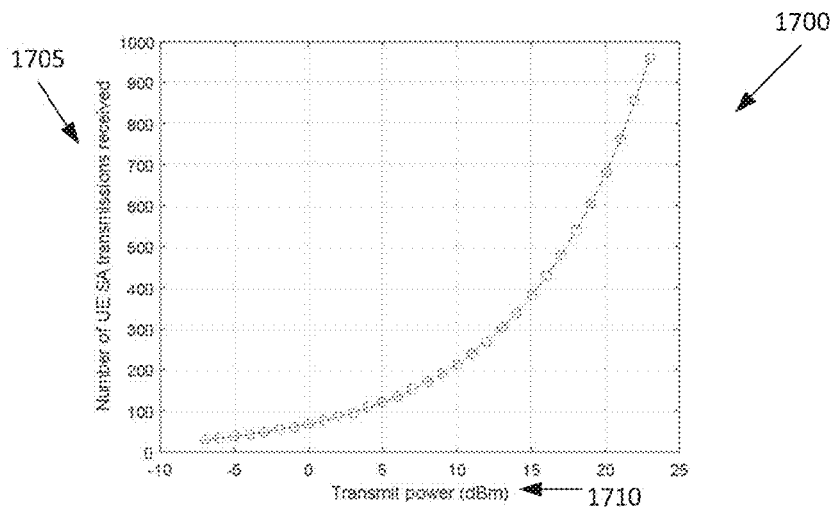
FIG. 17 illustrates an example a number of SA transmission according to embodiments of the present disclosure.

FIG. 17 illustrates an example a number of SA transmission 1700 according to embodiments of the present disclosure. An embodiment of the number of SA transmission 1700 shown in FIG. 17 is for illustration only. Other embodiments may be used without departing from the scope of the present disclosure.

As shown in FIG. 17, the number of SA transmission 1700 comprises a number of UE SA transmissions 1705 and transmit power 1710. More specifically, FIG. 17 shows an illustrative example of the number of SA transmissions received as a function of transmit power for a worst case scenario of a freeway where there is a traffic jam on both directions and all vehicles have stopped (i.e. UE speed=0 km/h).

If there are 6 lanes and the communication range in 320 m for the freeway case when all cars are transmitting at 23 dBm transmit power, and the distance between the centers of 2 cars is 4 m in both front/back and side directions, as shown in FIG. 16, up to 960 cars are supported within communication range of a given UE.

If all 960 cars are going to be broadcasting on SL, there most likely will not be sufficient resources to support all transmissions with exclusive resources, leading to significant collisions and making it difficult for decoding SA of other users. If the transmit power by 30 dB to −7 dBm in this is reduced, the communication range can be reduced to 10 m, which may be sufficient for communicating with ~16 adjacent vehicles as shown in FIG. 4, with a better probability of decoding the SA.

Figure 18:
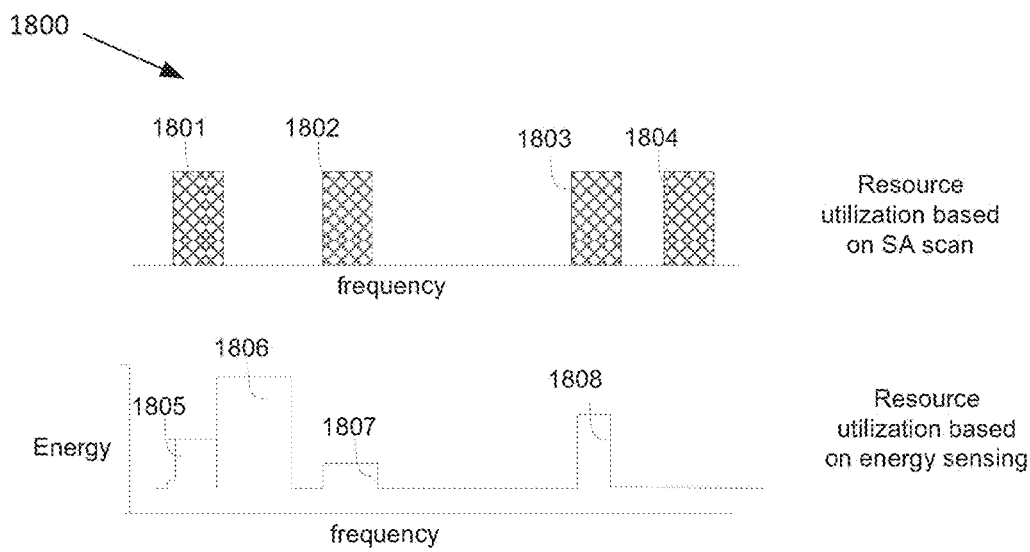
FIG. 18 illustrates an example sensing based on SA scan and energy saving according to embodiments of the present disclosure.

FIG. 18 illustrates an example sensing based on SA scan and energy saving 1800 according to embodiments of the present disclosure. An embodiment of the sensing based on SA scan and energy saving 1800 shown in FIG. 18 is for illustration only. Other embodiments may be used without departing from the scope of the present disclosure.

As shown in FIG. 18, the sensing based on SA scan and energy saving 1800 comprises SA and/or data resource blocks 1801-1804 and resource utilizations 1805-1808. The SA scan indicates the SA and/or data resource blocks 1801-1804 being utilized. The energy sensing shows the resource utilization 1805-1808. The resource 1804 from energy scan got missed in energy sensing due to distance and/or difference between transmit power for SA and data. For example, the SA was received and indicated use of resource 1804 for data but resource 1804 did not show up in energy scan since it was transmitted at much lower power. Also, resource 1806 in energy sensing got missed in SA scan due to collision or interference on that resource.

In one embodiment, the union of SA/data resources indicated by the SA scan and energy sensing may be excluded for transmission. In another embodiment, the resources indicated by the SA scan may be prioritized in the exclusion. In yet another embodiment, the resources exceeding a certain energy threshold may be prioritized in the exclusion. In yet another embodiment, the energy scan can differentiate the resource utilization based on the SA type (e.g. periodic vs. event-triggered messages). The energy scan for periodic messages may show a different response when scanned over time compared to event triggered messages. Resource selection can then be prioritized based on the type of resource (e.g. avoid emergency resources compared to periodic traffic).

Figure 19:
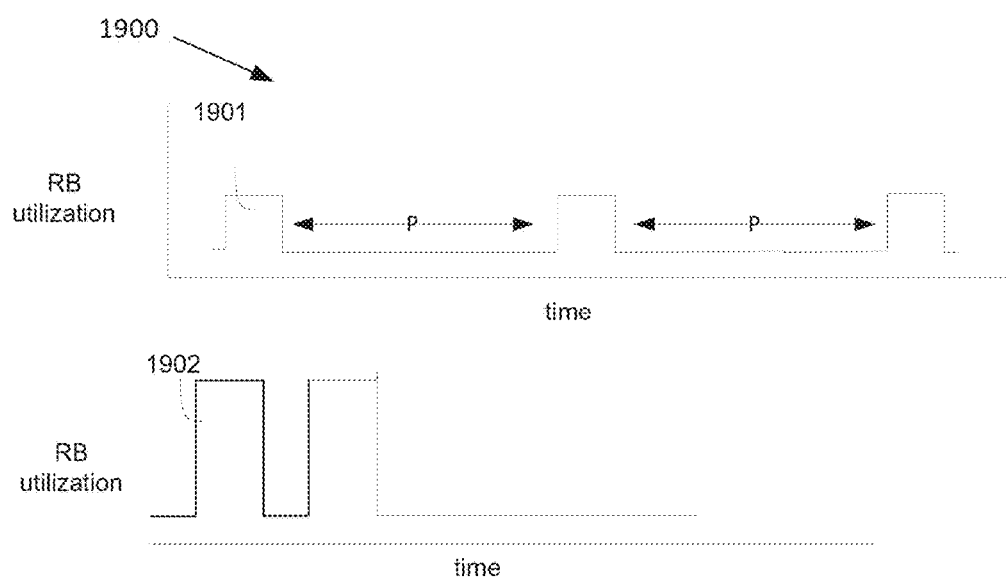
FIG. 19 illustrates an example energy scan on different periodicities and event trigged traffics according to embodiments of the present disclosure.

FIG. 19 illustrates an example energy scan 1900 on different periodicities and event trigged traffic according to embodiments of the present disclosure. An embodiment of the energy scan 1900 on different periodicities and event trigged traffic shown in FIG. 19 is for illustration only. Other embodiments may be used without departing from the scope of the present disclosure.

As shown in FIG. 19, the energy scan 1900 comprises a period traffic 1901 and event triggered traffic transmission 1902. More specifically, the periodic traffic 1901 may show up at regular intervals or multiples of P=100 ms on a resource for example, while the event triggered traffic transmission 1902 may occur in a short bursts with potentially higher transmit power to enable low latency and higher reliability If the sensing implies that there is no vehicle UE occupying any resources, the transmitting UE picks one of the available SA (PSCCH) and data (PSSCH) resources for transmission of its SA and data for the next transmission opportunity. It assumes all resources are available for PSSCH and PSCCH transmission in this case. It transmits at a baseline allowed power according to power control rules for PSSCH and PSCCH. For example, in some cases, this baseline allowed power could be the maximum allowed power for PSSCH and PSCCH. As increased resource utilization is observed based on sensing, the transmitting UE excludes those SA and data resources for the UE's transmissions and lowers the UE's transmit power dynamically for every transmission. The transmit power can be dynamically lowered for example, in steps of 3 dB for every doubling of resources observed in sensing, until the power reaches the minimum value required to maintain a link. This allows greater spatial re-use of resources due to power control.

The dynamic power adjustment for SA and data is done individually irrespective of whether it is time division multiplexing (TDM) or frequency division multiplexing (FDM) multiplexing of SA and data, where the initial transmit power (assuming no other UE is sensed) is set according to power control rules for PSSCH and PSCCH.

Figure 20:
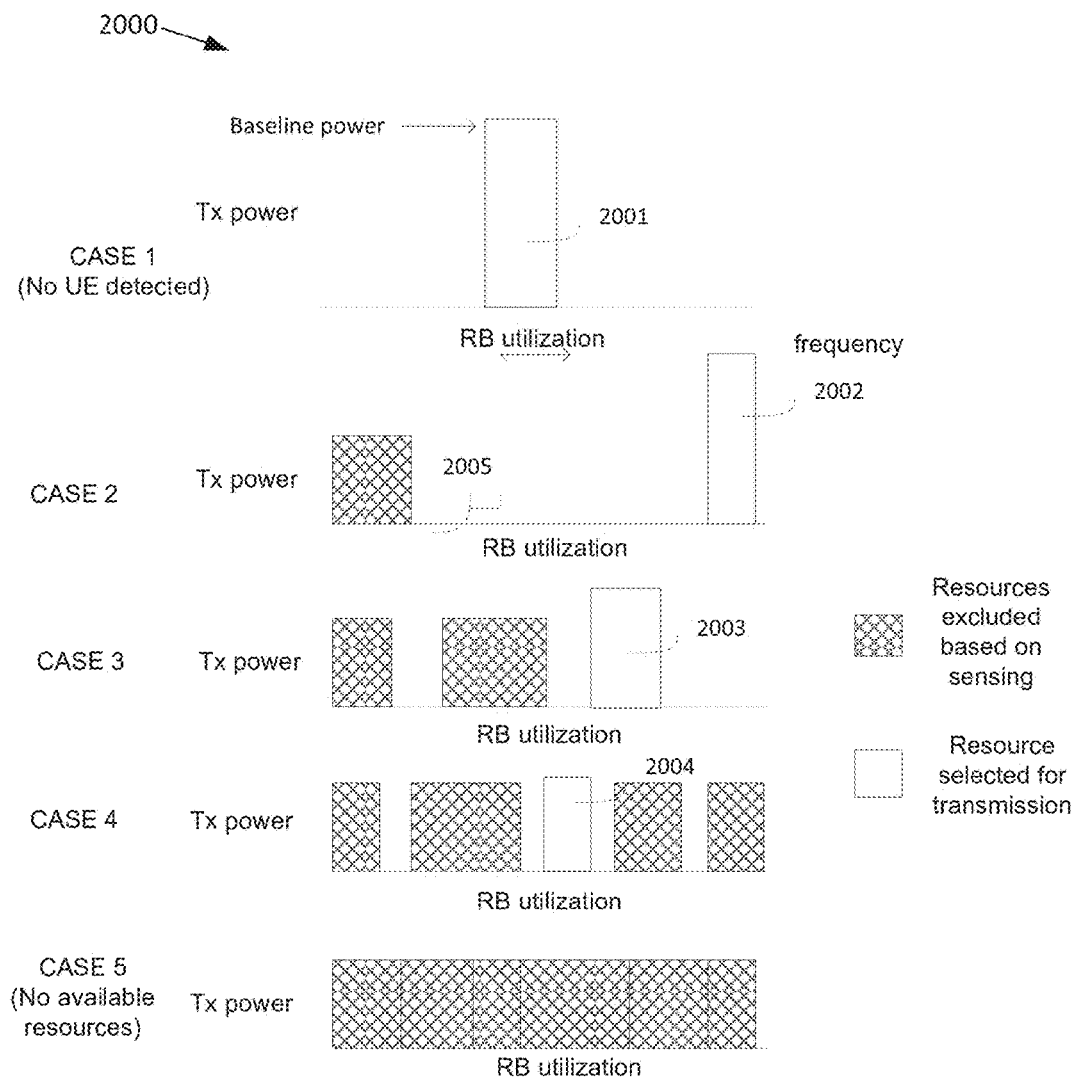
FIG. 20 illustrates an example power adjustment based on sensing results according to embodiments of the present disclosure.

FIG. 20 illustrates an example power adjustment based on sensing results 2000 according to embodiments of the present disclosure. An embodiment of the power adjustment based on sensing results 2000 shown in FIG. 20 is for illustration only. Other embodiments may be used without departing from the scope of the present disclosure.

As shown in FIG. 20, the power adjustments comprises of a data resource block 2001, transmit powers 2002, 2003, 2004, and occupied resource block 2005. In case 1, the sensing does not show any UE occupancy. In this case, the transmitting UE picks one of the available SA and data resource blocks (RBs) 2001 for the UE's transmission, for example, randomly as indicated in FIG. 20, which is sent at an initial baseline allowed power set by the power control rules for PSSCH and PSCCH.

The resource block 2001 can represent SA and/or data transmission and the height of the resource block 2001 in FIG. 20 represents the corresponding transmit power. In cases 2, 3, and 4, as increased resource utilization is observed based on sensing, the transmitting UE starts lowering the UE's transmit power as shown in 2002, 2003, and 2004, and excludes the occupied resources 2005 for the UE's transmission, where 2005 represents either SA and/or data transmission resources. In case 5, there is no resource available for transmission based on sensing. In this case, the UE does not transmit and waits for the next opportunity.

In one embodiment, semi-persistent transmission information such as the number of future transmissions, the periodicity and the expiry of the transmission schedule of SA and data is encoded in the SA transmissions (PSCCH). On decoding the PSCCH of other UEs, the transmitting UE not only knows the current SA and data resource utilization of other UEs but also their future transmissions and the expiry of the schedule. Thus, the transmitting UE can adjust the UE's resource selection to minimize conflict with future transmissions of other UEs as well. Thus, exclusion of SA and data resources can be based on current sensing results as well as previous sensing results for semi-persistent scheduling support.

In some embodiments, the MCS for transmission is also adapted based on the sensing results. For example, if the resource utilization is high based on sensing, the UE transmits with lower MCS for increased reliability.

It is understood that triggering of resource selection implies that there are resources that the UE needs since the UE intends to transmit (i.e. UE transmission buffer is not empty). In some embodiment, reselection is triggered when a timer or counter meets an expiration condition or is reset to a value due to triggering of reselection based on other conditions. It is possible that when multiple UEs select the same resources and periodicity based on sensing the same results, the UEs collide at every transmission. Hence, it is important to allow some variation in the counters for every UE so that the UEs get a different view of the network when performing resource reselection. However, it is also important that the variation be consistent across all UEs.

In some embodiments, each UE may independently reset or initialize the resource re-selection counter to a value randomly chosen within a range of values. The range may be large enough to allow accurate sensing and small enough to meet latency and not have significant change in network conditions. In one example, this range can be integers between [16, 31], which can be implemented with a 4-bit counter with a fixed offset of 16. The counter decrements every transmission period P (for example, every P=100 ms). In addition, other ranges such as [5, 15] can also be considered. The range could also be dependent on the resource pool. The UE performs reselection when the counter reaches zero or is reset due to triggering of resource reselection based on other conditions.

In some embodiments, resource reselection is triggered by an upper layer notification. This could be due to change in the requirements over the existing transmission. Examples of requirement changes can include change in latency, reliability, priority, fairness, or QoS requirements.

In some embodiments, since each transmitting UE can make independent decisions for V2V, it is important to provide some measure of fairness for transmissions. Multiple criteria could be used for defining fairness. In one example of a criteria 1 (e.g., in the autonomous resource allocation mode), a UE may provide other UEs equal opportunities to access the network. In another example of criteria 2 (e.g., in the autonomous resource allocation mode), a UE may not use more resources than necessary for its transmissions.

A measurement metric is specified to reflect the congestion level of a PC5 carrier. The network load or congestion level as observed by a UE can be defined as the percentage of unavailable data and/or SA resources observed by the UE based on sensing. For example, percentage=(number of busy resources in T)/(number of total resources in T), where T is the measuring interval. To meet criteria 1, congestion control mechanisms such as reducing MCS, transmit power, muting etc. could be applied with resource reselection when the network load conditions exceeds a threshold a, where 0<a<1, where 1 represents 100% full network load.

The threshold can be set by the eNB during configuration of Mode 2. The network load conditions may be estimated based on sensing of SA contents and/or energy based sensing. Thus, this measurement is available to higher layers in the UE. Furthermore, when possible, the network load conditions can also be reported to the eNB via RRC. The eNB can also request a network load measurement report from the UE, for example, to help select the transmission path(s) for V2V messages between PC5 and Uu interfaces based on the PC5/Uu load.

Figure 21:
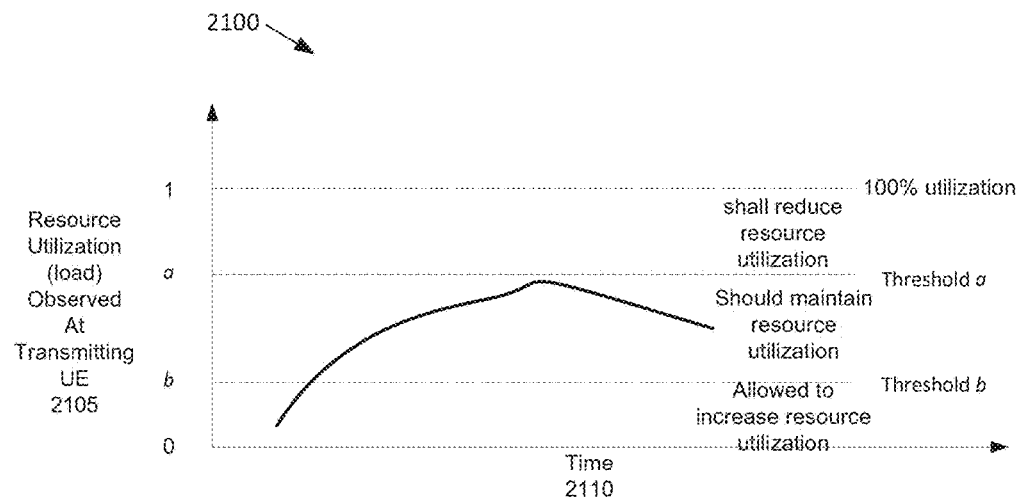
FIG. 21 illustrates an example resource utilization overload according to embodiments of the present disclosure.

FIG. 21 illustrates an example resource utilization overload 2100 according to embodiments of the present disclosure. An embodiment of the example resource utilization overload 2100 shown in FIG. 21 is for illustration only. Other embodiments may be used without departing from the scope of the present disclosure.

As shown in FIG. 21, the resource utilization overload 2100 comprises a resource utilization observed at transmitting UE 2105 and a time axis 2110. More specifically, FIG. 21 shows an exemplary embodiment of this disclosure where the transmitting UE takes different actions to support fairness according to the resource utilization (e.g., load or congestion level) to meet criteria 2. The transmitting UE always starts transmissions with minimum resources needed for the required data transmission (e.g. using highest allowed MCS). It is allowed to then gradually start utilizing more resources in future transmissions (e.g., reducing the MCS) to improve reliability as needed as long as the network load conditions stay below a threshold b, where 0<b≤a. When the network load conditions are between b and a, the resource utilization of the transmitting UE is not changed. When the network load exceeds threshold a, the resource utilization by the transmitting UE may be reduced by applying congestion control mechanisms.

In one example, the UE adjusts radio parameters (e.g., max TX power, number of retransmissions, MCS range, number of PRBs, etc.) as a function of priority and this measurement. Also, for example, the resource utilization can be reduced by dropping the PC5 transmissions as a function of this measurement and/or priority. The thresholds a and b can be defined as part of RRC configuration of Mode 2.

In some embodiments, when the UE is aware of a change in zone based on its geo-location, the UE may trigger resource reselection.

In some embodiments, if the resources identified for transmission from current UE conflicts with or overlaps with the resources identified for transmission by another UE, resource reselection is triggered.

In some embodiments, from point of a PHY perspective, priority can coarsely group into two classes for V2V, one which is low priority and the other which is high priority. The MAC provides the coarse priority information to the PHY along with the message to be transmitted in these two classes. In one example, low priority traffic could be periodic (CAM) messages and an example of high priority traffic could be aperiodic (DENM) messages. In another example, the CRC of the PSCCH for these two priority types are masked and/or scrambled with different radio network temporary IDs (RNTIs) to distinguish them during sensing by SA decoding.

Furthermore, the traffic characteristics of high priority traffic such as aperiodic DENM messages can have increased repetitions of short periodicities (e.g. ~1-10 ms) and high transmit power which can be distinguished via energy sensing. The detection of a change in traffic priority by sensing and/or SA decoding process triggers resource reselection.

In some embodiments, the eNB may request the transmitting UE to perform resource reselection. This could be based on indication from transmitting UE of the current load conditions based on sensing. In such embodiments, the resource reselection can also include resource pool reconfiguration based on the load conditions reported to the eNB by the transmitting UE.

In some embodiments, in mode 2 operation, a given UE can prioritize its UL transmission over SL and hence, does not transmit SL. It is possible that in this case, the sensing mechanism by other UEs may incorrectly identify that the resources are now available and other UEs may use this resource. However, when the UE now transmits SL as well in the same resource, it may cause a collision. Hence, a UE performs resource reselection, when prioritizing UL transmissions over SL.

Some vehicles may face poor quality of service (QoS) if resources are always occupied as shown in case 5 of FIG. 16. In such cases, some fairness measure needs to be incorporated to support such cases.

In one embodiment, if the sensing result for a transmitting UE indicates that a certain percentage of occupied resources have been exceeded, the transmitting UE may discontinue the UE's semi persistent schedule and may follow resource reselection. This may give other UEs more opportunities to gain access for transmission.

In one embodiment, the period of the semi-persistent transmissions of SA and data of the transmitting UE is dependent on the number of occupied SA and data resources observed during sensing.

Figure 22:
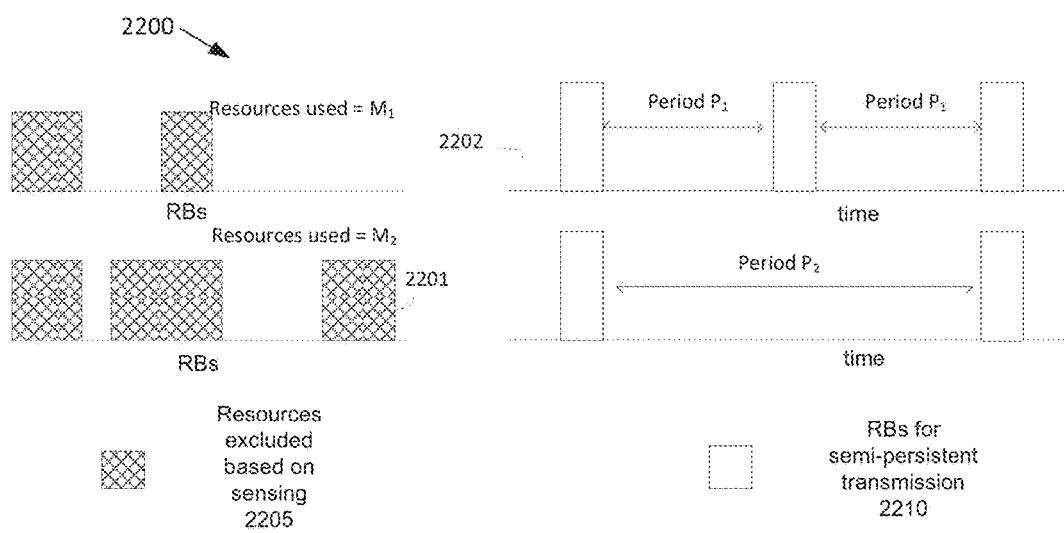
FIG. 22 illustrates an example period of a semi-persistent transmission of SA and data according to embodiments of the present disclosure.

FIG. 22 illustrates an example period of a semi-persistent transmission of SA and data 2200 according to embodiments of the present disclosure. An embodiment of period of the semi-persistent transmission of SA and data 2200 shown in FIG. 22 is for illustration only. Other embodiments may be used without departing from the scope of the present disclosure.

As shown in FIG. 22, the period of the semi-persistent transmission of SA and data 2200 comprises resources excluded based on sensing 2205 of resource blocks 2201 and resource blocks for semi-persistent transmission 2210. As the number of occupied resource blocks 2201 increases from $M_1$ to $M_2$, where $M_1 < M_2$, the period of semi-persistent transmissions 2202 is increased from $P_1$ to $P_2$ to allow more opportunities for other UEs to transmit, where $P_1 < P_2$. The resource block allocation and MCS are not changed during semi-persistent transmissions. Resource blocks (e.g., 2201 and 2202) may be either SA and/or data resources. If no UEs are detected based on sensing, any period up to a maximum period configuration $P_{max}$ can be used where $P_1 < P_2 \leq P_{max}$. If all resources are fully utilized, there is no semi-persistent configuration allowed for SA and/or data transmissions.

In one embodiment, the number of transmissions in the semi-persistent transmissions of SA and data of the transmitting UE is dependent on the number of occupied SA and data resources observed in sensing.

Figure 23:
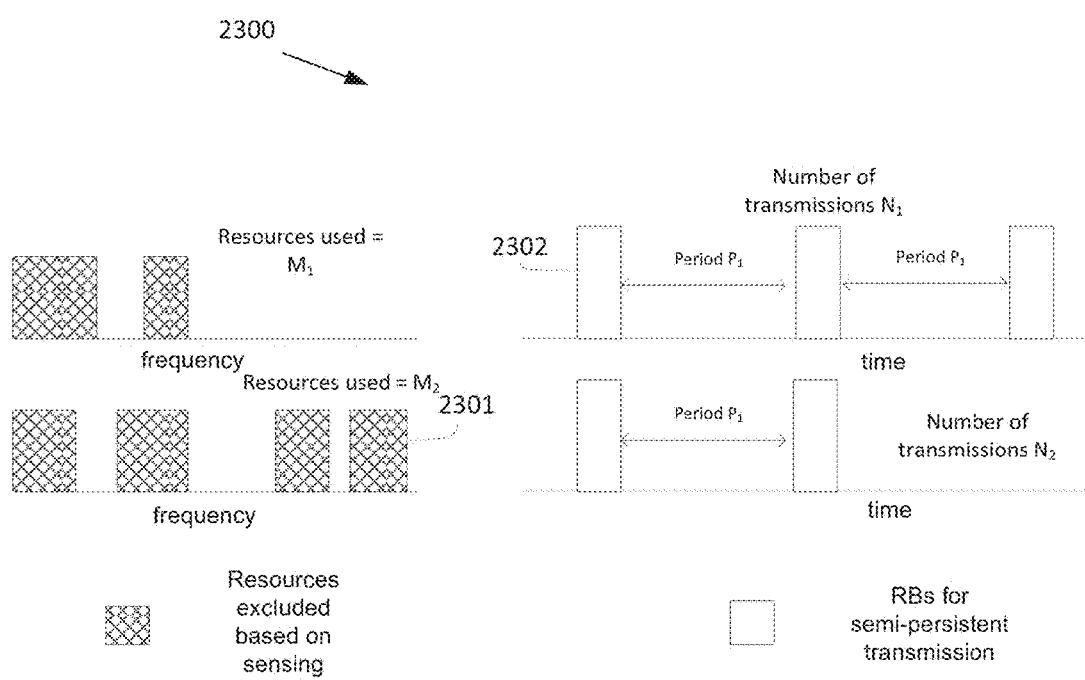
FIG. 23 illustrates an example a number of transmission selections according to embodiments of the present disclosure.

FIG. 23 illustrates an example a number of transmission selection 2300 according to embodiments of the present disclosure. An embodiment of the number of transmission selection 2300 shown in FIG. 23 is for illustration only. Other embodiments may be used without departing from the scope of the present disclosure.

As shown in FIG. 23, the number of transmission selection 2300 comprises resources excluded based on sensing resource blocks 2301 and RBs 2302 for semi-persistent transmission. As the number of occupied resource blocks 2301 increases from $M_1$ to $M_2$, where $M_1<M_2$, the number of transmissions in the semi-persistent transmission is decreased from $N_1$ to $N_2$ while keeping the same transmission period $P_1$ to allow more opportunities for other UEs to transmit, where $N_1>N_2$. Resource blocks 2001 and 2302 may be either SA and/or data resources. Combination approaches can also be considered, for example, increasing the period and decreasing the number of transmissions simultaneously based on increased resource usage observed during sensing. After resource selection is triggered, the next steps involve selecting the appropriate resources to be used for transmission.

The procedure for selecting the transmitting resources after excluding the occupied resources is performed. In one embodiment, the UE transmission and the UE's transmission rate are decided based on the number of contiguous resource blocks available after excluding the occupied resources based on sensing. In one example, $K_{min}$ is assumed as the minimum number of resource block groups (RB groups) needed for transmitting the PSCCH and/or PSSCH. If PSCCH and PSSCH are transmitted in FDM in a single-cluster (i.e. contiguous), then $K_{min}$ is the sum of those resources else the resource selection is considered individually for PSCCH and PSSCH. $K_{min}$ could be based on the highest MCS used for PSSCH transmission.

In another example, $K_{max}$ is assumed as the maximum number of resource blocks (RBs) needed for transmitting the PSCCH and/or PSSCH. This configuration can be based on the lowest MCS used for transmission of PSSCH. Let the number of resource block groups available for transmission of PSSCH and/or PSCCH based on the result of sensing be K.

In some embodiments of PSSCH transmission, if $K<K_{min}$, there is no transmission and the UE waits for the next opportunity to transmit. In some embodiments of PSSCH transmission, if $K \geq K_{max}$, the UE selects a rate for PSSCH utilizing up to $K_{max}$ resource blocks and can transmit at the next opportunity. In some embodiments of PSSCH transmission, if $K_{min} \leq K \leq K_{max}$, the UE selects a rate for PSSCH utilizing up to K resource blocks and can transmit at the next opportunity.

The PSCCH transmission is linked with the PSSCH transmission. The PSCCH resource availability is explored based on timing derived from a configurable range of values prior to the desired transmission of the PSSCH. In some embodiments of PSCCH transmission, if $K<K_{min}$, there is no transmission else. In some embodiments of PSCCH transmission, the PSCCH can be transmitted in one of the identified SA resources based on sensing of the SA pool in time resources corresponding to the configurable range offset in time from the PSSCH resource. The chosen timing offset for the PSSCH transmission is indicated in the PSCCH.

If both conditions for PSCCH and PSSCH transmission are satisfied, the transmission proceeds at the next opportunity. i.e. PSCCH and PSSCH need to be transmitted jointly and the resource allocation of PSSCH and the timing offset, if any, is indicated in the PSCCH.

In one embodiment, resource selection would be performed to randomly select K contiguous block groups, if available. In another embodiment, the resource block groups to be contiguous to an existing transmission may be selected to maximize number of contiguous block availability for other UEs. In yet another embodiment, resource selection would be performed to select the first K blocks from a sorted list of available resource block groups.

Figure 24:
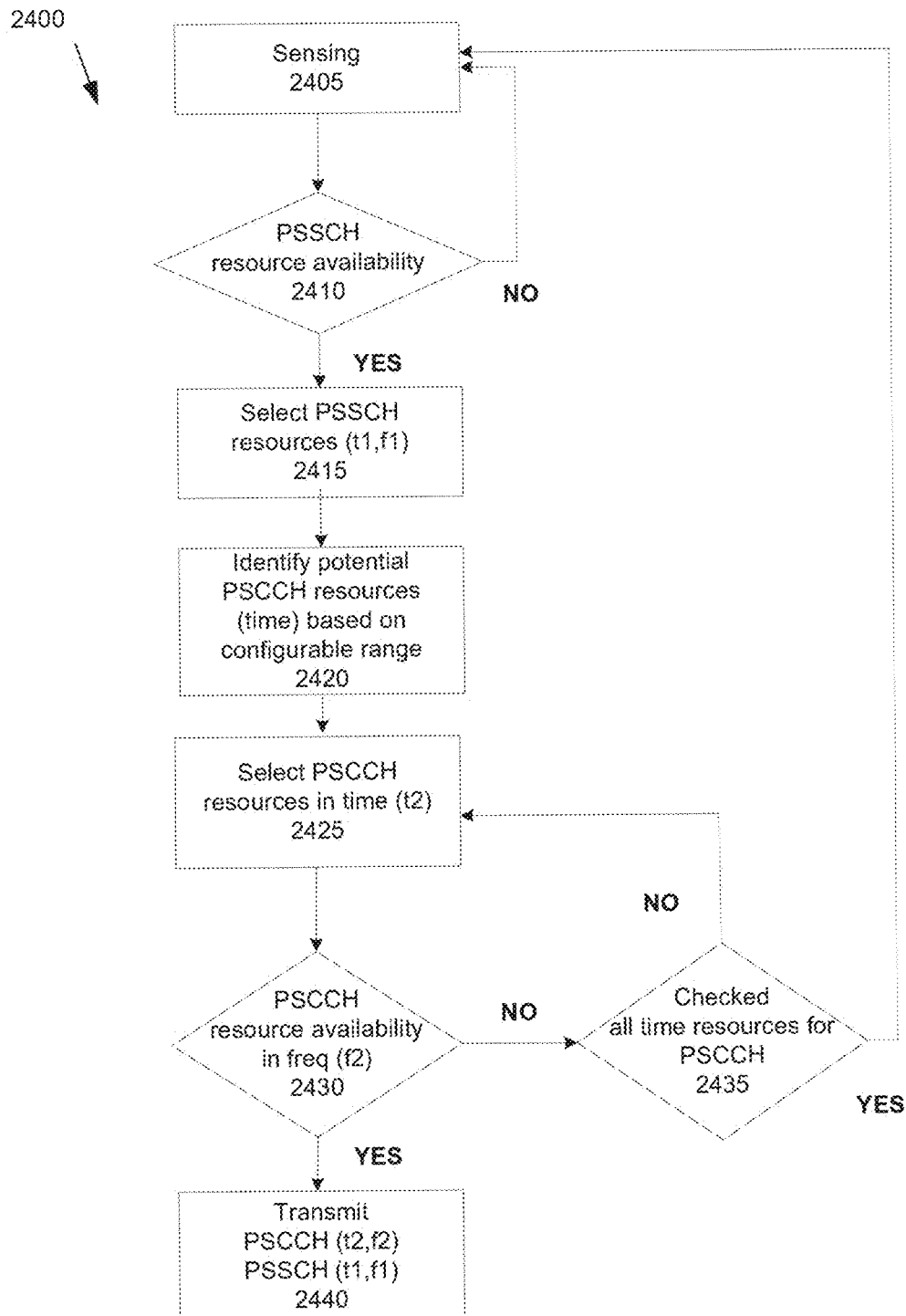
FIG. 24 illustrates an example method for selecting PSCCH resources according to embodiments of the present disclosure.

FIG. 24 illustrates an example method for selecting PSCCH resources 2400 according to embodiments of the present disclosure. An embodiment of the procedure for selecting PSCCH resources 2400 shown in FIG. 24 is for illustration only. Other embodiments may be used without departing from the scope of the present disclosure. For example, the method may be performed by the UE 116 in FIG. 3.

As shown in FIG. 24, the method begins at step 2405. At step 2405, the UE performs sensing. The UE determines whether PSSCH resources are available at step 2410. If the PSSCH resources are available at step 2410, the UE performs step 2415. If not, the UE performs step 2405. At step 2415, the UE selects PSSCH resources (t1, f1). Subsequently, the UE identifies potential PSCCH resources (e.g., time) based on configurable range at step 2420. Subsequently, the UE selects PSCCH resources in time (t2) at step 2425. At step 2430, the UE determines whether the PSCCH resources are available in frequency (f2). If the PSCCH resources are available at step 2430, the UE transmits PSCCH (t2, f2) and PSSCH (t1, f1) at step 2440. If the PSCCH resources are not available at step 2430, the UE checks all time resources for the PSCCH at step 2435. If the time resources are not available for the PSCCH at step 2435, the UE performs step 2405. If the time resources are not available for the PSCCH, the UE performs step 2425.

As shown in FIG. 24, the time and frequency resources (t1, f1) for PSSCH are first selected based on sensing. Based on the potential transmission for PSSCH, the time resource options for PSCCH are first explored based on the range of values configured for the timing relationship between PSCCH and PSSCH. A particular choice of PSCCH time and frequency resources (t2, f2) are then explored for indication of the transmission of the PSSCH resources. If no suitable PSCCH resource is found, even though PSSCH resources are available, the transmission is terminated due to lack of control channel resources.

Figure 25:
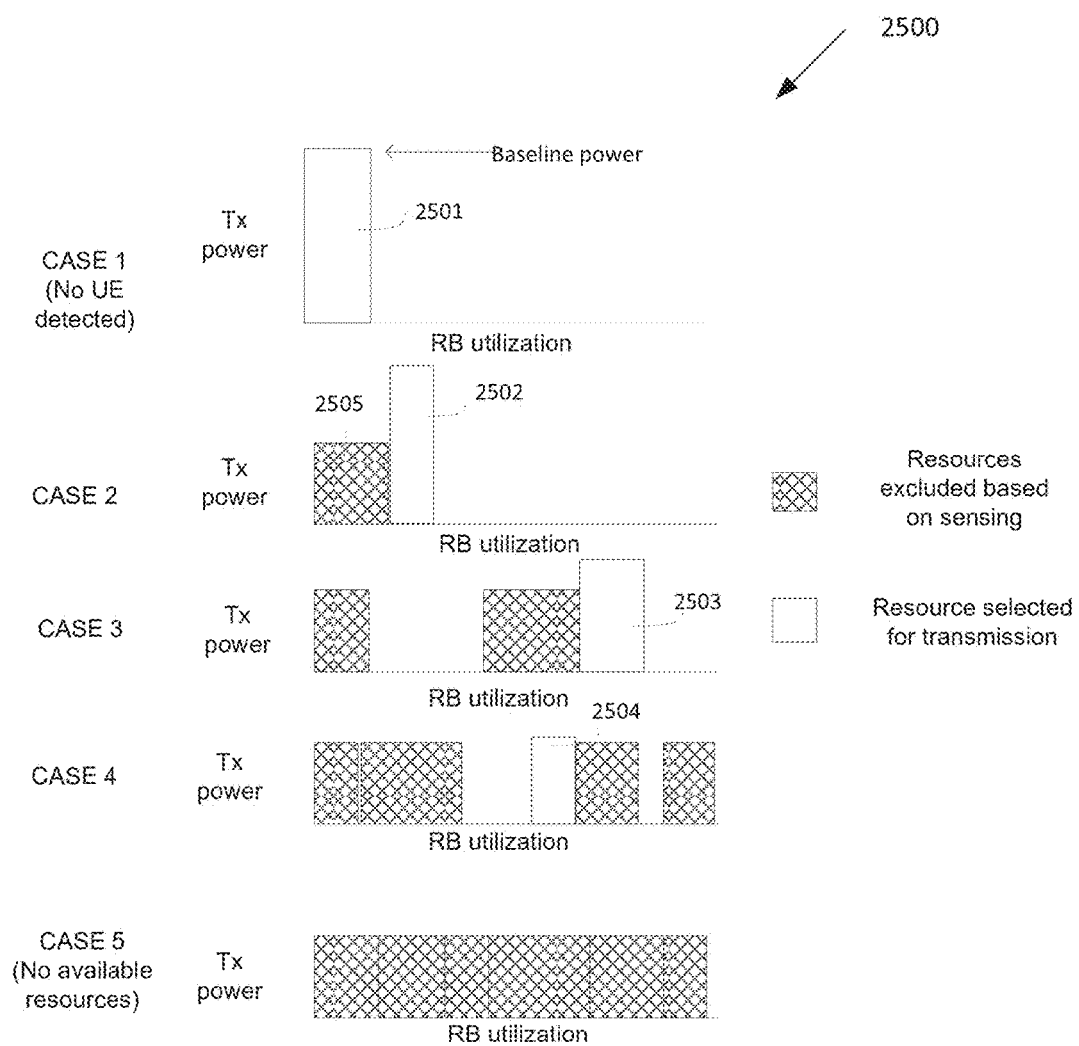
FIG. 25 illustrates an example resource selection procedure according to embodiments of the present disclosure.

FIG. 25 illustrates an example resource selection procedure 2500 according to embodiments of the present disclosure. An embodiment of the resource selection procedure 2500 shown in FIG. 2500 is for illustration only. Other embodiments may be used without departing from the scope of the present disclosure.

As shown in FIG. 25, the resource selection procedures 2500 comprises a resource block 2501, a plurality of transmit powers 2502, 2503, and 2504, and occupied resources 2505. In Case 1, the sensing does not show any UE occupancy. In this case, the transmitting UE picks the available SA and data resource blocks (RBs) 2501 for a transmission at one edge of the total resource block allocation, which is sent at a baseline power set according to power control rules for PSSCH and PSCCH. The resource block 2501 can represent SA and/or data transmission and the height of the resource block 2501 in FIG. 25 represents the corresponding transmit power. In cases 2, 3, 4, as increased resource utilization is observed based on sensing, the transmitting UE starts lowering its transmit power as shown in 2502, 2503, 2504 and excludes the occupied resources 2505 for its transmission, where 2505 represents either SA and/or data transmission resources. In these cases, 2502, 2503 and 2504 transmissions are placed to be contiguous to an existing transmission from other UEs. In case 5, there is no resource available for transmission based on sensing. In this case, the UE does not transmit and waits for the next opportunity.

Energy based sensing can be useful for collision avoidance with DSRC/IEEE 802.11p. If the spectrum is shared between cellular-based V2V and DSRC, certain characteristics of the DSRC transmission can be detected using energy sensing. DSRC transmissions based on Wi-Fi/IEEE 802.11p are always full-bandwidth and are packet-based (continuous transmission).

The symbol duration for IEEE 802.11p is 8 microsecond (usec) (e.g., compared to 4 usec for regular IEEE 802.11a), but is still shorter than the cellular-V2V symbol duration. Since IEEE 802.11p is packet-based (with a minimum of 13 symbols for a packet with no data), it can be of sufficient length to be detected in the frequency domain for cellular V2V. The clock period and FFT size can also be adapted, if needed, for more accurate energy sensing to specifically match that of DSRC/IEEE 802.11p. For DSRC detection, other options such as time domain sensing and preamble detection could also be considered for higher accuracy.

In one embodiment, energy based sensing is used to identify a DSRC/IEEE 802.11p transmission, based on sensing of a full-bandwidth and continuous signal transmission in the DSRC frequency band. While using a dedicated band for V2V, in mode 1 transmission, the eNodeB can periodically request the UE to do an energy scan on the DSRC band and report the presence of any DSRC transmissions. The UE performs the energy scan and reports this information to the eNodeB. If the band is available, the eNodeB can then set-up communication in this shared band for V2V. If the band is occupied, the eNodeB may decide to use a licensed cellular band for operation.

While using a shared band for V2V, in mode 1 and mode 2, the UE can perform an energy scan to sense potential collisions with DSRC/IEEE 802.11p. If a DSRC signal is detected, the UE does not transmit and defers all transmissions until the next available opportunity. The UE also reports this information of a DSRC transmission to the eNodeB at the next available opportunity. It can be acceptable to ignore DSRC signals for aperiodic/emergency messages to maintain critical safety functions in the shared band.

Listen-before-talk (LBT) procedures defined for sharing unlicensed spectrum with Wi-Fi can also be adopted for this purpose. In one example, V2V based on SL can utilize an LAA when operating on the same or adjacent band as DSRC/IEEE 802.11p. In this case, V2V transmission authorization and load balancing between available carriers for PC5 can be performed over control signaling on licensed or dedicated V2V spectrum. For example, based on energy sensing/RSSI measurements, channel occupancy, or other mechanisms for detection of transmissions on a given carrier may be used to determine to most suitable carrier for operation of one or more V2V users/groups. Carrier selection average RSSI/channel occupancy percentage thresholds may be configured or indicated by higher layer signaling in the case of network-assisted V2V operation including network selected and UE-autonomous resource allocation. In addition, the existing LAA LBT protocol can be used for SL transmissions. The high priority QoS class LBT parameters may be applied to PC5 transmissions.

In another example, a new priority or QoS class may be defined instead of the ones for non-PC5 based transmission. Different LBT could be applied depending on traffic type (e.g. event vs. periodic traffic) or physical channel (SA or data). TABLE 4 illustrates one example set of parameters.

TABLE 4

| Channel Access Priority Class (p) | $m_p$ | $CW_{min,p}$ | $CW_{max,p}$ | $T_{mcol,p}$ | allowed $CW_p$ sizes |
|---|---|---|---|---|---|
| V2V_SA | 1 | 1 | 1 | 1 ms | {1} |
| V2V_Event_data | 1 | 2 | 3 | 1 ms | {2, 3} |
| V2V_Periodic_data | 1 | 3 | 7 | 1 ms | {3, 7} |
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

In addition, a LBT without random backoff may be applied to V2V transmissions. In one example, the V2V transmission may follow after a fixed sensing interval (e.g. 16 us, 25 us, or 32 us) applied before one or more transmission instances (e.g. SL subframe or slot boundary).

In another alternative, a hybrid channel access mechanisms may be applied for V2V transmissions which utilizes a combination of scheduling/resource pool configuration and LBT which can be more efficient than fully distributed LBT. One of the advantages of SL resource allocation is the use of periodic pools for control/data messages which allow more efficient TDM/FDM multiplexing without overhead associated with LBT/random backoff.

A resource pool containing multiple transmissions may be configured containing multiple SA and data transmission opportunities partitioned in a TDM or FDM manner and a sidelink discovery beacon" (SDB) may precede the resource pool and provide information about time-shifted resources pools depending on the successful completion of an LBT procedure as described above. A resource pool window may be defined for detection of the SDB based on the configured periodicity. For example if the resource pool periodicity is 20 ms, a resource pool window of 5 ms indicates that a V2V UE may search for a SDB (and corresponding transmissions within the subsequent resource pool) every 20 ms within a window of 5 ms (or 5 subframes).

If a transmission is not detected within the window, a UE may wait until the next resource period to attempt to detect a SDB or resource pool transmission. The resource pool window period and duration may be preconfigured or indicated by broadcast or higher layer signaling.

The SDB may contain one or more synchronization signals for detection of the resource pool timing including periodicity, duration, and time/frequency resources based on the sequence and/or time frequency resources used. Alternatively, or in addition, a sidelink discovery broadcast channel (SDBC) may be transmitted which contains information related to the resource pool configuration parameters including duration, periodicity, and time/frequency resources, as well as LBT parameters, group identifiers, and RS for demodulation of a SDBC message.

Figure 26:
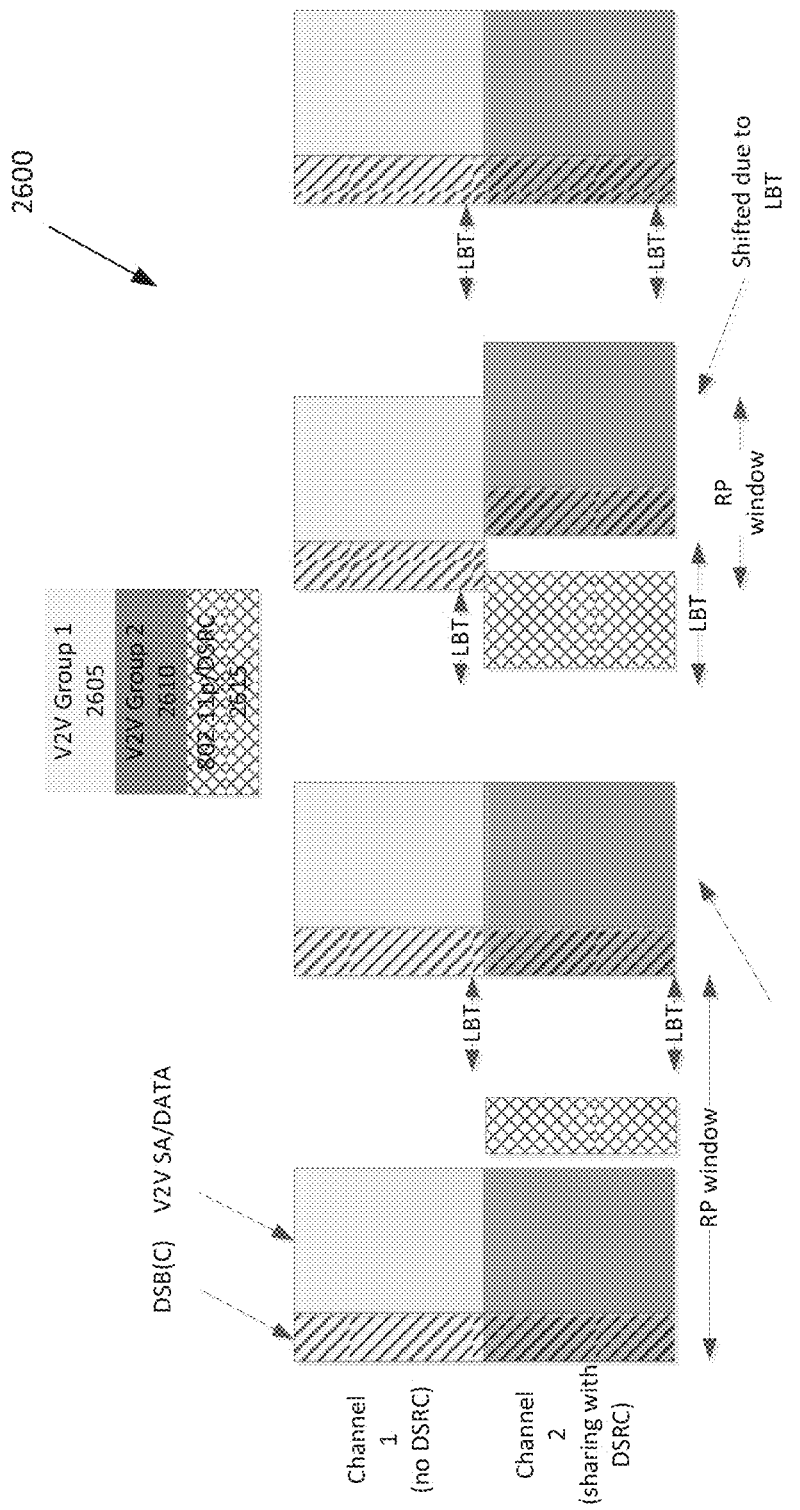
FIG. 26 illustrates an example operation of multiple resource pools (RPs) according to embodiments of the present disclosure.

FIG. 26 illustrates an example operation of multiple resource pools (RPs) 2600 according to embodiments of the present disclosure. An embodiment of the operation of multiple RPs 2600 shown in FIG. 26 is for illustration only. Other embodiments may be used without departing from the scope of the present disclosure.

As shown in FIG. 26, the operation of multiple RPs 2600 comprises a V2V group 1 2605, a V2V group 2, and an IEEE 802.11p/DSRC. More specifically, FIG. 23 illustrates the operation of multiple RPs including a SDB and SDBC transmission, and co-existing with DSRC transmissions.

In one embodiment, the transmission power is semi-statically configured by the eNB for a given resource pool. All UEs in a given resource pool shall use the same transmission power. The transmit power for PSSCH and PSCCH can be fixed for mode 2 operation in a given resource pool. This can be done at least for the case, where the V2V communication is using a dedicated channel and does not need to co-exist with cellular communication on the same channel. Since the traffic in a given geographical area is expected to be correlated, the transmit power can be configured in a semi-static manner in the resource pool. The transmit power for PSSCH and PSCCH can be fixed in multiple ways. In one example, the transmit power for PSSCH and PSCCH can be fixed always using the maximum transmit power $P_{PSCCH}=P_{CMAX,PSCCH}$, $P_{PSSCH}=P_{CMAX,PSSCH}$.

In another example, the transmit power for PSSCH and PSCCH can be fixed using setting the bandwidth of the PSSCH and PSCCH resource assignment expressed in number of resource blocks $M_{PSSCH}$ and $M_{PSCCH}$ to a constant value in the resource pool and setting the parameters $\alpha_{PSSCH,2}$, $\alpha_{PSCCH,2}$ to 0 as given below:

$$P_{PSSCH}=\min\{P_{CMAX,PSSCH}, 10 \log_{10}(M_{PSSCH}) + P_{O\_PSSCH,2}\}$$

$$P_{PSSCH}=\min\{P_{CMAX,PSSCH}, 10 \log_{10}(M_{PSSCH}) + P_{O\_PSSCH,2}\}$$

In another embodiment, the transmission power per resource block group (or per subchannel) is semi-statically configured by the eNB. This configuration by the eNB could be based on parameters such as the geo-graphical location (e.g., zone) or part of a congestion control mechanism by the eNB based on measurement report by the UEs to the eNB. All UEs in a given resource pool may use the same transmit power per resource block group i.e. the power spectral density (PSD) for transmission is kept constant within a given resource pool.

This can help ensure that the energy sensing results can be accurately compared across the different UEs. The transmit power per resource block for PSSCH and PSCCH can be fixed for mode 2 operation in a given resource pool. This can be done at least for the case, where the V2V communication is using a dedicated channel and does not need to co-exist with cellular communication on the same channel. The transmit power per resource block for PSSCH and PSCCH can be fixed by setting the parameters $\alpha_{PSSCH,2}$, $\alpha_{PSCCH,2}$ to 0.

In this case, the bandwidth of the PSSCH resource assignment expressed in number of resource blocks $M_{PSSCH}$ need not be fixed as given below $$P_{PSSCH}=\min\{P_{CMAX,PSSCH}, 10 \log_{10}(M_{PSSCH}) + P_{O\_PSSCH,2}\}$$

$$P_{PSSCH}=\min\{P_{CMAX,PSSCH}, 10 \log_{10}(M_{PSSCH}) + P_{O\_PSSCH,2}\}$$

Figure 27:
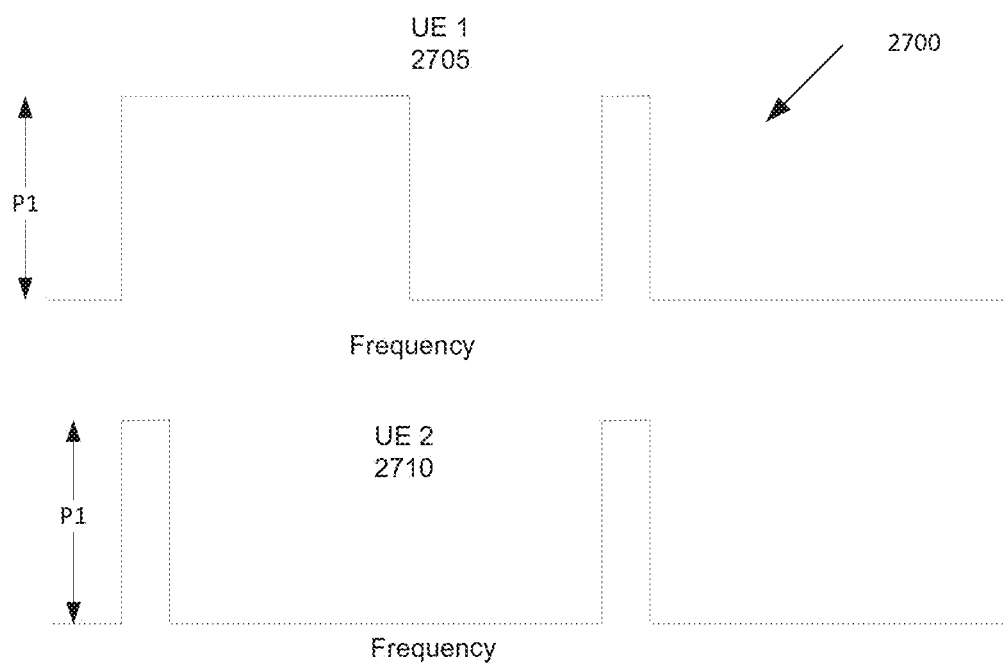
FIG. 27 illustrates an example transmit power per resource block according to embodiments of the present disclosure.

FIG. 27 illustrates an example transmit power per resource block 2700 according to embodiments of the present disclosure. An embodiment of the transmit power per resource block 2700 shown in FIG. 27 is for illustration only. Other embodiments may be used without departing from the scope of the present disclosure.

As illustrated in FIG. 27, the transmit power per resource block 2700 comprises a plurality of UEs 2705 and 2710. More specifically, FIG. 27 illustrates the transmit power per resource block group P1 is kept fixed for all UEs 2705 and 2710 in a resource block pool. i.e. the UE1 2705 and the UE2 2710 in the same resource pool use the same transmit power per resource block group. Since PSSCH and PSCCH can sensed separately and can use separate resource pools, the transmission power per resource group for SA pool and associated data pool can be independently configured.

During handover (HO), transmission and reception may temporarily be interrupted. Following HO command, a source eNB cannot schedule a UE anymore until HO has been successfully completed. It is also assumed that after receiving HO command the UE is not allowed to continue to select resources from a TX pool configured by the source eNB. For mode 1, (exceptional) TX resource pool configurations for the target cell can be signaled in the handover command. If the (exceptional) TX resource pool is included with mode 1 configuration into handover command, the UE starts the (exceptional) TX resource pool from the reception of handover command and continues it while T304 is running.

In one embodiment, when a UE receives a HO command, the UE switches to use a separate resource pool identified for transmissions in the handover phase irrespective of whether the UE is configured for mode 1 or mode 2 operations. In order to reduce sensing requirements for minimizing latency in this resource pool, two options can be considered. In one example, the UE performs random resource selection in this pool during HO (e.g., no sensing). In another example, the UE performs partial sensing with a reduced sensing window. For example, a sensing window of 100 sub-frames could be considered instead of 1 sec. The aforementioned examples could be supported and indicated by the network.

The sensing window (or associated parameters for the sensing window such as a, b) could also be indicated by the network. It is also possible to support the aforementioned examples with a single configuration. For example, if the sensing window is set to 0, the UE performs random resource selection (i.e. no sensing).

V2V communication is initiated by transmission of a synchronization SF that contains the master information block (MIB) for SL communication. The sidelink common control information is carried by a single message, the MasterInformationBlock-SL (MIB-SL) message. The MIB-SL includes timing information as well as some configuration parameters. The MIB-SL uses a fixed schedule with a periodicity of 40 ms without repetitions. In particular, the MIB-SL is scheduled in subframes indicated by syncOffsetIndicator i.e. for which (10×DFN+subframe number) mod 40=syncOffsetIndicator. The sidelink common control information may change at any transmission i.e. neither a modification period nor a change notification mechanism is used. The MIB-SL is transmitted in a SL broadcast channel (PSBCH). The SF conveying the SBCH transmission also conveys primary SL synchronization signals (PSSS) and secondary SL synchronization signals (SSSS). In one example, the MIB-SL transmission contains the system bandwidth (1.4, 3, 5, 10, 15 or 20 MHz). In another example, the MIB-SL transmission contains, for TDD mode, the SF configuration that provides the SFs used for UL transmissions and the SFs used for DL transmissions). In yet another example, the MIB-SL transmission contains frame and SF numbers of the SBCH, PSSS and SSSS transmission. In yet another example, the MIB-SL transmission contains a Boolean flag indicating whether the UE is within or outside NodeB coverage.

The format of the MIB-SL is as shown below:
MasterInformationBlock-SL

```
-- ASN1START
MasterInformationBlock-SL::= SEQUENCE {sl-Bandwidth-r12
ENUMERATED { n6, n15, n25, n50, n75, n100},
tdd-ConfigSL-r12 TDD-ConfigSL-r12,
directFrameNumber-r12 BIT STRING (SIZE (10)),
directSubframeNumber-r12 INTEGER (0..9),
inCoverage-r12 BOOLEAN,
reserved-r12 BIT STRING (SIZE (19))
}
-- ASN1STOP
```

MasterInformationBlock-SL Field Descriptions:
directFrameNumber: Indicates the frame number in which SLSS and SL-BCH are transmitted. The subframe in the frame corresponding to directFrameNumber is indicated by directSubframeNumber.
inCoverage: Value TRUE indicates that the UE transmitting the MasterInformationBlock-SL is in E-UTRAN coverage.
sl-Bandwidth Parameter: transmission bandwidth configuration. n6 corresponds to 6 resource blocks, n15 to 15 resource blocks and so on.

```
TDD-ConfigSL-r12 ::= SEQUENCE {
subframeAssignmentSL-r12 ENUMERATED {
none, sa0, sa1, sa2, sa3, sa4, sa5, sa6}
}
```

A total of 40 information bits (including 19 reserved bits) are used for MIB-SL transmission.

Figure 28:
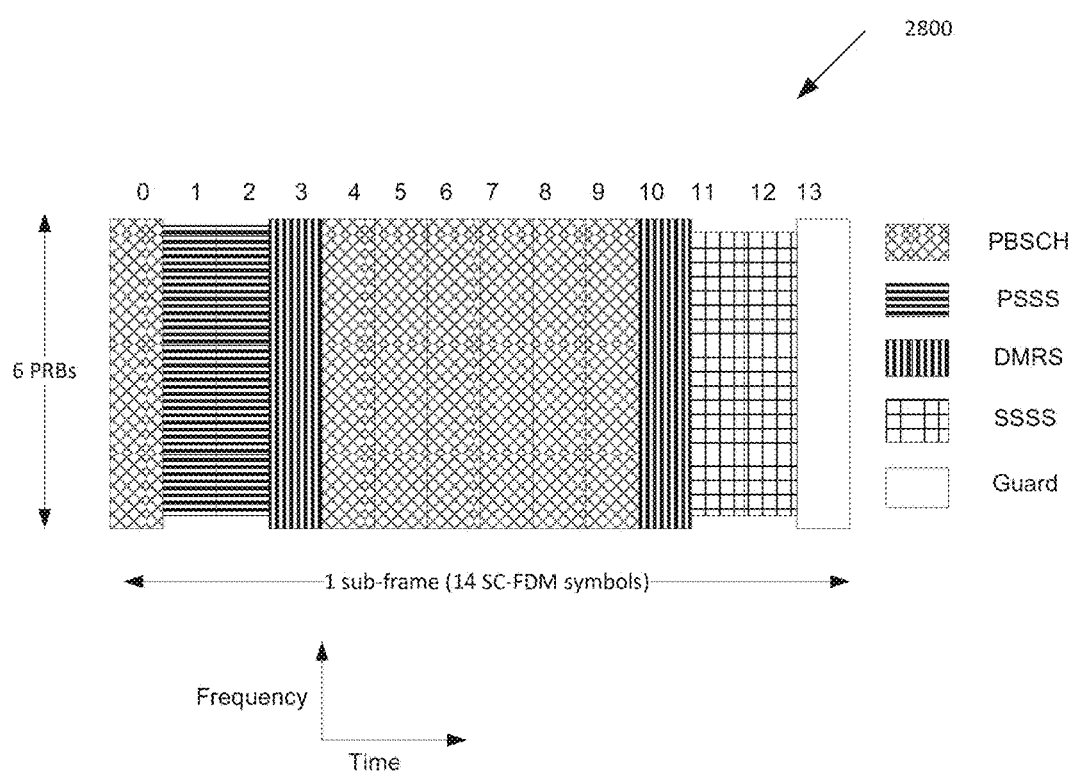
FIG. 28 illustrates an example synchronization subframe (SF) structure according to embodiments of the present disclosure.

FIG. 28 illustrates an example synchronization subframe (SF) structure 2800 according to embodiments of the present disclosure. An embodiment of the synchronization SF structure 2800 shown in FIG. 28 is for illustration only. Other embodiments may be used without departing from the scope of the present disclosure.

As shown in FIG. 28, a number of 6 PRBs (or 72 sub-carriers) are used for PSBCH transmission. The MIB-SL information is transmitted on 7 PSBCH symbols, after adding a 16-bit CRC, scrambling, channel coding with a rate 1/3 tail-biting convolutional code (TBCC), rate-matching and mapping with QPSK modulation. Sidelink synchronization signals (SLSS) include two signals: the PSSS and the SSSS. PSSS and SSSS are both transmitted in adjacent time slots in a same SF.

The PSBCH and synchronization signals always use the same cyclic prefix. The PSBCH uses the same set of resource blocks as the synchronization signal. The combination of both signals defines a "Sidelink ID" (SID) $N_{ID}^{SL}$, similar to the "Physical Cell ID" in the DL. SIDs are split into two sets. SIDs in the range of $\{0, 1, \ldots, 167\}$ are reserved for 'in-coverage' operation, where $\{168, 169, \ldots, 335\}$ are used when a device is 'out-of-coverage'. In the case of extended CP configuration, where only 13 symbols are available, the frame structure of the normal CP is used excluding the first symbol in the normal CP case.

The sequence d(n) used for the PSSS is generated from a frequency-domain Zadoff-Chu sequence according to:

$$d_u(n) = \begin{cases} e^{-j\frac{\pi u n(n+1)}{63}} & n = 0, 1, \ldots 30 \\ e^{-j\frac{\pi u(n+1)(n+2)}{63}} & n = 31, 32, \ldots 61 \end{cases}$$

where u is the Zadoff-Chu root sequence index.

Each of the two sequences $d_i(0), \ldots, d_i(61)$, i=1, 2 used for the PSSS in the two SC-FDMA symbols is given by Equation 1 with root index u=26 if $N_{ID}^{SL} \leq 167$ and u=37 otherwise. The sequence d(0), . . . , d(61) used for the second synchronization signal (SSS) is an interleaved concatenation of two length-31 binary sequences. The concatenated sequence is scrambled with a scrambling sequence given by the primary synchronization signal.

The combination of two length-31 sequences defining the secondary synchronization signal differs between subframes according to:

$$d(2n) = \begin{cases} s_0^{(m_0)}(n)c_0(n) & \text{in subframes } 0, 1, 2, 3, 4 \\ s_1^{(m_1)}(n)c_0(n) & \text{in subframes } 5, 6, 7, 8, 9 \end{cases}$$

$$d(2n+1) = \begin{cases} s_1^{(m_1)}(n)c_1(n)z_1^{(m_0)}(n) & \text{in subframes } 0, 1, 2, 3, 4 \\ s_0^{(m_0)}(n)c_1(n)z_1^{(m_1)}(n) & \text{in subframes } 5, 6, 7, 8, 9 \end{cases}$$

where $0 \leq n \leq 30$.

The indices $m_0$ and $m_1$ are derived from the physical-layer cell-identity group $N_{ID}^{(1)}$ according to:

$m_0 = m' \mod 31$ $m_1 = (m_0 + \lfloor m'/31 \rfloor + 1) \mod 31$ $m' = N_{ID}^{(1)} + q(q+1)/2, \quad q = \left\lfloor \frac{N_{ID}^{(1)} + q'(q'+1)/2}{30} \right\rfloor, \quad q' = \lfloor N_{ID}^{(1)}/30 \rfloor$ The two sequences $s_0^{(m_0)}(n)$ and $s_1^{(m_1)}(n)$ are defined as two different cyclic shifts of the m-sequence $\tilde{s}(n)$ according to $s_0^{(m_0)}(n) = \tilde{s}((n+m_0) \mod 31)$ $s_0^{(m_1)}(n) = \tilde{s}((n+m_1) \mod 31)$ where $\tilde{s}(i)=1-2x(i)$, $0 \leq i \leq 30$, is defined by $x(\bar{i}+5)=(x(\bar{i}+2)+x(\bar{i})) \mod 2$, $0 \leq \bar{i} \leq 25$ with initial conditions $x(0)=0$, $x(1)=0$, $x(2)=0$, $x(3)=0$, $x(4)=1$.

The two scrambling sequences $c_0(n)$ and $c_1(n)$ depend on the primary synchronization signal and are defined by two different cyclic shifts of the m-sequence $\tilde{c}(n)$ according to:

$c_0(n) = \tilde{c}((n+N_{ID}^{(2)}) \mod 31)$ $c_1(n) = \tilde{c}((n+N_{ID}^{(2)}+3) \mod 31)$ where $N_{ID}^{(2)} \in \{0, 1, 2\}$ is the physical-layer identity within the physical-layer cell identity group $N_{ID}^{(1)}$ and $\tilde{c}(i)=1-2x(i)$, $0 \le i \le 30$, is defined by $x(\bar{i}+5)=(x(\bar{i}+3)+x(\bar{i})) \bmod 2$, $0 \bar{i} \le 25$ with initial conditions $x(0)=0$, $x(1)=0$, $x(2)=0$, $x(3)=0$, $x(4)=1$.

The scrambling sequences $z_1^{(m_0)}(n)$ and $z_1^{(m_1)}(n)$ are defined by a cyclic shift of the m-sequence $\tilde{z}(n)$ according to:

$$z_1^{(m_0)}(n)=\tilde{z}((n+(m_0 \bmod 8))\bmod 31)$$

$$z_1^{(m_1)}(n)=\tilde{z}((n+(m_1 \bmod 8))\bmod 31)$$

where $m_0$ and $m_1$ are obtained from LTE specification and $\tilde{z}(i)=1-2(i)$, $0 \le i \le 30$, is defined by $x(\bar{i}+5)=(x(\bar{i}+4)+x(\bar{i}+2)+x(\bar{i}+1)+x(\bar{i}))\bmod 2$, $0 \le i \le 25$ with initial conditions $x(0)=0$, $x(1)=0$, $x(2)=0$, $x(3)=0$, $x(4)=1$.

For sidelink, subframe 0 with $N_{ID}^{(1)}=N_{ID}^{SL} \bmod 168$ and $N_{ID}^{(2)}=\lfloor N_{ID}^{SL}/168 \rfloor$ is assumed, where $N_{ID}^{SL}$ is the SLSS ID used for SL.

The SFs, a UE can use to transmit SLSS and PSBCH, are configured to the UE by higher layers. There is no physical SL shared channel (PSSCH), physical SL control channel (PSCCH) or physical SL discovery channel (PSDCH) transmissions in the SFs configured for SLSS and PSBCH transmission. The PSSS and SSSS are repeated twice and use 62 sub-carriers. The synchronization SF includes DMRS transmission in two symbols (denoted as 2V structure). The DMRS can be used for channel estimation or for carrier frequency offset (CFO) correction at a UE receiver. The last symbol in a SL SF serves as a guard period and is not used for SL transmission. The synchronization SF is transmitted every 40 msec.

Figure 29:
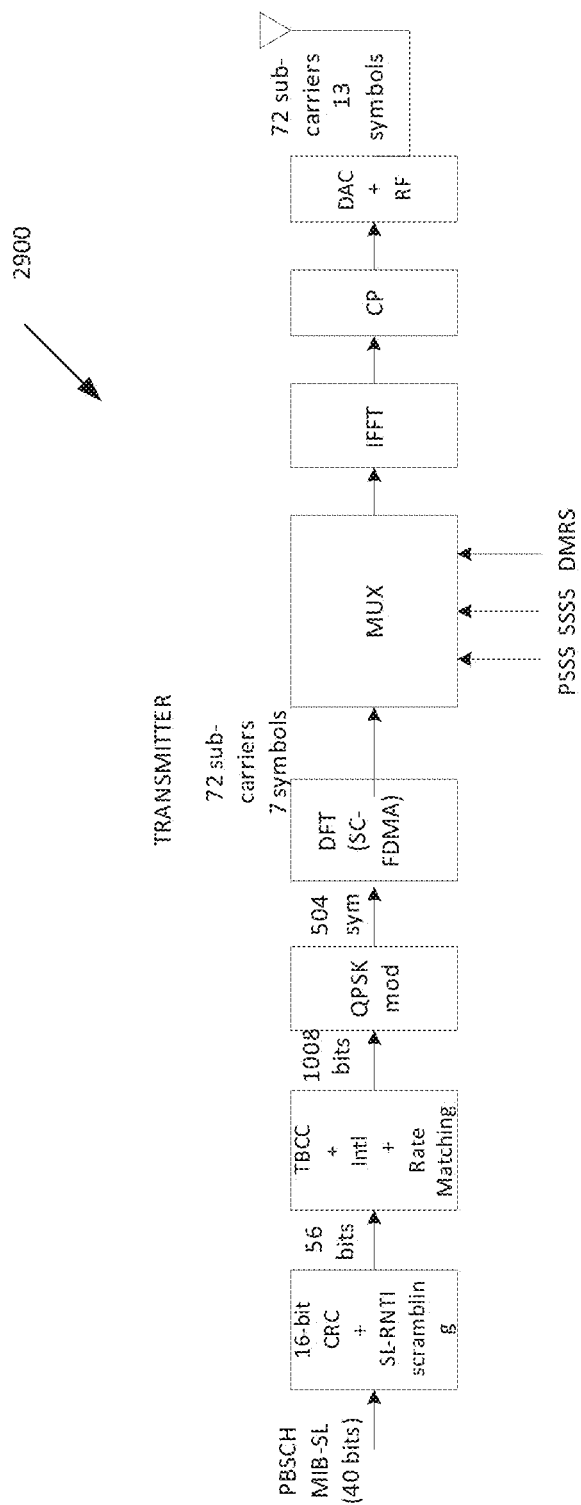
FIG. 29 illustrates an example transmitter for synchronization operation in vehicle-to-vehicle (V2V) communications according to embodiments of the present disclosure.

FIG. 29 illustrates an example transmitter for synchronization operation in vehicle-to-vehicle (V2V) communications 2900 according to embodiments of the present disclosure. An embodiment of the transmitter for synchronization operation in V2V communications shown in FIG. 29 is for illustration only. Other embodiments may be used without departing from the scope of the present disclosure.

As shown in FIG. 29, the 40 MIB-SL information bits are appended with a 16-bit CRC and scrambled based on the SL ID. The scrambled bits are then encoded with a rate 1/3 tail-biting convolutional code, interleaved and rate matched to 1008 bits that are mapped to 504 QPSK symbols. The IDFT filter maps the 504 QPSK symbols to 7 SF symbols with 72 sub-carriers per symbol. The DMRS and the PSSS/SSSS symbols are multiplexed with the MIB-SL symbols to form the SF. These symbols are then converted to the time-domain via an IFFT filter and transmitted. Although only a single antenna is shown in FIG. 29, multiple antennas can also be considered to provide diversity at the transmitter.

Figure 30:
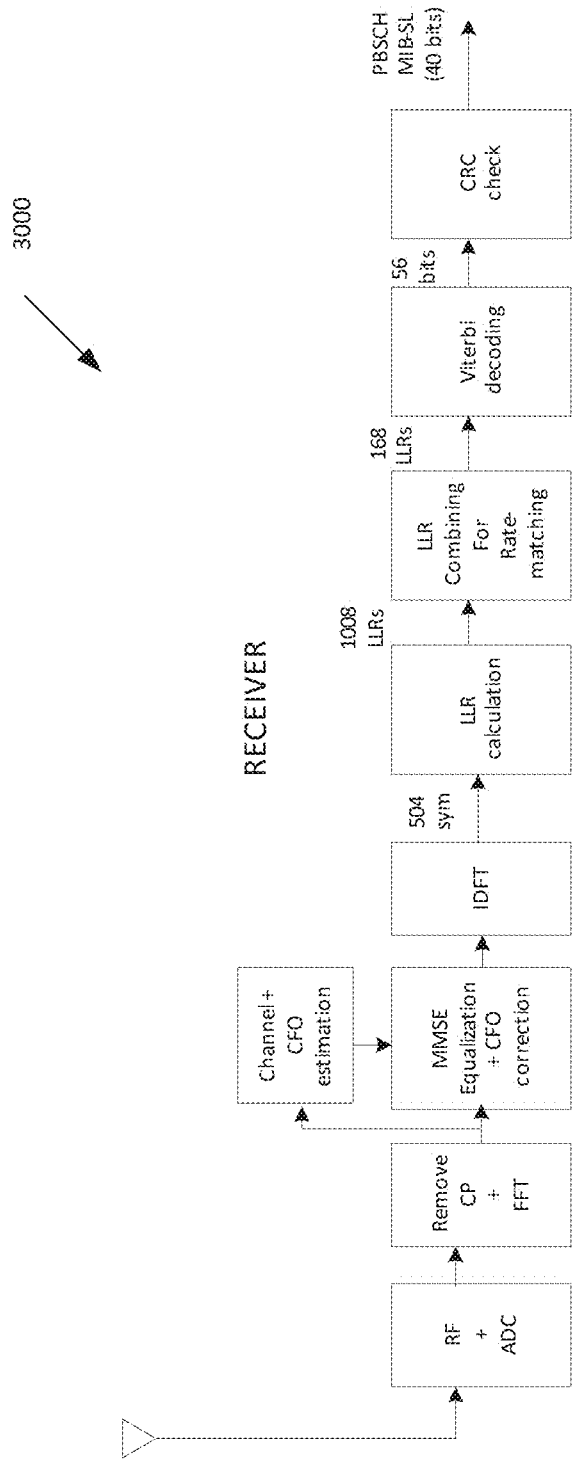
FIG. 30 illustrates an example receiver for synchronization operation in vehicle-to-vehicle (V2V) communications according to embodiments of the present disclosure.

FIG. 30 illustrates an example receiver for synchronization operation in vehicle-to-vehicle (V2V) communications 3000 according to embodiments of the present disclosure. An embodiment of the receiver for synchronization operation in V2V communications 3000 shown in FIG. 30 is for illustration only. Other embodiments may be used without departing from the scope of the present disclosure.

As shown in FIG. 30, the receiver uses the PSSS/SSSS to obtain synchronization and to detect a SL ID. The receiver uses the DMRS for channel estimation and for CFO estimation and correction. Since the PSSS and SSSS are repeated, they can also be used for CFO estimation. After equalization and IDFT filtering, the log likelihood ratios (LLRs) are computed for the 504 QPSK symbols transmitted in the PSBCH. The LLRs are then combined during rate matching and are subsequently decoded. The decoded bits are descrambled with the SL ID and the CRC is checked to determine whether or not the received bits have been decoded correctly. Although only a single antenna is shown in FIG. 30, multiple antennas can also be considered to provide diversity at the receiver.

Figure 31:
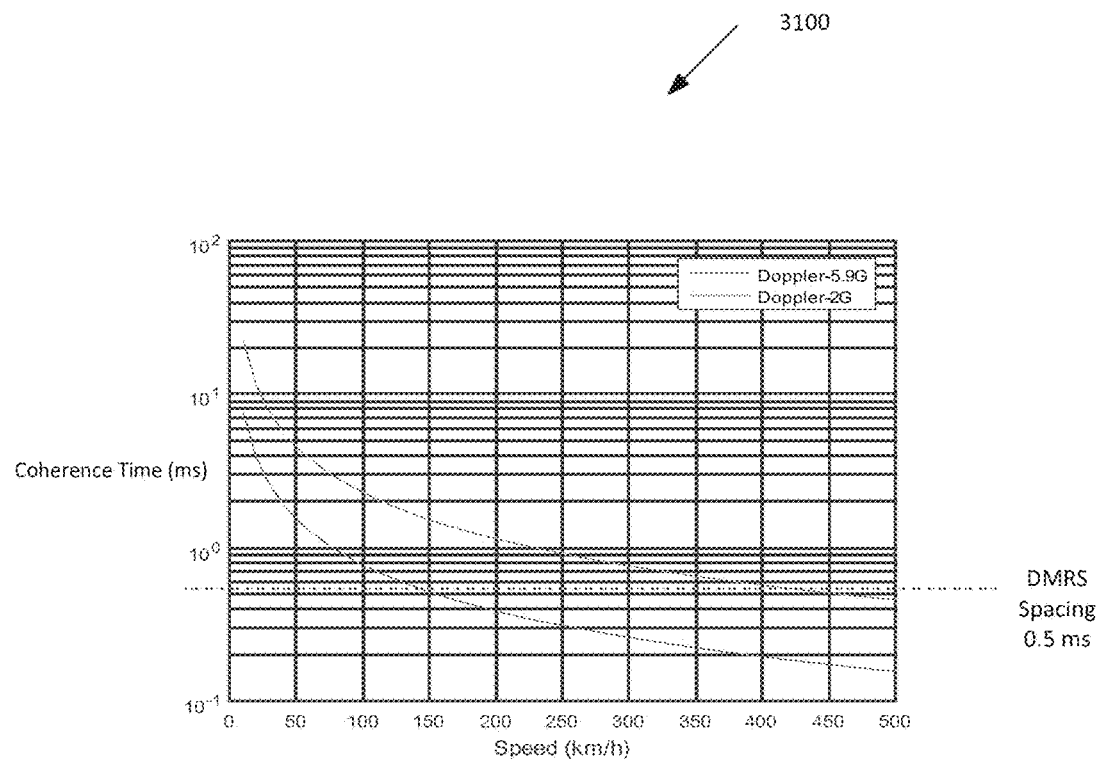
FIG. 31 illustrates an example channel coherence time according to embodiments of the present disclosure.

FIG. 31 illustrates an example channel coherence time 3100 according to embodiments of the present disclosure. An embodiment of the channel coherence time 3100 shown in FIG. 31 is for illustration only. Other embodiments may be used without departing from the scope of the present disclosure. As shown in FIG. 31, the DMRS symbols in the PSBCH in 3GPP Rel-13 are separated by 0.5 msec. This time separation can be sufficient for channel estimation when a carrier frequency is in the range of 2 GHz as the channel coherence time exceeds the DMRS spacing in time. However, carrier frequencies considered for V2V communication include a frequency band at 5.9 GHz (5.850-5.925 GHz) that is allocated for dedicated short range communications (DRSC) and can be used for vehicular communication. For such carrier frequencies, the Doppler shift can result to a channel coherence time that is smaller than the DMRS spacing and this adversely impacts channel estimation and decoding of the PSBCH. Referring to FIG. 31, a channel coherence time for a carrier frequency of 2 GHz and for a carrier frequency of 5.9 GHz as a function of the UE speed are illustrated. From FIG. 30, it can be observed that the channel coherence time is less than the DMRS spacing for UE speeds above 140 Km/h at 5.9 GHz. Therefore, a DMRS spacing of 0.5 msec is not sufficient for V2V communications at 5.9 GHz and this motivates a redesign for the PSBCH DMRS.

There is also a need to distinguish the synchronization signals for V2V communication from that of D2D. Hence, the PSSS and SSSS designs need to be reconsidered for V2V communication. There is another need to enable a UE to perform CFO estimation and correction. Finally, there is a need to enable target reception reliability for a MIB-SL at high vehicular speeds.

Since the V2V communication protocol is assumed to be based on the 3GPP D2D protocol design, the case where D2D and V2V share the same network and carrier frequency is considered. In this case, there can be applications where the D2D and V2V networks are separate networks and do not need to interact with each other. In other cases, there can be applications where vehicles communicate with devices/pedestrians (as in a V2P network) that in turn can talk to other devices using D2D communications.

In one embodiment, the V2V and D2D networks are distinguished by the use of different synchronization signals. Only the PSSS is modified using two different Zadoff-Chu root sequence indices for in network operation and for out of network operation in V2V communication compared to D2D. The SSSS for D2D is re-used. The two different Zadoff-Chu root sequence indices are selected based on properties of small auto and cross correlations and low frequency offset sensitivity. The combination of the PSSS and SSSS provides the SL ID for V2V communication. The detection of the PSSS also informs the vehicle that the synchronization SF structure for V2V, not for D2D, is to be used as well as the new locations for the DMRS and PSBCH symbols (compared to the D2D SF structure).

Figure 32:
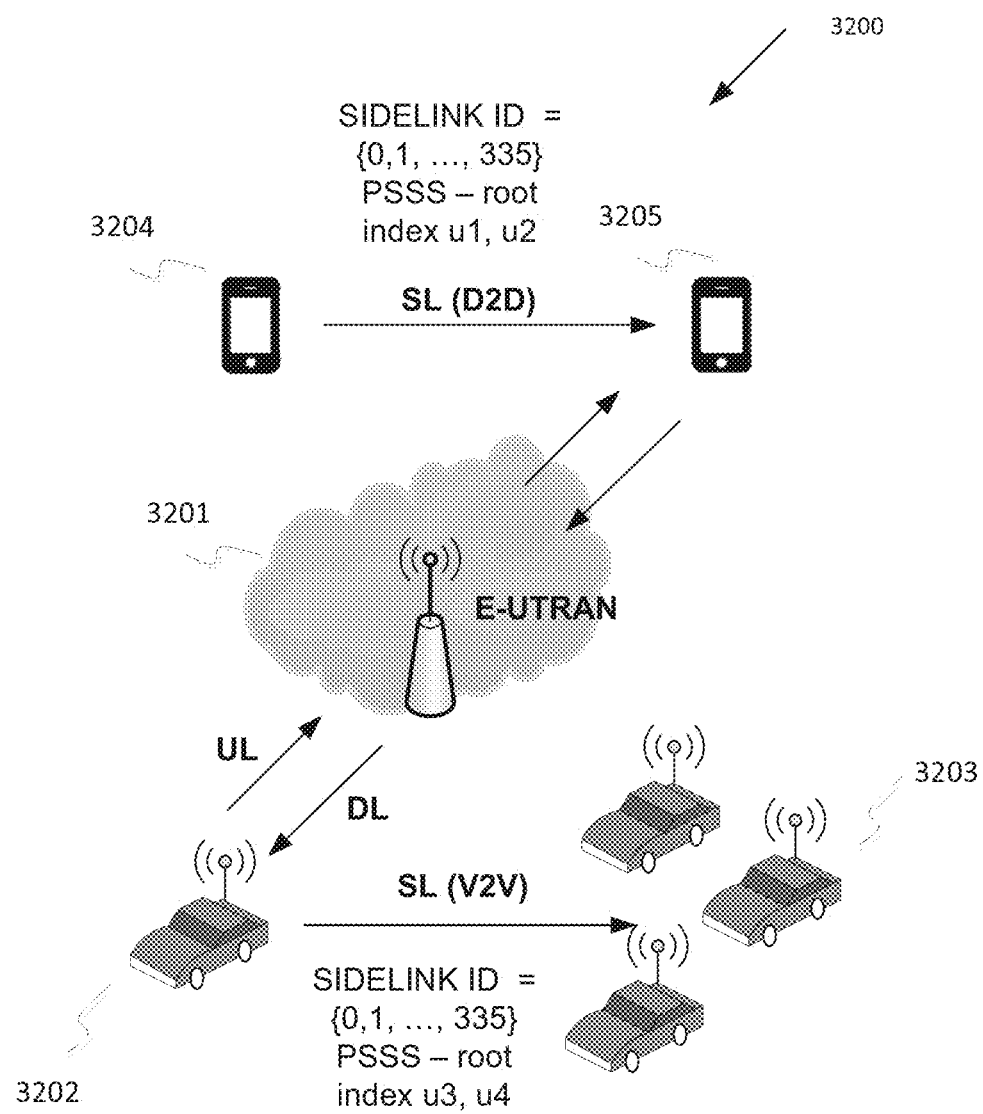
FIG. 32 illustrates an example V2V and D2D network operation according to embodiments of the present disclosure.

FIG. 32 illustrates an example V2V and D2D network operation 3200 according to embodiments of the present disclosure. An embodiment of the V2V and D2D network operation 3200 shown in FIG. 32 is for illustration only. Other embodiments may be used without departing from the scope of the present disclosure.

As shown in FIG. 32, the vehicle UEs and the mobile UEs are part of the same network 3201. A vehicle UE 3202 communicates with a vehicle UE 3203 using a V2V SL protocol while a mobile UE 3204 communicates with a mobile UE 3205 using a D2D SL protocol. The networks are distinguished by the use of separate PSSS that are generated by Zadoff-Chu sequences that have different root indices. For D2D operation, root index u1=26 is used if $N_{ID}^{SL} \leq 167$ for in network operation and u2=37 is used otherwise. For V2V operation, new root indices u3 and u4 are used and they can be selected to have low cross-correlation with u1 and u2.

Figure 33:
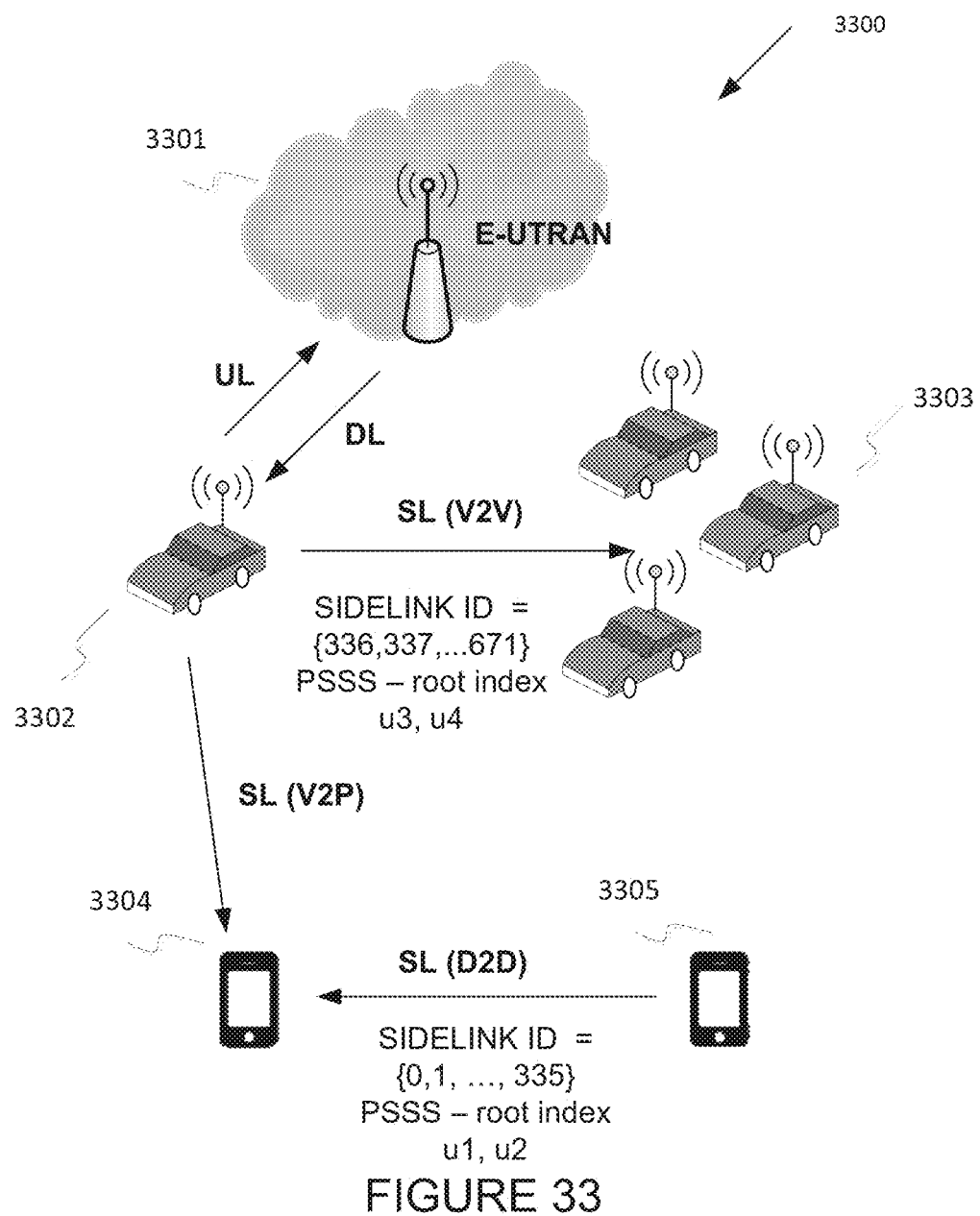
FIG. 33 illustrates another example V2V and D2D network operation according to embodiments of the present disclosure.

FIG. 33 illustrates another example V2V and D2D network operation 3300 according to embodiments of the present disclosure. An embodiment of the V2V and D2D network operation 3300 shown in FIG. 33 is for illustration only. Other embodiments may be used without departing from the scope of the present disclosure.

As shown in FIG. 33, the vehicle UEs and mobile UEs are part of a same network 3301. A vehicle UE 3302 communicates with a vehicle UE 3303 using a V2V SL protocol while a mobile UE 3305 communicates with a mobile UE 3304 using a D2D SL protocol. The vehicle UE 3302 also communicates with the mobile UE 3304 using SL V2P. The networks are distinguished by the use of separate PSSS that are generated by respective Zadoff-Chu sequences that have different root indices. However, the SL IDs in this case cannot overlap to avoid possible collisions of transmissions from a vehicle UE and a mobile UE using a same SL ID. Hence, SL IDs from {336, 337, . . . 671} can be used for V2V operation while {0, 1, . . . , 335} can be reserved for D2D operation. For D2D operation, root index u1=26 is used if $N_{ID}^{SL} \leq 167$ for in network operation and u2=37 is used otherwise. For V2V operation, new root indices u3 is used if $N_{ID}^{SL} \leq 503$ for in network operation and u4 is used otherwise. The new root indices u3 and u4 can be selected to have low cross-correlation with u1 and u2. Once a UE detects a SL ID from {336 through 671}, the UE interprets a V2V transmission and considers different locations for the DMRS and the PSBCH symbols in the synchronization relative to the locations used for a D2D transmission.

In some embodiments, the synchronization signals are not changed from legacy D2D synchronization signals. This can be done for backward compatibility with D2D when shared carriers are used and the operator may want to configure the network for V2V and D2D operation dynamically. In such embodiments, the V2V and D2D networks can be distinguished by using separate SL IDs generated by the same PSSS and SSSS transmissions as legacy D2D, which can generate a different scrambling pattern compared to legacy D2D.

SL IDs from {336, 337, . . . 671} can be used for V2V operation while {0, 1, . . . , 335} can be reserved for D2D operation. The SL IDs for V2V are generated by adding 336 to the SL IDs for D2D operation. Since the legacy PSSS signals are not changed for V2V operation, legacy root indices u1 is used if $N_{ID}^{SL} \leq 503$ for in network operation and legacy root u2 is used otherwise. The PSBCH for V2V is scrambled with the new V2V SL IDs. Thus, legacy D2D networks may not be able to decode the PSBCH contents from V2V traffic. Devices that support both V2V and D2D can however decode both D2D and V2V data. The new receiver that supports both D2D and V2V can blindly decode the PSBCH by using both the old and new SL IDs after synchronization i.e. SL ID 'x' and SLID 'x+336'.

In order to support GNSS or GNSS equivalent based operation, where the concept of separate SL IDs is not required since the whole network can be synchronized irrespective of a cell, a single SL ID can be reserved that is outside the range of the existing SL IDs for V2V and D2D. In one example, a value of {672} can be reserved for GNSS based V2V operation. For GNSS, legacy root indices u1 is used for in network operation and legacy root u2 is used otherwise. The SSSS for SL ID 0 can be used for GNSS operation, for example, since only a single SL ID is required. In such example, 3 blind decodes are required if the SSSS for SL ID of 0 is used (0, 336, 672) and 2 blind decodes are required otherwise.

Since synchronization sources within the same cell can be SFN accumulated, the D2D and V2V synchronization may be separated to avoid the interference between D2D and V2V due to different PSBCH structure. If SLSS transmitted by vehicle is identical as D2D, and uses different synchronization resource from D2D, then inter cell discovery reception for the D2D discovery UE can be impacted as well. This implies Rel-13 D2D receiver may not detect Rel-14 V2V sync transmissions and that Rel-14 V2V receiver may not detect Rel-13 D2D sync transmissions. Hence SLSS may be differentiated between Rel-14 V2V and Rel-13 D2D.

In some embodiments, the SLSS for V2V and D2D networks are differentiated by using different scrambling sequences for V2V derived from the new SLSS IDs for V2V. Based on the new SLSS ID for V2V, the two scrambling sequences $c_0(n)$ and $c_1(n)$, which depend on the primary synchronization signal and are defined by two different cyclic shifts of the m-sequence $\tilde{c}(n)$ according to:

$$\tilde{c}_0(n) = \tilde{c}((n + N_{ID}^{(2)}) \bmod 31)$$

$$\tilde{c}_1(n) = \tilde{c}((n + N_{ID}^{(2)} + 3) \bmod 31)$$

where $N_{ID}^{(2)} = \lfloor N_{ID}^{SL}/168 \rfloor$ is assumed and $\tilde{c}(i) = 1 - 2x(i)$, $0 \leq i \leq 30$, is defined by $x(\bar{i}+5) = (x(\bar{i}+3) + x(\bar{i})) \bmod 2$, $0 \leq \bar{i} \leq 25$ with initial conditions $x(0) = 0$, $x(1) = 0$, $x(2) = 0$, $x(3) = 0$, $x(4) = 1$.

Since $N_{ID}^{SL}$ now different for V2V vs. D2D due to new SLSS IDs, $N_{ID}^{(2)}$ is now different, which leads to two different scrambling sequences $c_0(n)$ and $c_1(n)$ for V2V that ensures that D2D receiver cannot detect the new V2V SSSS transmissions. Thus, D2D and V2V SLSS can be differentiated.

In some embodiments, the SLSS for V2V and D2D networks are differentiated by using different scrambling sequences derived from using the same SLSS ID for D2D. Two scrambling sequences $c_0(n)$ and $c_1(n)$, which depend on the primary synchronization signal and are defined by two different cyclic shifts of the m-sequence c(n) according to:

$$c_0(n) = \tilde{c}((n + N_{ID}^{(2)} + a) \bmod 31)$$

$$c_1(n) = \tilde{c}((n + N_{ID}^{(2)} + b) \bmod 31)$$

where $N_{ID}^{(2)} = \lfloor N_{ID}^{SL}/168 \rfloor$ and a, b are integer offsets where a is assumed and $\tilde{c}(i) = 1 - 2x(i)$, $0 \leq i \leq 30$, is defined by $x(\bar{i}+5) = (x(\bar{i}+3) + x(\bar{i})) \bmod 2$, $0 \leq \bar{i} \leq 25$ with initial conditions $x(0) = 0$, $x(1) = 0$, $x(2) = 0$, $x(3) = 0$, $x(4) = 1$.

The offsets a and b are chosen such that the offsets a and b lead to two different scrambling sequences $c_0(n)$ and $c_1(n)$ for V2V that ensures that D2D receiver cannot detect the new V2V SSSS transmissions. Thus, D2D and V2V SLSS can be differentiated.

In some embodiments, the SLSS for V2V and D2D networks are differentiated by using different scrambling sequences derived from using the same SLSS ID for D2D. Two scrambling sequences $c_0(n)$ and $c_1(n)$, which depend on the primary synchronization signal and are defined by two different cyclic shifts of the m-sequence c (n) according to:

$$c_0(n) = \tilde{c}((n+N_{ID}^{(2)}) \mod 31)$$

$$c_1(n) = \tilde{c}((n+N_{ID}^{(2)}+3) \mod 31)$$

where $N_{ID}^{(2)} = \lfloor N_{ID}^{SL}/168 \rfloor$ and $\tilde{c}(i)=1-2x(i)$, $0 \le i \le 30$ are defined according to a different scrambling sequence $c_0(n)$ and $c_1(n)$ that ensures that D2D receiver cannot detect the new V2V SSSS transmissions.

This can be done for example, by a different mapping for x than that used for D2D and/or by different initial conditions than that used for D2D. This leads to two different scrambling sequences $c_0(n)$ and $c_1(n)$ for V2V that ensures that D2D receiver cannot detect the new V2V SSSS transmissions. Thus, D2D and V2V SLSS can be differentiated.

In some embodiments, the SF structure for PSBCH is modified for V2V communication by modifying a location for DMRS symbols and for PSBCH symbols.

Figure 34:
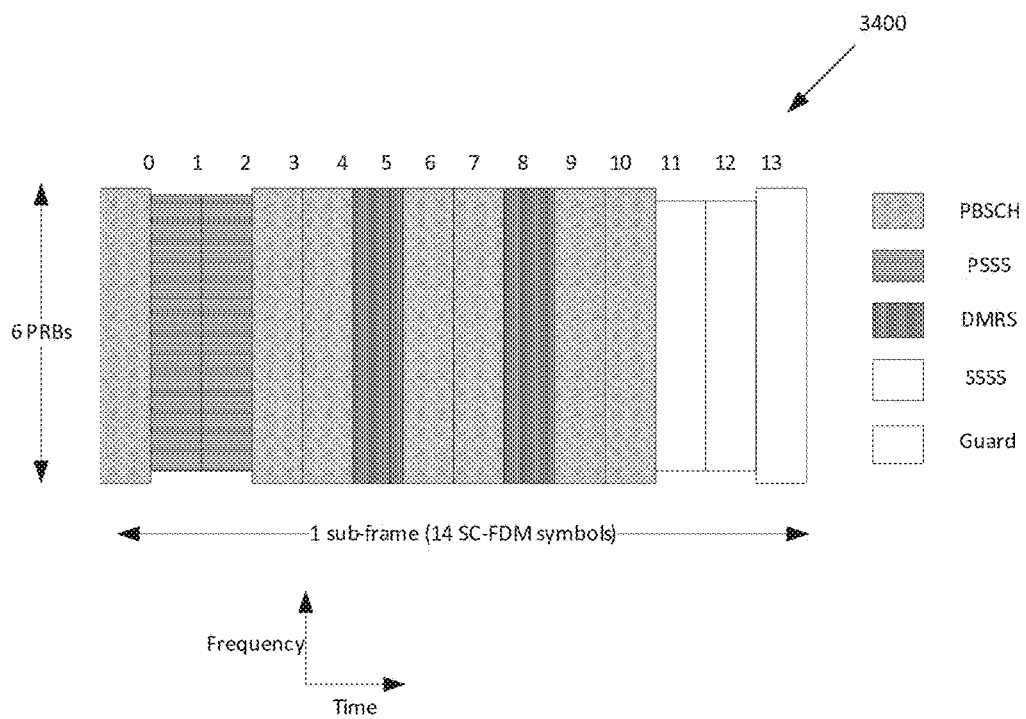
FIG. 34 illustrates an example physical sidelink broadcast channel (PSBCH) SF structure. V2V according to embodiments of the present disclosure.

FIG. 34 illustrates an example physical sidelink broadcast channel (PSBCH) SF structure for V2V 3400 according to embodiments of the present disclosure. An embodiment of the PSBCH SF structure for V2V 3400 shown in FIG. 34 is for illustration only. Other embodiments may be used without departing from the scope of the present disclosure.

As shown in FIG. 34, DMRS symbols are placed in symbols 5 and 8 (symbol indexing starts from 0) in the SF. The location of the DMRS symbols can allow a UE to estimate a channel over larger Doppler shifts at 5.9 GHz. For example, a CFO for PSBCH symbols 0 and 3 can be estimated using the PSSS, a CFO for PSBCH symbols 4, 6, 7, 9 can be estimated using the DMRS, and a CFO for PSBCH symbol 10 can be estimated using the SSSS. In the case of extended CP configuration, where only 13 symbols are available, the frame structure of the normal CP is used excluding the first symbol in the normal CP case, similar to the legacy frame structure for extended CP.

In some embodiments, additional DMRS symbols are included in a PSBCH SF. This can improve channel estimation and CFO correction at a cost of reducing a number of available symbols for PSBCH transmission.

Figure 35:
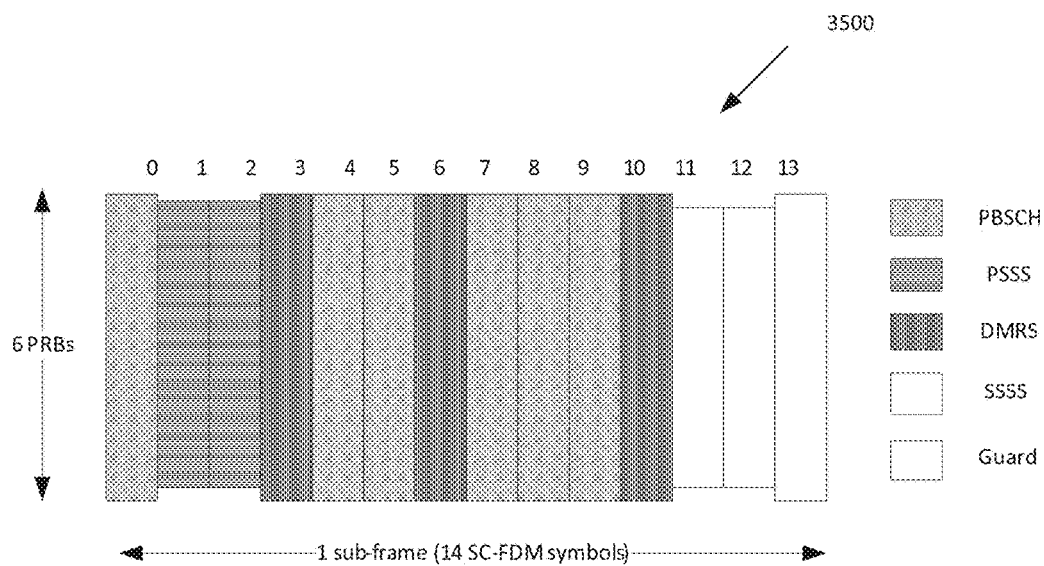
FIG. 35 illustrates an example PSBCH SF structure with additional demodulation reference signal DMRS) symbols according to embodiments of the present disclosure.

FIG. 35 illustrates an example PSBCH SF structure with additional demodulation reference signal (DMRS) symbols 3500 according to embodiments of the present disclosure. An embodiment of the PSBCH SF structure with additional DMRS symbols 3500 shown in FIG. 35 is for illustration only. Other embodiments may be used without departing from the scope of the present disclosure.

As shown in FIG. 35, an additional DMRS symbol is transmitted in symbol 6 (3V structure). Alternatively, symbol 7 can be used instead of symbol 6 for the additional DMRS symbol.

Figure 36:
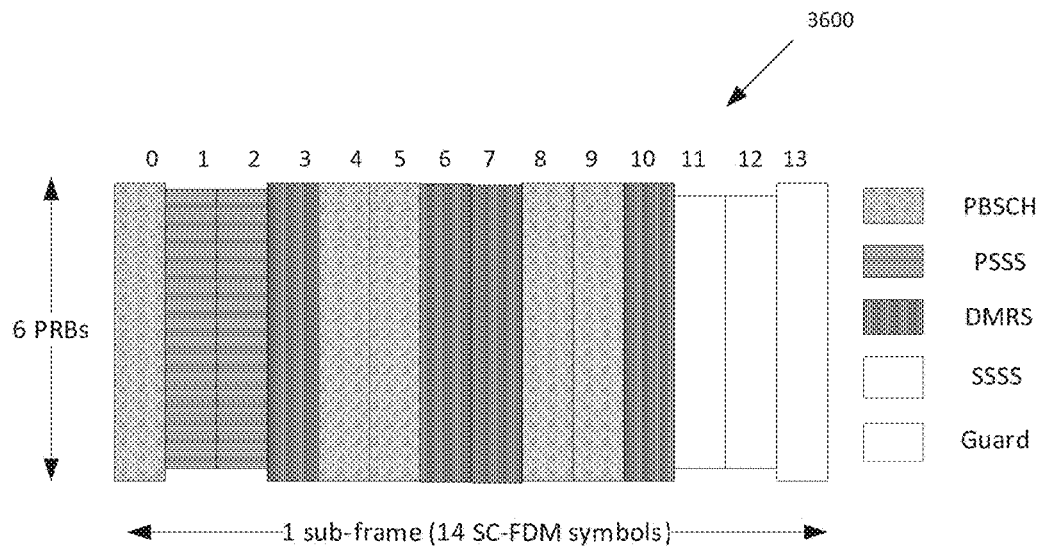
FIG. 36 illustrates another example PSBCH SF structure with additional DMRS symbols according to embodiments of the present disclosure.

FIG. 36 illustrates another example PSBCH SF structure with additional demodulation reference signal (DMRS) symbols 3600 according to embodiments of the present disclosure. An embodiment of the PSBCH SF structure with additional DMRS symbols 3600 shown in FIG. 36 is for illustration only. Other embodiments may be used without departing from the scope of the present disclosure.

As shown in FIG. 36, two additional DMRS symbols are transmitted in symbols 6 and 7 to improve CFO estimation and correction.

Figure 37:
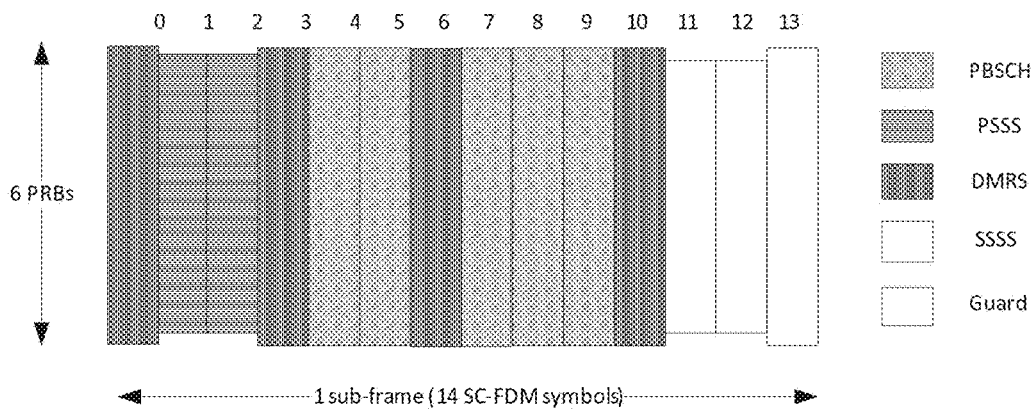
FIG. 37 illustrates yet another example PSBCH SF structure with additional DMRS symbols according to embodiments of the present disclosure.

FIG. 37 illustrates yet another example PSBCH SF structure with additional DMRS symbols 3700 according to embodiments of the present disclosure. An embodiment of the PSBCH SF structure with additional DMRS symbols 3700 shown in FIG. 37 is for illustration only. Other embodiments may be used without departing from the scope of the present disclosure. As shown in FIG. 37, two additional DMRS symbols are transmitted in symbols 0 and 6 (or 7) to improve CFO estimation and correction. Relative to FIG. 36, the PSBCH symbols are kept closer in time and a channel variation can be smaller during the duration of the PSBCH transmission.

Figure 38:
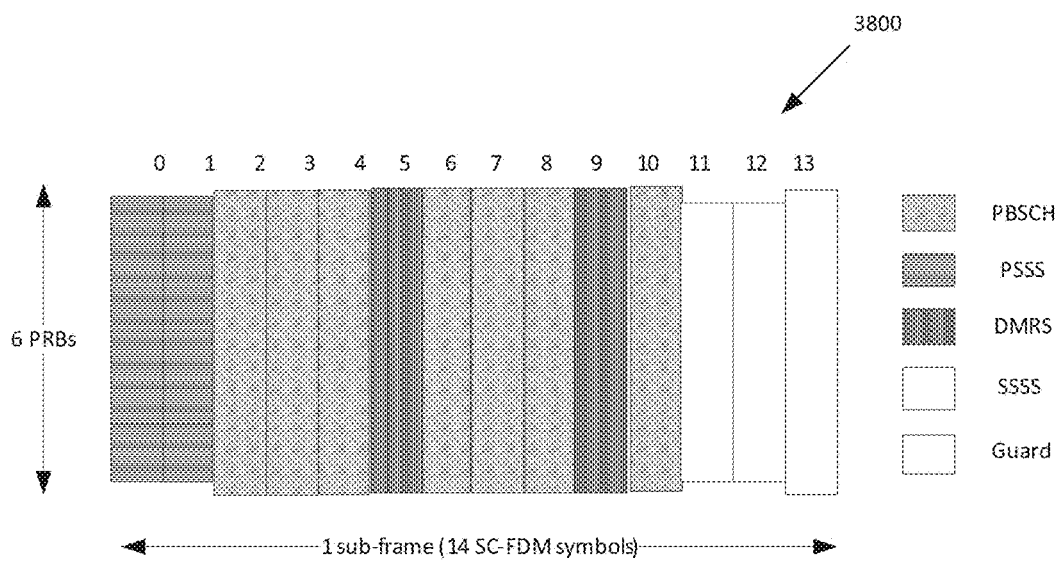
FIG. 38 illustrates another example PSBCH SF structure with additional DMRS symbols according to embodiments of the present disclosure.

FIG. 38 illustrates another example PSBCH SF structure 3800 according to embodiments of the present disclosure. An embodiment of the PSBCH SF structure 3800 shown in FIG. 38 is for illustration only. Other embodiments may be used without departing from the scope of the present disclosure.

The aforementioned embodiments considered the case where the PSSS and SSSS locations are not changed. Further performance enhancements can be obtained by changing the location of the PSSS symbols so that the PBSCH symbols are closer to each other in the subframe. As shown in FIG. 38, PSSS is now sent at symbol 0 and symbol 1 instead of symbol 1 and symbol 2 of the subframe. Relative to FIG. 36, the PSBCH symbols are kept closer in time and a channel variation can be smaller during the duration of the PSBCH transmission.

Figure 39:
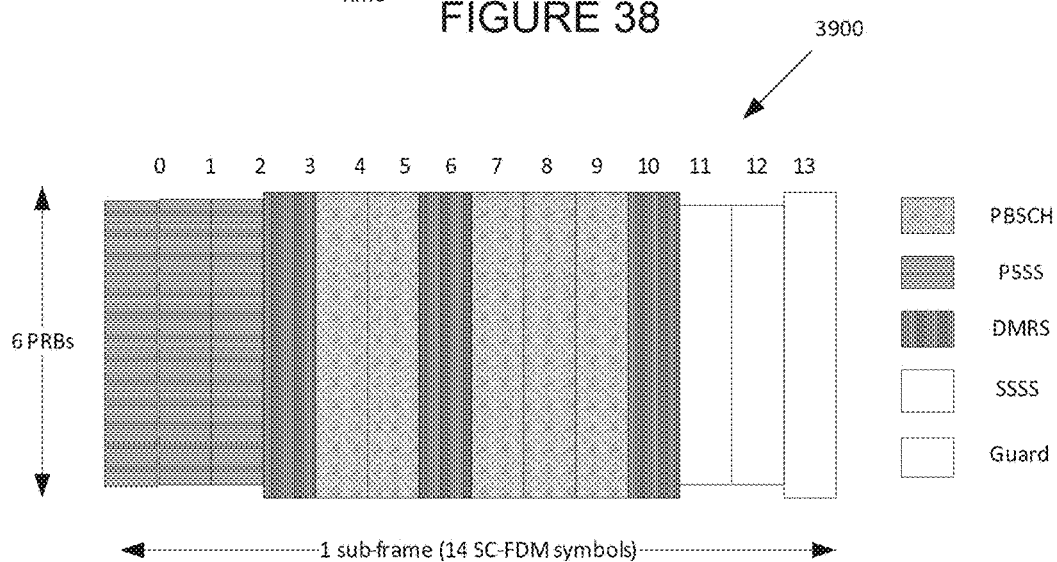
FIG. 39 illustrates yet another example PSBCH SF structure with additional DMRS symbols according to embodiments of the present disclosure.

FIG. 39 illustrates yet another example PSBCH SF structure with additional DMRS symbols 3900 according to embodiments of the present disclosure. An embodiment of the PSBCH SF structure with additional DMRS symbols 3900 shown in FIG. 39 is for illustration only. Other embodiments may be used without departing from the scope of the present disclosure.

As shown in FIG. 39, due to the high Doppler, it may be difficult to compensate for the PSBCH symbol 0 and this symbol may be punctured. Instead, an additional PSSS sequence could be transmitted at symbol 0, which can help with increased reliability of CFO estimation.

In some embodiments, the $1^{st}$ SC-FDMA symbol (symbol 0) to be used for PSSS transmission for V2V communication may be used. In such embodiments, the PSBCH may be grouped together in the center, allowing better compensation for Doppler and provide better CFO and timing estimation by transmitting an additional PSSS sequence. Note that the DMRS locations used in FIG. 39 are just exemplary and the PSSS transmission on the $1^{st}$ symbol (symbol 0) is independent of the choice of DMRS configuration for PSBCH transmission.

Figure 40:
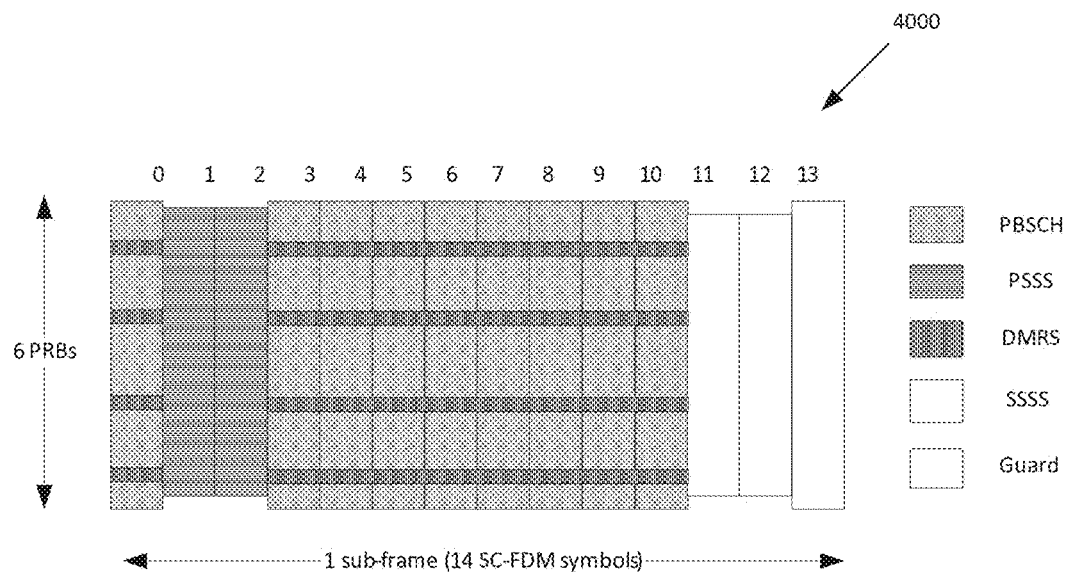
FIG. 40 illustrates yet another example PSBCH SF structure with additional DMRS symbols according to embodiments of the present disclosure.

FIG. 40 illustrates yet another example PSBCH SF st h additional

DMRS symbols 4000 according to embodiments of the present disclosure. An embodiment of the PSBCH SF structure with additional DMRS symbols 4000 shown in FIG. 40 is for illustration only. Other embodiments may be used without departing from the scope of the present disclosure.

Figure 41:
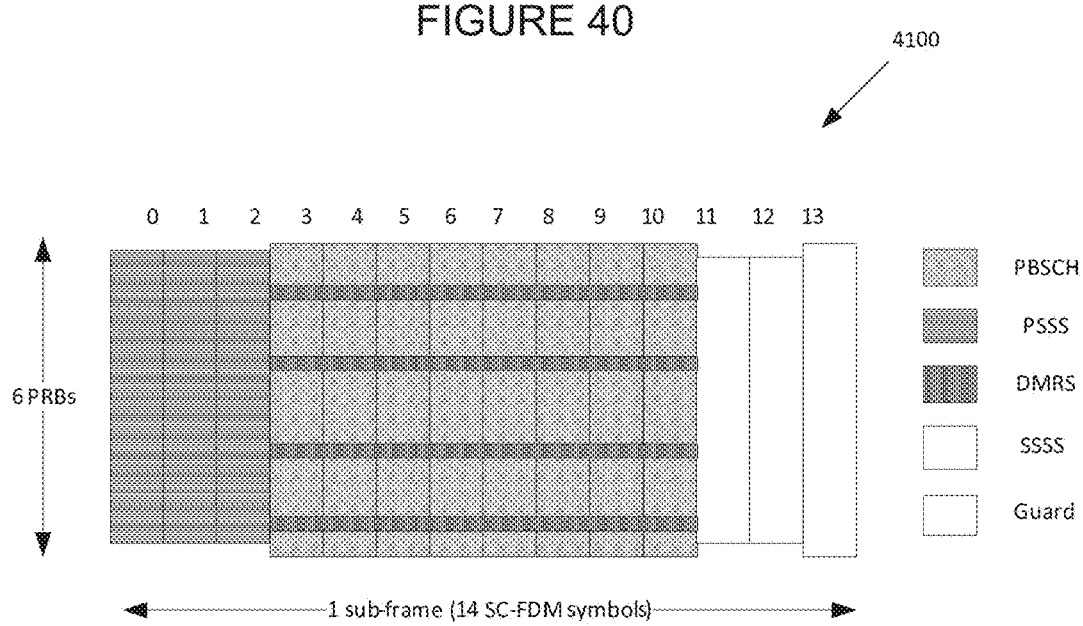
FIG. 41 illustrates yet another example PSBCH SF structure with additional DMRS symbols according to embodiments of the present disclosure.

FIG. 41 illustrates yet another example PSBCH SF structure with additional DMRS symbols 4100 according to embodiments of the present disclosure. An embodiment of the PSBCH SF structure with additional DMRS symbols 4100 shown in FIG. 41 is for illustration only. Other embodiments may be used without departing from the scope of the present disclosure.

As shown in FIG. 40 and FIG. 41, respectively, the DMRS is sent in all PSBCH data symbols in certain fixed frequency locations for improved support for Doppler for speeds up to 500 km/h.

In some embodiments, the number of DMRS symbols used for PSBCH is made configurable due to the high overhead of DMRS symbols in the subframe, since these additional symbols are only needed for high frequency (6

GHz vs. 2 GHz) and for high speed scenarios. In one example, at 2 GHz frequency band, only 2 DMRS symbols may be used while at 6 GHz, there may be 3 DMRS symbols used. In another example, at 30 km/h only 2 DMRS symbols are used vs. 3 DMRS symbols are used at 140 km/h.

In some embodiments, the DMRS symbols is punctured to achieve the configurability when not required to support high speed or high carrier frequency and data in those locations, as needed, is sent, where the data is rate matched accordingly to use the extra symbol or symbols. When puncturing is performed, it can be done on the inner DMRS symbol or symbols.

In some embodiments, the eNodeB sidelink configuration is achieved for the UE, where the eNodeB informs the UE to select one of multiple available DMRS configuration patterns. In some embodiments, the control channel such as PSBCH and/or PSCCH could have a fixed DMRS configuration. However, the data shared channel such as PSSCH could have a variable DMRS configuration where the DMRS setting is indicated by setting at least one bit in the control channel. The UE, depending on its current speed and its carrier frequency, indicates the DMRS configuration for PSCCH in its control transmissions. The UE can make this decision independently in Mode 2 sidelink operation or the UE could make decision as part of a message from the eNodeB. Thus, the DMRS configuration can by RRC for both control/data or by RRC/fixed for control and dynamic for data.

In some embodiments, only the PSBCH uses a fixed number of DMRS resources. However, both the data shared channel (PSSCH) and the control channel (PSCCH) can have a variable DMRS configuration where the DMRS configuration is indicated by setting one bit in the MIB-SL or by RRC signaling. Support for variable DMRS configuration enables the system to be more efficient when high Doppler support is not required.

Figure 42:
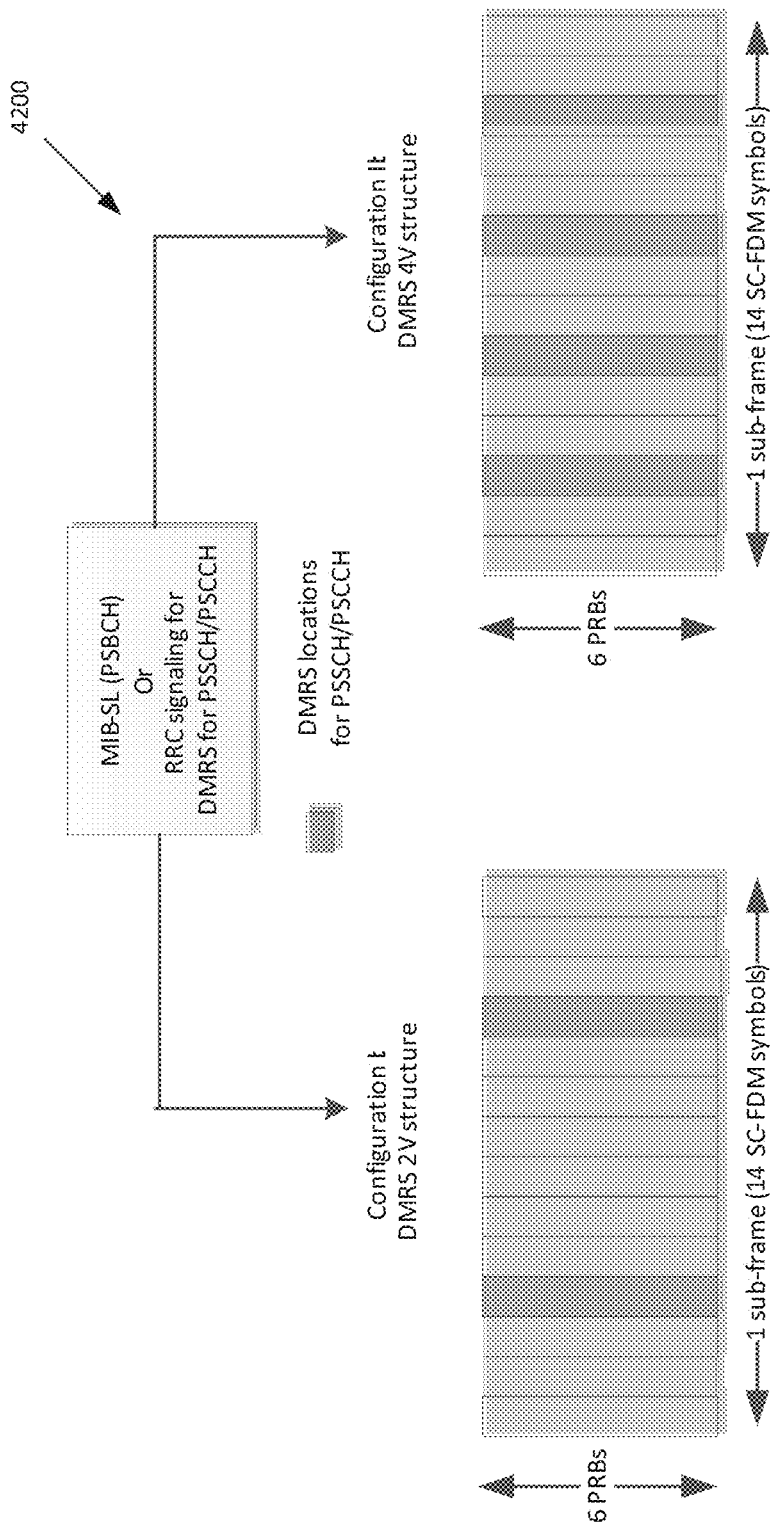
FIG. 42 illustrates an example DMRS configuration for physical sidelink shared channel (PSSCH) and physical sidelink control channel (PSCCH) according to embodiments of the present disclosure.

FIG. 42 illustrates an example DMRS configuration for physical sidelink shared channel (PSSCH) and physical sidelink control channel (PSCCH) 4200 according to embodiments of the present disclosure. An embodiment of the DMRS configuration for PSSCH and PSCCH 4200 shown in FIG. 42 is for illustration only. Other embodiments may be used without departing from the scope of the present disclosure.

FIG. 42 shows the DMRS configuration for PSSCH and PSCCH indicated via using a bit in the MIB-SL (PSBCH transmission) or by RRC signaling, according to the embodiments of this disclosure. Based on the configuration, either 2 DMRS symbols (2V) or 4 DMRS symbols (4V) are used for transmission of PSSCH and PSCCH. The DMRS structure (e.g. reference symbol design) for the 4V configuration need not be identical to the DMRS structure for the 2V configuration. The eNB can configure the DMRS based on the carrier frequency and/or current geo location or zone.

In one example, a 2V structure for DMRS is chosen when the carrier frequency is 2 GHz while a 4V structure for DMRS is chosen when the carrier frequency is 6 GHz. In another example, a 2V structure is chosen when the UE is in an urban geolocation zone with low traffic speeds while a 4V structure is chosen in a zone associated with a freeway or fast traffic speeds. The UE indicates the chosen DMRS configuration for PSCCH and PSSCH transmissions in the MIB-SL when PSBCH is transmitted. The DMRS configuration for PSCCH and PSSCH transmissions can be set directly via RRC signaling when PSBCH is not transmitted (for example, when in coverage or Mode 1). Alternatively, the UE can also perform PSCCH decoding blindly based on the two DMRS structure options and use the DMRS pattern that resulted in the successful decode of the PSCCH for decoding the PSSCH.

In some embodiments, an additional bit of information is transmitted in the MIB-SL to indicate V2V support according to illustrative embodiments of the present disclosure. The format of the MIB-SL is as subsequently described:

MasterInformationBlock-SL

```
-- ASN1START
MasterInformationBlock-SL ::= SEQUENCE {
sl-Bandwidth-r14 ENUMERATED {n6, n15, n25, n50, n75, n100},
tdd-ConfigSL-r14 TDD-ConfigSL-r14,
directFrameNumber-r14 BIT STRING (SIZE (10)),
directSubframeNumber-r14 INTEGER (0..9),
inCoverage-r14 BOOLEAN,
GNSS-sync-r14 BOOLEAN,
V2V-r14 BOOLEAN,
DMRSConfig-r14 BOOLEAN,
reserved-r14 BIT STRING (SIZE (16))
}
-- ASN1STOP
```

The V2V field is used to identify that the transmitting device is intending V2V communications as shown:

V2V-r14=0=>D2D transmission

V2V-r14=1=>V2V transmission

The GNSS-sync field is used to identify if the synchronization is obtained through the network or via GNSS (or GNSS equivalent) as shown:

GNSS-sync-r14=0=>NodeB is the synchronization source

GNSS-sync-r14=1=>GNSS or GNSS-equivalent is the synchronization source

The DMRSConfig field is used to indicate whether 2V DMRS structure or 4V DMRS structure is used for PSSCH and PSCCH transmissions as shown:

DMRSConfig=0=>2V DMRS structure is used for PSSCH and PSCCH transmissions

DMRSConfig=1=>4V DMRS structure is used for PSSCH and PSCCH transmissions

In some embodiments, the repetition period for the synchronization SF is decreased from once every 40 msec to a reduced periodicity such as once every 10 msec (1 frame). The repetition period is decreased to support lower latency requirements as well as increased reliability of transmissions. This can be signaled by modifying the sidelink communication period information element to use at least one of the spare bits to signal a shorter periodicity such as a 10 msec or 20 msec repetition as shown:

```
-- ASN1START
SL-PeriodComm-r14 ::= ENUMERATED {sf40, sf60, sf70, sf80, sf120,
sf140, sf160, sf240, sf280, sf320, sf20, sf10, spare4, spare3, spare2,
spare}
-- ASN1STOP
```

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. An apparatus of a first vehicle user equipment (UE) for collision avoidance using channel sensing in a wireless communication network, the apparatus comprising:
a transceiver configured to receive a set of scheduling assignment (SA) information that is allocated to a set of second vehicle UEs in the wireless communication network; and
at least one processor configured to:
decode the set of SA information each of which includes SA information to each of the set of second vehicle UEs;
perform energy sensing operation for resources to be used by each of the set of second vehicle UEs to determine additional potential SA transmission and data transmission from the set of second vehicle UEs over the resources;
determine available resources for the data transmission from the first vehicle UE based on the performed energy sensing and SA sensing; and
skip a channel sensing operation on at least one subframe that is used for the data transmission from the first vehicle UE based on a result of the determination of available resources, wherein if the at least one subframe is determined as a subframe m that is skipped for sensing by the first vehicle UE, a resource selection in subframes m to m+k*$P_{min}$ is avoided until the channel sensing operation is performed in subframe m+k*$P_{min}$, wherein k is an integer and k>0, and $P_{min}$ is set to 100, and
wherein the transceiver is further configured to transmit data among resources identified as unused in next transmissions from second vehicle UEs.

2. The apparatus of claim 1, wherein the at least one processor is further configured to:
exclude unavailable data resources based on the decoded set of SA information for the data transmission from the first vehicle UE; and
select the available resources for the data transmission from the first vehicle UE based on the decoded set of SA information.

3. The apparatus of claim 1, wherein the at least one processor is further configured to:
determine a set of transmission parameters based on the available resources; and
perform the data transmission from the first vehicle UE on the available resources in accordance with a set of transmission parameters.

4. The apparatus of claim 3, wherein the set of transmission parameters comprises at least one of a transmit power, a modulation and coding scheme (MCS), or semi-persistent related parameters including a next transmission interval.

5. The apparatus of claim 1, wherein the set of SA information is received on pre-determined frequency resources.

6. The apparatus of claim 1, wherein the at least one processor is further configured to:
determine a sensing duration for the channel sensing operation based on a sensing window period that is a same for transmissions from a plurality of UEs in a given resource pool; and
identify a resource availability map for next data transmission based on sensing during a result of the determination of sensing duration.

7. The apparatus of claim 1, wherein the at least one processor is further configured to determine whether the data transmission is continued on the available resources and trigger reselection of the available resources for the data transmission when a condition has been satisfied.

8. The apparatus of claim 7, wherein the condition is satisfied with at least one of:
a counter has been expired, the counter for each UE being independently reset or initialized to a value randomly chosen within a pre-determined range of values; or
the first vehicle UE identifies that a transport block (TB) included in the data transmission does not fit within an available resource allocation using an allowable MCS.

9. The apparatus of claim 1, wherein a next transmission at n+e is offset from a currently scheduled transmission n+d in a multiple of period P e=k*$P_{min}$+d, and wherein k is an integer in range 0 to 10 and $P_{min}$ is set to 100, the k being indicated in an SCI as e-d using 4 bits.

10. The apparatus of claim 1, wherein a congestion level observed by the first vehicle UE is defined by at least one of a percentage of unavailable data or SA resources observed by the first vehicle UE based on sensing and is used for resource allocation, and wherein a congestion percentage is defined as a ratio of a number of busy resources in T and a number of total resources in T, and wherein T is a measuring interval, the congestion level being indicated to an eNodeB (eNB) based on an eNB request.

11. The apparatus of claim 1, wherein the first vehicle UE performs sensing in subframes m−k*Pmin to m, and wherein k is an integer in range of 1<k<10 and Pmin is set to 100.

12. A sensing method of a first vehicle user equipment (UE) for collision avoidance using channel sensing in a wireless communication network, the sensing method comprising:
receiving a set of scheduling assignment (SA) information that is allocated to a set of second vehicle UEs in the wireless communication network;
decoding the set of SA information each of which includes SA information to each of the set of second vehicle UEs;
performing energy sensing operation for resources to be used by each of the set of second vehicle UEs to determine additional potential SA transmission and data transmission from the set of second vehicle UEs over the resources;
determining available resources for the data transmission from the first vehicle UE based on the performed energy sensing and SA sensing;
skipping a channel sensing operation on at least one subframe that is used for the data transmission from the first vehicle UE based on a result of the determination of available resources, wherein in response to the at least one subframe being determined as a subframe m that is skipped for sensing by the first vehicle UE, a resource selection in subframes m+k*Pmin to m is avoided until the channel sensing operation is performed in subframe m+k*Pmin, and wherein k is an integer and k>0, and Pmin is set to 100; and
transmitting data among resources identified as unused in next transmissions from second vehicle UEs.

13. The sensing method of claim 12, further comprising:
excluding unavailable data resources based on the decoded set of SA information for the data transmission from the first vehicle UE; and
selecting the available resources for the data transmission from the first vehicle UE based on the decoded set of SA information.

14. The sensing method of claim 12, further comprising:
determining a set of transmission parameters based on the available resources; and performing the data transmission from the first vehicle UE on the available resources in accordance with a set of transmission parameters.

15. The sensing method of claim 14, wherein the set of transmission parameters comprises at least one of a transmit power, a modulation and coding scheme (MCS), or semi-persistent related parameters including a next transmission interval.

* * * * *